(12) United States Patent
Nakatsuka et al.

(10) Patent No.: US 7,034,800 B2
(45) Date of Patent: Apr. 25, 2006

(54) DRIVING CIRCUIT AND DRIVING METHOD FOR PIEZOELECTRIC TRANSFORMER, BACKLIGHT APPARATUS, LIQUID CRYSTAL DISPLAY APPARATUS, LIQUID CRYSTAL MONITOR, AND LIQUID CRYSTAL TV

(75) Inventors: Hiroshi Nakatsuka, Katano (JP); Katsu Takeda, Osaka (JP); Takashi Ishikawa, Daito (JP); Katsunori Moritoki, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 609 days.

(21) Appl. No.: 10/295,401

(22) Filed: Nov. 14, 2002

(65) Prior Publication Data

US 2003/0098861 A1 May 29, 2003

(30) Foreign Application Priority Data

Nov. 14, 2001 (JP) .............................. 2001-349186

(51) Int. Cl.
*G09G 3/36* (2006.01)
*G09G 5/00* (2006.01)
*H05B 41/16* (2006.01)
*H01L 41/04* (2006.01)

(52) U.S. Cl. ...................... 345/102; 345/212; 310/314; 315/254

(58) Field of Classification Search ........ 345/211–213, 345/102; 315/254–259; 310/314; 307/17
See application file for complete search history.

(56) References Cited

U.S. PATENT DOCUMENTS

| | | | | |
|---|---|---|---|---|
| 5,705,879 A | * | 1/1998 | Abe et al. .................... | 310/359 |
| 5,777,425 A | * | 7/1998 | Ino et al. ..................... | 310/359 |
| 5,866,968 A | * | 2/1999 | Mech .......................... | 310/314 |
| 5,905,491 A | * | 5/1999 | Kim ............................ | 345/212 |
| 5,969,954 A | * | 10/1999 | Zaitsu ......................... | 363/16 |
| 6,025,824 A | * | 2/2000 | Horiuchi et al. ............ | 345/102 |
| 6,407,480 B1 | | 6/2002 | Nakanishi et al. | |
| 6,531,830 B1 | * | 3/2003 | Akimoto et al. ............ | 315/224 |
| 6,545,426 B1 | * | 4/2003 | Chen .................... | 315/209 PZ |
| 6,564,015 B1 | * | 5/2003 | Ishikawa et al. ............ | 396/206 |
| 6,636,190 B1 | * | 10/2003 | Hirakata et al. ........... | 345/74.1 |
| 2002/0014865 A1 | * | 2/2002 | Akimoto et al. ............ | 315/291 |

FOREIGN PATENT DOCUMENTS

| | | |
|---|---|---|
| JP | 7-39144 | 2/1995 |
| JP | 7-59338 | 3/1995 |
| JP | 10-178784 | 6/1998 |

(Continued)

*Primary Examiner*—Xiao Wu
*Assistant Examiner*—M. Fatahiyar
(74) *Attorney, Agent, or Firm*—Hamre, Schumann, Mueller & Larson, P.C.

(57) ABSTRACT

A driving circuit for a piezoelectric transformer is provided, which is capable of driving a piezoelectric transformer at a high efficiency and with low distortion, and being miniaturized. At the commencement of lighting a cold-cathode fluorescent tube, a digital controller fixes frequencies of first and second control signals VC1 and VC2 at a predetermined frequency and controls the phase difference therebetween so that an output power of the piezoelectric transformer becomes from substantially zero to a predetermined output power. After lighting of the cold-cathode fluorescent tube, the digital controller controls the phase difference between the first and second control signals VC1 and VC2 so that current detecting data CD substantially is matched with reference data RD.

82 Claims, 30 Drawing Sheets

FOREIGN PATENT DOCUMENTS

| | | |
|---|---|---|
| JP | 2000-133485 | 5/2000 |
| JP | 2000-139081 | 5/2000 |
| JP | 2000-312474 | 11/2000 |
| JP | 2000-348891 | 12/2000 |
| JP | 2000-357825 | 12/2000 |
| JP | 2001-136749 | 5/2001 |

* cited by examiner

DRIVING CIRCUIT AND DRIVING METHOD FOR PIEZOELECTRIC TRANSFORMER, BACKLIGHT APPARATUS, LIQUID CRYSTAL DISPLAY APPARATUS, LIQUID CRYSTAL MONITOR, AND LIQUID CRYSTAL TV

BACKGROUND OF THE INVENTION

1. Field of the Invention

The present invention relates to a liquid crystal backlight apparatus, and more specifically, to a backlight apparatus for a personal computer, a liquid crystal monitor, and a liquid crystal TV.

2. Description of the Related Art

FIG. 26 shows a configuration of a Rosen type piezoelectric transformer, which is a typical configuration of a conventional piezoelectric transformer. This piezoelectric transformer enables a very high voltage step-up ratio to be obtained when a load is infinite and enables a voltage step-up ratio to be decreased when a load becomes smaller. Furthermore, the piezoelectric transformer has the following advantages: it can be miniaturized compared with an electromagnetic transformer, is nonflammable, and does not generate noise due to electromagnetic induction. Because of these features, the piezoelectric transformer has been used as a power source for a cold-cathode fluorescent tube.

In FIG. 26, a portion denoted with reference numeral 1 is a low impedance portion that functions as an input portion in the case of the use for stepping-up a voltage. The low impedance portion 1 is provided with polarization PD in the thickness direction of a piezoelectric layer 5, and electrodes 3U and 3D are placed on principal planes in the thickness direction of the piezoelectric layer 5. On the other hand, a portion denoted with reference numeral 2 is a high impedance portion that functions as an output portion in the case of the use for stepping-up a voltage. The high impedance portion 2 is provided with polarization PL in the longitudinal direction of a piezoelectric layer 7, and an electrode 4 is placed on an end face in the longitudinal direction.

Next, an operation of a Rosen type piezoelectric transformer with a conventional configuration shown in FIG. 26 will be described with reference to FIG. 27.

FIG. 27 shows a lumped parameter approximate equivalent circuit in the vicinity of a resonance frequency of a Rosen type piezoelectric transformer. In FIG. 27, Cd1 and Cd2 are input side and output side bound capacitors, respectively; A1 (input side) and A2 (output side) are force factors; m is an equivalent mass, C is an equivalent compliance, and Rm is an equivalent mechanical resistor. In this piezoelectric transformer, the force factor A1 is larger than the force factor A2, and a voltage is stepped-up by two equivalent ideal transformers in FIG. 27. Furthermore, the piezoelectric transformer includes a series resonance circuit composed of the equivalent mass m and the equivalent compliance C. Therefore, particularly in the case where the value of a load resistance is large, an output voltage has a value larger than a ratio of transformation of the transformers.

Furthermore, a cold-cathode fluorescent tube with a cold-cathode configuration, in which an electrode for discharge has no heater, generally is used as a backlight. Because of the cold-cathode configuration, in the cold-cathode fluorescent tube, a discharge start voltage for starting discharge and a discharge keeping voltage for maintaining discharge are both very high. Generally, a cold-cathode fluorescent tube used in a 14-inch liquid crystal display requires about 800 Vrms of a discharge keeping voltage and about 1300 Vrms of a discharge start voltage.

It is considered that a lighting start voltage and a lighting maintenance voltage will be increased due to the enlargement of a liquid crystal display and the increased length of a cold-cathode fluorescent tube.

FIG. 28 shows a block diagram showing an exemplary configuration of a light-emission control apparatus (piezoelectric inverter) of a cold-cathode fluorescent tube using a conventional piezoelectric transformer. In FIG. 28, reference numeral 13 denotes a variable oscillation circuit generating an AC driving signal that drives a piezoelectric transformer 10. An output signal of the variable oscillation circuit 13 generally has a pulse waveform, and has a high-frequency component removed by a wave-shaping circuit 11 to be converted to an AC signal close to a sine wave. An output signal of the wave-shaping circuit 11 is amplified in a voltage to a sufficient level for allowing a driving circuit 12 to drive the piezoelectric transformer 10, and is input to a primary side electrode 3U of the piezoelectric transformer 10. An output voltage stepped-up by the piezoelectric effect of the piezoelectric transformer 10 is taken out from a secondary side electrode 4.

A high voltage output from the secondary side electrode 4 is applied to a series circuit composed of a cold-cathode fluorescent tube 17 and a feedback resistor 18, and an overvoltage protecting circuit 20. In the overvoltage protecting circuit 20, a comparison circuit 15 compares a voltage detected by voltage division resistors 19a and 19b with a set voltage Vref1. An output signal of the comparison circuit 15 is supplied to an oscillation control circuit 14 so as to control the variable oscillation circuit 13 so that the high voltage output from the secondary side electrode 4 of the piezoelectric transformer 10 is prevented from being higher than a voltage determined by the set voltage Vref1. The overvoltage protecting circuit 20 is not operated while the cold-cathode tube fluorescent tube 17 is lighting.

Furthermore, a comparison circuit 16 is supplied with a voltage generated at both ends of the feedback resistor 18 due to a current flowing through the series circuit composed of the cold-cathode fluorescent tube 17 and the feedback resistor 18. The comparison circuit 16 compares a feedback voltage with a set voltage Vref2, and sends a signal to the oscillation control circuit 14 so that a substantially constant current flows through the cold-cathode fluorescent tube 17. The oscillation control circuit 14 applies an output signal to the variable oscillation circuit 13 so that the variable oscillation circuit 13 oscillates at a frequency in accordance with output signals from the comparison circuits 15 and 16. The comparison circuit 16 is not operated before the commencement of lighting of the cold-cathode fluorescent tube 17.

Thus, the cold-cathode fluorescent tube 17 lights up stably. In the case where the cold-cathode fluorescent tube 17 is driven by a method as described here, even though a resonance frequency is varied depending upon the temperature, a driving frequency follows the resonance frequency automatically.

Because of the above configuration of a piezoelectric inverter, a current flowing through the cold-cathode fluorescent tube can be controlled to be constant. Furthermore, the emission brightness of the cold-cathode fluorescent tube is controlled to be constant by setting an output current and an output voltage of the piezoelectric transformer to be constant or by detecting a current flowing through a reflector.

In the conventional piezoelectric inverter as described above, in the case where the cold-cathode fluorescent tube is lit up, a resistor is connected to the side of the cold-cathode fluorescent tube close to the ground, a voltage corresponding to a tube current is detected, and a driving frequency is varied, whereby the emission brightness of the cold-cathode fluorescent tube is controlled. As a result, there is a possibility that driving is performed apart from a resonance frequency (herein, this refers to a frequency at which a voltage step-up ratio becomes maximum), which causes a decrease in efficiency or the like.

Furthermore, in order to solve the above-mentioned problem, it is required to add a circuit for regulating a power supply voltage, which hinders the miniaturization of an inverter circuit.

For the above reasons, the following problems need to be solved in terms of the miniaturization and decreased thickness of liquid crystal equipment.

(1) Reduction in the number of components and saving of space.

(2) Reduction in driving waveform distortion with respect to a harmonic component.

(3) Reduction in distortion caused by a large amplitude operation at the commencement of lighting.

(4) High-efficiency operation during lighting.

Regarding (1), a conventional piezoelectric inverter is composed of analog circuits, so that the number of components is reduced by an analog IC. However, when a driving circuit is composed of one chip, a small package cannot be used due to the limitation of the number of pins; therefore, its effect is small.

A method for composing a driving circuit with a digital LSI of a liquid crystal controller as one chip is considered. In this case, it is desirable that digital control is performed in the piezoelectric inverter.

However, in order to digitize the piezoelectric inverter, a clock with a high frequency is required so as to ensure the frequency precision required for controlling the piezoelectric transformer. This necessitates a high frequency resolution in a system controlling an output power with a driving frequency of the piezoelectric transformer as in the prior art. Because of this, an IC operated at a high clock frequency as described above is required.

Regarding (2), in the conventional analog circuit, driving is conducted in such a manner that a signal with a rectangular waveform of a small signal is amplified in an electric power by a switching element, a low-pass filter is composed of an inductor L and a primary side capacitor C01 of a piezoelectric transformer, and a substantially sine wave is input to the piezoelectric transformer. The low-pass filter prevents a driving waveform containing a large amount of harmonic signals from being input. However, harmonic components cannot be removed completely, and due to the sweep of a frequency, the harmonic of a driving frequency is matched with a vibration mode of the piezoelectric transformer during light-adjustment control of a cold-cathode fluorescent tube. Consequently, waveform distortion of an input/output voltage and harmonic distortion of a piezoelectric transformer occur.

Regarding (3), for the purpose of the miniaturization and decrease in thickness of an inverter, the miniaturization and decrease in thickness of a piezoelectric transformer are required. However, a high voltage is required at the commencement of lighting of a cold-cathode fluorescent tube, and a large amplitude operation also is required in the piezoelectric transformer so as to output the high voltage. Due to the problem of distortion caused by the large amplitude operation, there is a limitation to the miniaturization of the piezoelectric transformer. For example, JP 2001-136749 A discloses a piezoelectric inverter driving apparatus for controlling the frequency of a driving signal of a piezoelectric transformer at the commencement of lighting (during startup) of a cold-cathode fluorescent tube and controlling the phase difference of a driving signal during steady lighting. Such an apparatus controls a frequency during startup. Therefore, in the case where a driving frequency is varied with the same step width as that of DF0', DF1', and DF2' as represented by TP101' in FIG. 9, an output voltage Vout of the piezoelectric transformer approaches a peak of TP101', and a change in the output voltage Vout with respect to one step width of frequency control becomes very large, i.e., $\Delta Vout1$ and $\Delta Vout2$ (for example, several tens of times change amount of a voltage step-up ratio). This causes a large amplitude operation, making it difficult to miniaturize the piezoelectric transformer.

Regarding (4), the efficiency of a piezoelectric transformer becomes maximum in the vicinity of a resonance frequency due to its operation principle; however, the efficiency is decreased with distance from a resonance frequency. It is effective that the piezoelectric transformer is driven at a frequency closer to a resonance frequency as much as possible. For example, JP 10(1998)-178784 A proposes a method for performing PWM control with respect to an input voltage so that the piezoelectric transformer can be driven in the vicinity of a resonance frequency. However, in the case where waveform processing is performed with an input voltage, as described in (2), waveform distortion occurs due to a harmonic component, and it becomes difficult to reduce waveform distortion during steady operation.

Furthermore, JP 7(1995)-39144 A and JP 7(1995)-59338 A propose methods for controlling an input voltage of a piezoelectric transformer, using two switching elements. However, according to the methods disclosed therein, a voltage applied to the piezoelectric transformer is a half of an input voltage in terms of an AC voltage, so that it is required to step-up a voltage.

SUMMARY OF THE INVENTION

Therefore, with the foregoing in mind, it is an object of the present invention to provide a driving circuit for a piezoelectric transformer that is capable of controlling the driving of a piezoelectric transformer with high efficiency and low distortion by digital control requiring no high frequency precision and being miniaturized; a backlight apparatus to which the driving circuit for a piezoelectric transformer is applied; a liquid crystal display apparatus in which the backlight apparatus is mounted; and a liquid crystal monitor and TV using the liquid crystal display apparatus.

In order to achieve the above-mentioned object, a first driving circuit for a piezoelectric transformer of the present invention includes: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion generating the first and second driving signals; a second driving portion generating the third and fourth driving signals; a feedback portion returning a voltage signal generated at the current detecting resistor after rectifying it; and a control portion receiving the voltage signal from the feedback portion to output first and second control signals respectively to the first and second driving portions. The control portion includes: an A/D converter converting the voltage signal from the feedback portion to current detecting data having a digital value; a comparator comparing the current detecting data from the A/D converter with reference data; and a phase controller changing a phase difference between the first and second control signals based on a comparison result from the comparator. At a commencement of lighting of the cold-cathode fluorescent tube, the control portion fixes frequencies of the first and second control signals at a predetermined frequency, and controls the phase difference between the first and second control signals so that an output power of the piezoelectric transformer becomes from substantially zero to a predetermined output power, and after lighting of the cold-cathode fluorescent tube, the control portion controls the phase difference between the first and second control signals so that the current detecting data substantially is matched with the reference data.

In the first driving circuit for a piezoelectric transformer, it is preferable that the control portion controls the phase difference between the first and second control signals at a phase sweep speed in at least two stages during startup of the driving circuit.

In this case, it is preferable that the control portion sweeps at a first phase sweep speed until the cold-cathode fluorescent tube lights up half, and at a second phase sweep speed until emission brightness of the cold-cathode fluorescent tube reaches a set value. Herein, the first phase sweep speed is higher than the second phase sweep speed.

In the first driving circuit for a piezoelectric transformer, it is preferable that the control portion changes a change ratio of a phase difference to a time in accordance with an impedance of the cold-cathode fluorescent tube.

Furthermore, in the first driving circuit for a piezoelectric transformer, it is preferable that the control portion controls brightness of the cold-cathode fluorescent tube by changing the reference data.

In this case, the control portion turns on/off the cold-cathode fluorescent tube alternately to perform burst driving. In this case, it is preferable that the control portion controls brightness of the cold-cathode fluorescent tube by changing a ratio between a set time of first reference data and a set time of second reference data, or by changing a change ratio from first reference data to second reference data.

In this case, it is preferable that a switching frequency of the first reference data and the second reference data is 1 kHz or less.

In order to achieve the above-mentioned object, a second driving circuit for a piezoelectric transformer of the present invention includes: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion generating the first and second driving signals; a second driving portion generating the third and fourth driving signals; a feedback portion returning a voltage signal generated at the current detecting resistor after rectifying it; and a control portion receiving the voltage signal from the feedback portion to output first and second control signals respectively to the first and second driving portions. The control portion includes an A/D converter converting the voltage signal from the feedback portion to current detecting data having a digital value; a comparator comparing the current detecting data from the A/D converter with first or second reference data; and a phase controller changing a phase difference between the first and second control signals based on a comparison result from the comparator. At a commencement of lighting of the cold-cathode fluorescent tube, the control portion fixes frequencies of the first and second control signals at a first frequency, and controls the phase difference between the first and second control signals so that an output power of the piezoelectric transformer changes from substantially zero to a predetermined output power, and when the current detecting data becomes the first reference data or more, the control portion fixes the frequencies of the first and second control signals at a second frequency, and controls the phase difference between the first and second control signals so that the current detecting data substantially is matched with the second reference data.

In the second driving circuit for a piezoelectric transformer, the first frequency is higher than the second frequency.

Furthermore, in the second driving circuit for a piezoelectric transformer, it is preferable that the control portion controls the phase difference between the first and second control signals fixed at the first frequency, at a phase sweep speed in at least two stages.

In this case, it is preferable that the control portion sweeps at a first phase sweep speed until the cold-cathode fluorescent tube lights up half, and at a second phase sweep speed until the current detecting data reaches the first reference data. Herein, the first phase sweep speed is higher than the second phase sweep speed.

Furthermore, in the second driving circuit for a piezoelectric transformer, in phase difference control of the first and second control signals fixed at the first frequency, when the current detecting data has not reached the first reference data within a predetermined time, the control portion changes the frequencies of the first and second control signals to a frequency lower than the first frequency and higher than a resonance frequency under a no-load condition of the piezoelectric transformer.

In this case, it is preferable that the control portion changes the frequencies by a predetermined number of times.

Furthermore, it is preferable that the control portion decreases a change width of the frequencies as they approach the resonance frequency of the piezoelectric transformer.

In the second driving circuit for a piezoelectric transformer, it is preferable that the first frequency is higher than a resonance frequency of the piezoelectric transformer when the cold-cathode fluorescent tube is not lighting, and the second frequency is higher than a resonance frequency of the piezoelectric transformer when the cold-cathode fluorescent tube is lighting and lower then the first frequency.

Furthermore, in the second driving circuit for a piezoelectric transformer, it is preferable that the control portion changes a change ratio of a phase difference to a time in accordance with an impedance of the cold-cathode fluorescent tube.

Furthermore, in the second driving circuit for a piezoelectric transformer, it is preferable that the control portion controls the brightness of the cold-cathode fluorescent tube by changing the second reference data.

In this case, the control portion turns on/off the cold-cathode fluorescent tube alternately to perform burst driving. In this case, it is preferable that the control portion controls the brightness of the cold-cathode fluorescent tube by changing a ratio between a set time of the first reference data and a set time of the second reference data, or by changing a change ratio from the first reference data to the second reference data.

In this case, it is preferable that a switching frequency of the first reference data and the second reference data is 1 kHz or less.

In order to achieve the above-mentioned object, a third driving circuit for a piezoelectric transformer of the present invention includes: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion generating the first and second driving signals; a second driving portion generating the third and fourth driving signals; a feedback portion returning a voltage signal generated at the current detecting resistor after rectifying it; and a control portion receiving the voltage signal from the feedback portion to output first and second control signals respectively to the first and second driving portions. The control portion includes an A/D converter converting the voltage signal from the feedback portion to current detecting data having a digital value; a comparator comparing the current detecting data from the A/D converter with first or second reference data; and a phase controller changing a phase difference between the first and second control signals based on a comparison result from the comparator. At a commencement of lighting of the cold-cathode fluorescent tube, the control portion fixes the phase difference between the first and second control signals, and sweeps the frequencies of the first and second control signals from a start frequency to a stop frequency, and when the current detecting data becomes the first reference data or more during frequency sweep, the control portion performs the frequency sweep until the stop frequency is reached, and simultaneously controls the phase difference between the first and second control signals so that the current detecting data substantially is matched with the second reference data.

In the third driving circuit for a piezoelectric transformer, it is preferable that the control portion performs the frequency sweep at a sweep speed in at least two stages.

In this case, it is preferable that after performing the frequency sweep at the first sweep speed, the control portion sets a time interval for changing the frequencies to be constant and sets a change width of the frequencies to be smaller than the first sweep speed, and performs the frequency sweep at a second sweep speed.

In the third driving circuit for a piezoelectric transformer, it is preferable that the control portion changes a change ratio of a phase difference to a time in accordance with an impedance of the cold-cathode fluorescent tube.

Furthermore, in the third driving circuit for a piezoelectric transformer, it is preferable that the control portion controls the brightness of the cold-cathode fluorescent tube by changing the second reference data.

In this case, the control portion turns on/off the cold-cathode fluorescent tube alternately to perform burst driving. In this case, it is preferable that the control portion controls the brightness of the cold-cathode fluorescent tube by changing a ratio between a set time of the first reference data and a set time of the second reference data, or by changing a change ratio from the first reference data to the second reference data.

In this case, it is preferable that a switching frequency of the first reference data and the second reference data is 1 kHz or less.

In order to achieve the above-mentioned object, a fourth driving circuit for a piezoelectric transformer of the present invention includes: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion generating the first and second driving signals; a second driving portion generating the third and fourth driving signals; a feedback portion returning a voltage signal generated at the current detecting resistor after rectifying it; and a control portion receiving the voltage signal from the feedback portion to output first and second control signals respectively to the first and second driving portions. The control portion includes: an A/D converter converting the voltage signal from the feedback portion to current detecting data having a digital value; a comparator comparing the current detecting data from the A/D converter with first or second reference data; and a phase controller changing a phase difference between the first and second control signals based on a comparison result from the comparator. At a commencement of lighting of the cold-cathode fluorescent tube, the control portion fixes the phase difference between the first and second control signals, and sweeps the frequencies of the first and second control signals from a start frequency to a stop frequency, and when the current detecting data becomes the first reference data or more during frequency sweep, the control portion fixes frequencies of the first and second control signals at a predetermined frequency, and controls the phase difference between the first and second control signals so that the current detecting data substantially is matched with the second reference data.

In the fourth driving circuit for a piezoelectric transformer, it is preferable that the control portion performs driving control in a first vibration mode with a higher order of the piezoelectric transformer until the current detecting data reaches the first reference data, and thereafter, performs the driving control in a second vibration mode with a lower order than the first vibration mode.

Furthermore, in the fourth driving circuit for a piezoelectric transformer, it is preferable that the control portion changes a change ratio of a phase difference to a time in accordance with an impedance of the cold-cathode fluorescent tube.

Furthermore, in the fourth driving circuit for a piezoelectric transformer, it is preferable that the control portion controls the brightness of the cold-cathode fluorescent tube by changing the second reference data.

In this case, the control portion turns on/off the cold-cathode fluorescent tube alternately to perform burst driving. In this case, it is preferable that the control portion controls the brightness of the cold-cathode fluorescent tube by changing a ratio between a set time of the first reference data and a set time of the second reference data, or by changing a change ratio from the first reference data to the second reference data.

In this case, it is preferable that a switching frequency of the first reference data and the second reference data is 1 kHz or less.

In the first to fourth driving circuits for a piezoelectric transformer, it is preferable that the control potion sets the frequencies of the first and second control signals and the phase difference therebetween so that a frequency component corresponding to a vibration mode with a frequency higher than a desired vibration mode of the piezoelectric transformer is not included.

Furthermore, in the first to fourth driving circuits for a piezoelectric transformer, it is preferable that the third series connection body includes a capacitor connected between the pair of input electrodes of the piezoelectric transformer.

Furthermore, in the first to fourth driving circuits for a piezoelectric transformer, it is preferable that the control portion is controlled by a microcomputer.

In this case, it is preferable that the control potion is mounted in one chip together with the microcomputer.

In order to achieve the above-mentioned object, a fifth driving circuit for a piezoelectric transformer of the present invention includes: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion generating the first and second driving signals; a second driving portion generating the third and fourth driving signals; a feedback portion returning a voltage signal generated at the current detecting resistor as a current detecting value after rectifying it; a comparator comparing the current detecting value from the feedback portion with a reference voltage value; and a control portion receiving a comparison result from the comparator to output first and second control signals respectively to the first and second driving portions. The control portion includes a phase controller changing a phase difference between the first and second control signals based on the comparison result from the comparator. At a commencement of lighting of the cold-cathode fluorescent tube, the control portion fixes frequencies of the first and second control signals at a predetermined frequency, and controls the phase difference between the first and second control signals so that an output power of the piezoelectric transformer becomes from substantially zero to a predetermined output power, and after lighting of the cold-cathode fluorescent tube, the control portion controls the phase difference between the first and second control signals so that the current detecting value substantially is matched with the reference voltage value.

In order to achieve the above-mentioned object, a sixth driving circuit for a piezoelectric transformer of the present invention includes: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion generating the first and second driving signals; a second driving portion generating the third and fourth driving signals; a feedback portion returning a voltage signal generated at the current detecting resistor as a current detecting value after rectifying it; a first comparator comparing the current detecting value from the feedback portion with a first reference voltage value; a second comparator comparing the current detecting value from the feedback portion with a second reference voltage value; and a control portion receiving a comparison result from the first or second comparator to output first and second control signals respectively to the first and second driving portions. The control portion includes a phase controller changing a phase difference between the first and second control signals based on the comparison result from the first or second comparator. At a commencement of lighting of the cold-cathode fluorescent tube, the control portion fixes frequencies of the first and second control signals at a first frequency, and controls the phase difference between the first and second control signals so that an output power of the piezoelectric transformer becomes from substantially zero to a predetermined output power, and when the current detecting value becomes the first reference data or more, the control portion fixes the frequencies of the first and second control signals at a second frequency, and controls the phase difference between the first and second control signals so that the current detecting value substantially is matched with the second reference voltage value.

In order to achieve the above-mentioned object, a seventh driving circuit for a piezoelectric transformer of the present invention includes: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion generating the first and second driving signals; a second driving portion generating the third and fourth driving signals; a feedback portion returning a voltage signal generated at the current detecting resistor as a current detecting value after rectifying it; a first comparator comparing the current detecting value from the feedback portion with a first reference voltage value; a second comparator comparing the current detecting value from the feedback portion with a second reference voltage value; and a control portion receiving a comparison result from the first or second comparator to output first and second control signals respectively to the first and second driving portions. The control portion includes a phase controller changing a phase difference between the first and second control signals based on the comparison result from the first or second comparator. At a commencement of lighting of the cold-cathode fluorescent tube, the control portion fixes the phase difference between the first and second control signals, and sweeps the frequencies of the first and second control signals from a start frequency to a stop frequency, and when the current detecting value becomes the first reference voltage value or more during frequency sweep, the control portion performs the frequency sweep until the stop frequency is reached, and simultaneously controls the phase difference between the first and second control signals so that the current detecting value substantially is matched with the second reference voltage value.

In order to achieve the above-mentioned object, an eighth driving circuit for a piezoelectric transformer of the present invention includes: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion generating the first and second driving signals; a second driving portion generating the third and fourth driving signals; a feedback portion returning a voltage signal generated at the current detecting resistor as a current detecting value after rectifying it; a first comparator comparing the current detecting value from the feedback portion with a first reference voltage value; a second comparator comparing the current detecting value from the feedback portion with a second reference voltage value; and a control portion receiving a comparison result from the first or second comparator to output first and second control signals respectively to the first and second driving portions. The control portion includes a phase controller changing a phase difference between the first and second control signals based on the comparison result from the first or second comparator. At a commencement of lighting of the cold-cathode fluorescent tube, the control portion fixes the phase difference between the first and second control signals, and sweeps the frequencies of the first and second control signals from a start frequency to a stop frequency, and when the current detecting value becomes the first reference voltage value or more during frequency sweep, the control portion fixes the frequencies of the first and second control signals at a predetermined frequency, and controls the phase difference between the first and second control signals so that the current detecting value substantially is matched with the second reference voltage value.

In order to achieve the above-mentioned object, a first method for driving a piezoelectric transformer of the present invention uses: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion receiving a first control signal to generate the first and second driving signals; a second driving portion receiving a second control signal to generate the third and fourth driving signals; and a feedback portion returning a voltage signal generated at the current detecting resistor after rectifying it. The method includes, at a commencement of lighting of the cold-cathode fluorescent tube, fixing frequencies of the first and second control signals at a predetermined frequency; controlling the phase difference between the first and second control signals so that an output power of the piezoelectric transformer becomes from substantially zero to a predetermined output power; after lighting of the cold-cathode fluorescent tube, comparing current detecting data corresponding to the voltage signal from the feedback portion with reference data; and controlling the phase difference between the first and second control signals so that the current detecting data substantially is matched with the reference data.

In order to achieve the above-mentioned object, a second method for driving a piezoelectric transformer of the present invention uses: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion receiving a first control signal to generate the first and second driving signals; a second driving portion receiving a second control signal to generate the third and fourth driving signals; and a feedback portion returning a voltage signal generated at the current detecting resistor after rectifying it. The method including: at a commencement of lighting of the cold-cathode fluorescent tube, fixing frequencies of the first and second control signals at a first frequency; controlling the phase difference between the first and second control signals so that an output power of the piezoelectric transformer becomes from substantially zero to a predetermined output power; comparing current detecting data corresponding to the voltage signal from the feedback portion with first reference data; when the current detecting data becomes the first reference data or more, fixing the frequencies of the first and second control signals at a second frequency; comparing the current detecting data with second reference data; and controlling the phase difference between the first and second control signals so that the current detecting data substantially is matched with the second reference data.

In order to achieve the above-mentioned object, a third method for driving a piezoelectric transformer of the present invention uses: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion receiving a first control signal to generate the first and second driving signals; a second driving portion receiving a second control signal to generate the third and fourth driving signals; and a feedback portion returning a voltage signal generated at the current detecting resistor after rectifying it. The method includes, at a commencement of lighting of the cold-cathode fluorescent tube, fixing a phase difference between the first and second control signals; sweeping frequencies of the first and second control signals from a start frequency to a stop frequency; during frequency sweep, comparing current detecting data corresponding to the voltage signal from the feedback portion with first reference data; when the current detecting data becomes the first reference data or more during the frequency sweep, performing the frequency sweep until the stop frequency is reached; comparing the current detecting data with second reference data; and controlling the phase difference between the first and second control signals so that the current detecting data substantially is matched with the second reference data.

In order to achieve the above-mentioned object, a fourth method for driving a piezoelectric transformer of the present invention uses: a first series connection body connected to both terminals of a DC power source, in which first and second switching members are turned on/off alternately by first and second driving signals and are connected in series; a second series connection body connected in parallel with the first series connection body, in which third and fourth switching members are turned on/off alternately by third and fourth driving signals respectively having the same frequency and duty ratio as those of the first and second driving signals and are connected in series; a piezoelectric transformer outputting a voltage, which is input from a primary side electrode, from a secondary side electrode after stepping-up or down the voltage by using a piezoelectric effect; a third series connection body connected between a connection point of each switching member of the first series connection body and a connection point of each switching member of the second series connection body, including an inductor and a pair of input electrodes of the piezoelectric transformer; a fourth series connection body connected between a pair of output electrodes of the piezoelectric transformer, in which a cold-cathode fluorescent tube and a current detecting resistor are connected in series; a first driving portion receiving a first control signal to generate the first and second driving signals; a second driving portion receiving a second control signal to generate the third and fourth driving signals; and a feedback portion returning a voltage signal generated at the current detecting resistor after rectifying it. The method includes, at a commencement of lighting of the cold-cathode fluorescent tube, fixing a phase difference between the first and second control signals; sweeping frequencies of the first and second control signals from a start frequency to a stop frequency; during frequency sweep, comparing current detecting data corresponding to the voltage signal from the feedback portion with first reference data; when the current detecting data becomes the first reference data or more during the frequency sweep, fixing the frequencies of the first and second control signals at a predetermined frequency; comparing the current detecting data with second reference data; and controlling the phase difference between the first and second control signals so that the current detecting data substantially is matched with the second reference data.

In order to achieve the above-mentioned object, a backlight apparatus of the present invention has any one of the first to fourth driving circuits for a piezoelectric transformer and is composed so that a cold-cathode fluorescent tube illuminates an object to be illuminated from a back surface.

In order to achieve the above-mentioned object, a liquid crystal display apparatus of the present invention has the backlight apparatus of the present invention, wherein the object to be illuminated is a liquid crystal panel.

In order to achieve the above-mentioned object, a liquid crystal monitor of the present invention is provided with the liquid crystal display apparatus of the present invention.

In order to achieve the above-mentioned object, a liquid crystal TV of the present invention is provided with the liquid crystal display apparatus of the present invention.

According to the above configuration, for example, a digital controller of a driving circuit for a piezoelectric transformer can be integrated with a microcomputer for controlling liquid crystal. Consequently, the piezoelectric transformer can be controlled digitally, and the driving circuit can be miniaturized (number of parts is reduced). Furthermore, by driving the piezoelectric transformer at a fixed frequency, the piezoelectric transformer can be driven at a frequency with a good efficiency and in a sine wave. Therefore, a loss caused by the piezoelectric transformer can be reduced.

Furthermore, by setting the driving frequency of the piezoelectric transformer so as not to include higher order components of another vibration mode and a desired vibration mode in harmonics, waveform distortion of a voltage can be reduced.

Furthermore, in the case of another vibration mode, by setting the phase difference of driving control signals so as not to include a frequency component of the another vibration mode, the degree of freedom in setting of a frequency is enhanced.

Furthermore, by driving at a single frequency, a reference clock of a high frequency is not required for a microcomputer for control. Thus, the effect thereof is very high in terms of a practical use.

Furthermore, by changing the vibration mode of the piezoelectric transformer at the commencement of lighting and during steady lighting, driving taking advantage of the respective features is made possible, and an inverter circuit can be miniaturized easily.

Furthermore, by replacing the A/D converter and the comparator constituting the digital controller by an external comparator, low-speed A/D converter and comparator are not necessary, which results in a high-speed operation and a low cost.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings.

Embodiment 1

Figure 1:
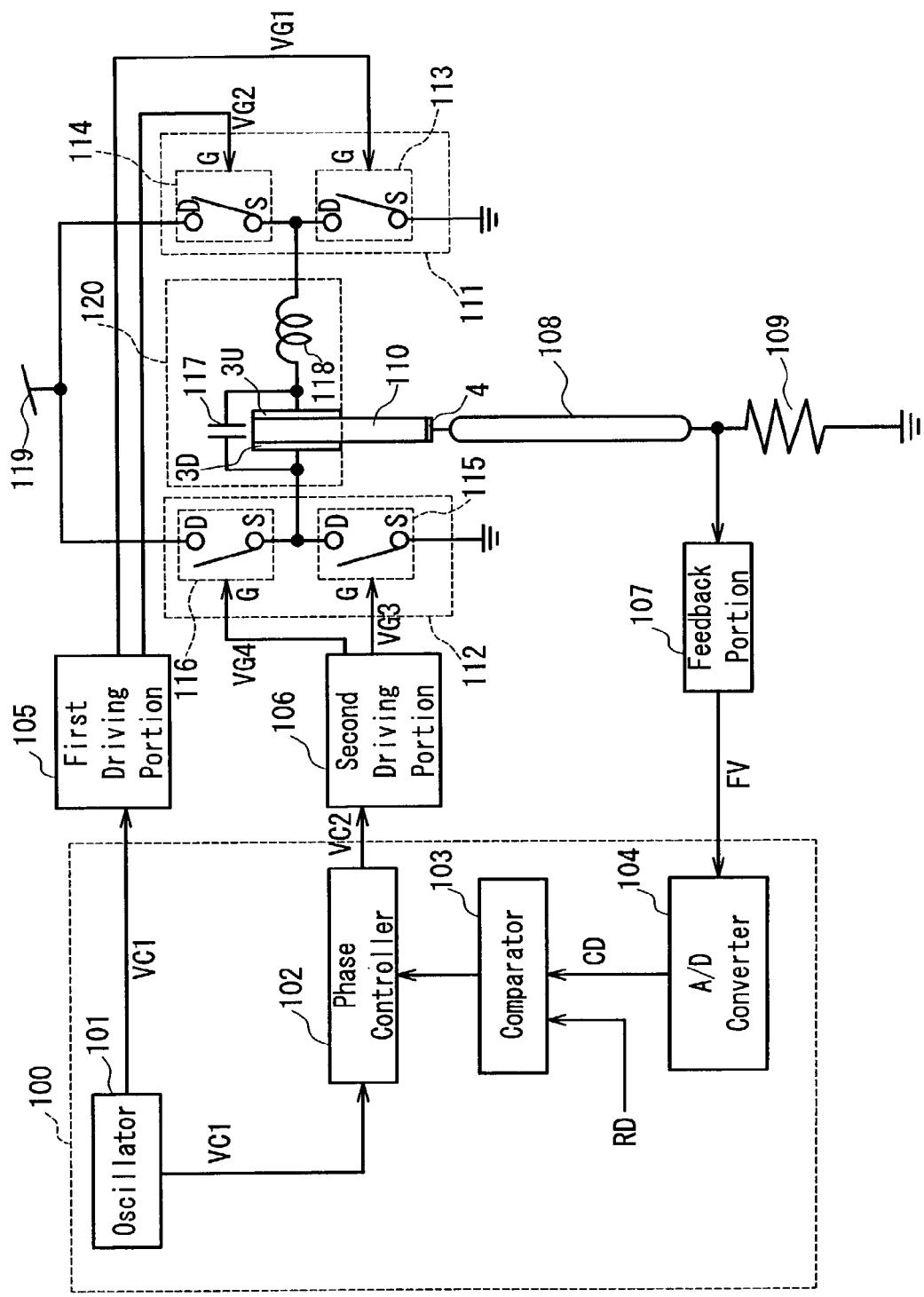
FIG. 1 is a block diagram showing one exemplary configuration of a driving circuit for a piezoelectric transformer of Embodiment 1 according to the present invention.

FIG. 1 is a block diagram showing an exemplary configuration of a driving circuit for a piezoelectric transformer of Embodiment 1 according to the present invention. The piezoelectric transformer used in the present embodiment has the same configuration and operation as those shown in the prior art, so that its description will be omitted here.

In FIG. 1, a digital controller 100 is composed as a part of microcomputer (hereinafter, abbreviated as a "μCOM"), and includes an oscillator 101, a phase controller 102, a comparator 103, and an A/D converter 104. The oscillator 101 generates an AC driving signal driving a piezoelectric transformer 110. An output signal from the oscillator 101 is input directly to a first driving portion 105 and is input to a second driving portion 106 via the phase controller 102. The phase controller 102 receives an output signal from the comparator 103 and outputs an AC signal, which has the same frequency as and a different phase from those of an AC signal to the first driving portion 105, to the second driving portion 106.

The first driving portion 105 outputs signals (VG1, VG2) for controlling the driving of a first series connection body 111, in which a drain terminal (D) of a first MOSFET switch 113 is connected to a source terminal (S) of a second MOSFET switch 114, to gate terminals (G) of the respective switches. The second driving portion 106 outputs signals (VG3, VG4) for controlling the driving of a second series connection body 112, in which a drain terminal (D) of a third MOSFET switch 115 is connected to a source terminal (S) of a fourth MOSFET switch 116, to gate terminals (G) of the respective switches. In the first series connection body 111, the source terminal (S) of the first MOSFET switch 113 is supplied with a ground potential, and the drain terminal (D) of the second MOSFET switch 114 is supplied with a power supply potential 119. Similarly, in the second series connection body 112, the source terminal (S) of the third MOSFET switch 115 is supplied with a ground potential, and the drain terminal (D) of the fourth MOSFET switch 116 is supplied with a power supply potential 119.

Thus, four MOSFETS 113, 114, 115, and 116 are connected between the power supply potential 119 and the ground potential in an H-bridge configuration, and are switched on/off by the driving signals VG1, VG2 from the first driving portion 105 and the driving signals VG3, VG4 from the second driving portion 106.

A third series connection body in which an inductor 118 is connected in series with a capacitor 117 connected between primary side electrodes 3U and 3D of the piezoelectric transformer 110 is connected between a connection point between the MOSFETs 113 and 114 of the first series connection body 111 and a connection point between the MOSFETs 115 and 116 of the second series connection body 112. The inductor 118, the capacitor 117, and an input capacitor of the piezoelectric transformer 110 form a resonator 120.

A voltage input to the primary side electrodes 3U and 3D of the piezoelectric transformer 110 is output from a secondary side electrode 4 as a high voltage due to a piezoelectric effect.

The secondary side electrode 4 of the piezoelectric transformer 110 is connected to a fourth series connection body in which a cold-cathode fluorescent tube 108 and a current detecting resistor 109 are connected. The high voltage output from the secondary side electrode 4 is applied to the fourth series connection body, i.e., the cold-cathode fluorescent tube 108 and the current detecting resistor 109.

An AC voltage generated in the current detecting resistor 109 is rectified by a feedback portion 107 and input to an A/D converter 104 in the digital controller 100. Current detecting data CD output from the A/D converter 104 is input to the comparator 103. The comparator 103 compares the current detecting data CD from the A/D converter 104 with reference data RD. When the current detecting data CD is smaller than the reference data RD, the comparator 103 sends a signal that allows an input power to the piezoelectric transformer 110 to be large to the phase controller 102. When the current detecting data CD is larger than the standard data RD, the comparator 103 sends a signal that allows an input power to the piezoelectric transformer 110 to be small to the phase controller 102.

The phase controller 102 gives a signal to the second driving portion 106 in accordance with an output signal from the comparator 103, thereby controlling the input power to the piezoelectric transformer 110.

Figure 2:
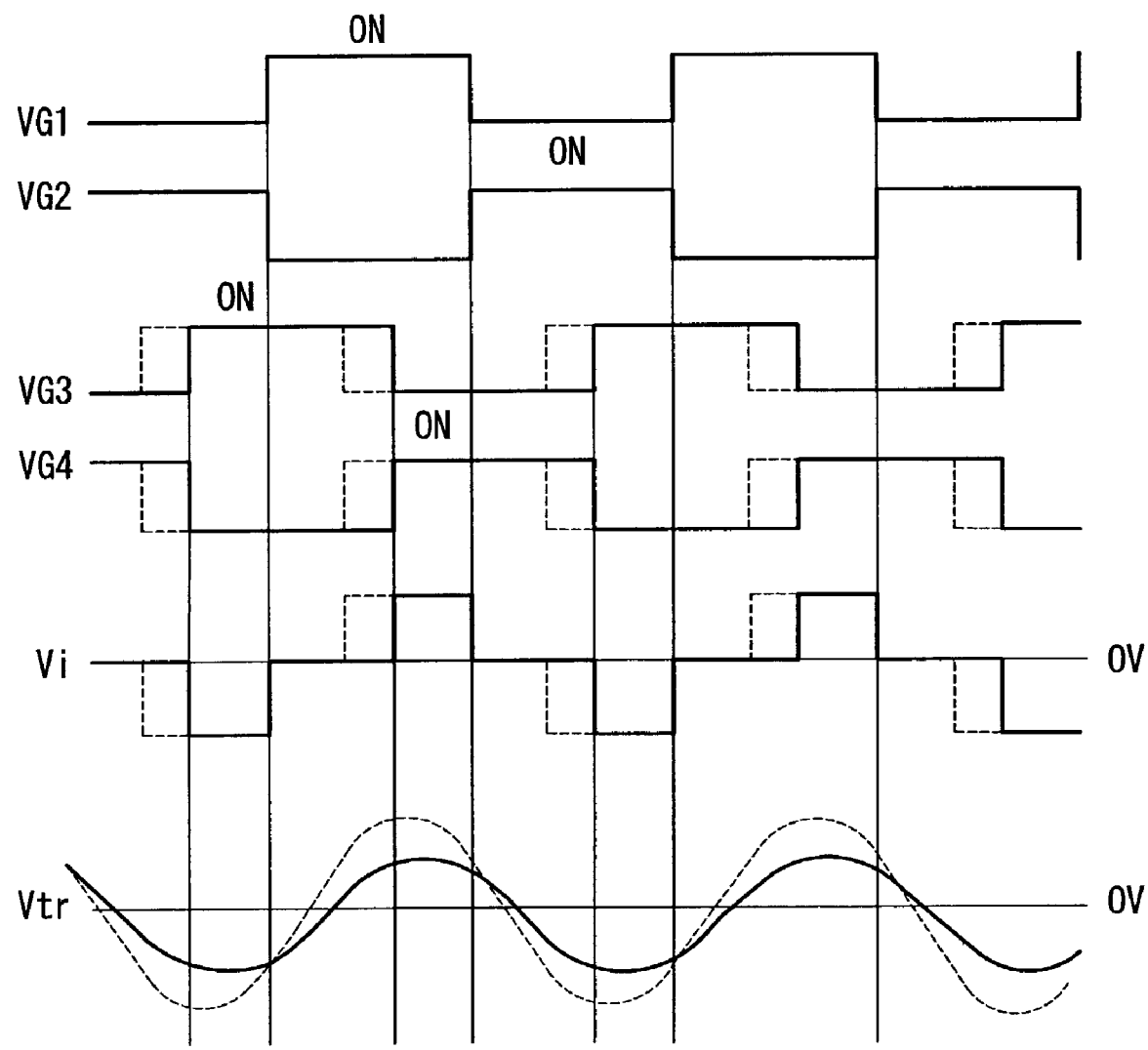
FIG. 2 shows a signal waveform of each portion in Embodiment 1.

Next, an operation of a driving circuit for a piezoelectric transformer configured as described above will be described with reference to FIG. 2. FIG. 2 is a timing chart showing a signal waveform of each portion.

In FIG. 2, VG1 to VG4 respectively denote control signals of the MOSFET switches 113, 114, 115, and 116 in FIG. 1. Vi denotes a voltage at both ends of the resonator 120 in FIG. 1, and Vtr denotes a voltage at both ends of the primary side electrodes 3U and 3D of the piezoelectric transformer 110. The first MOSFET switch 113 and the second MOSFET switch 114 are driven so as to be turned on/off alternately at a predetermined on-time ratio by the control signals VG1 and VG2 from the first driving portion 105. On the other hand, the third MOSFET switch 115 and the fourth MOSFET switch 116 are driven so as to be turned on/off alternately at the same on-time ratio as that of the first MOSFET switch 113 and the second MOSFET switch 114 and with a time difference therefrom by the control signals VG3 and VG4 from the second driving portion 106.

In the control signals VG3 and VG4 in FIG. 2, waveforms represented by solid lines respectively are waveforms when the brightness of the cold-cathode fluorescent tube 108 is reduced or when a high input voltage is applied. At this time, by decreasing the phase difference between the control signals VG1, VG2 and the control signals VG3, VG4, the input power Vtr to the piezoelectric transformer 110 is decreased. Furthermore, in the control signals VG3 and VG4, waveforms represented by broken lines respectively are waveforms when the brightness of the cold-cathode fluorescent tube 108 is increased or when a low input voltage is applied. At this time, by increasing the phase difference between the control signals VG1, VG2 and the control signals VG3, VG4, the input power Vtr to the piezoelectric transformer 110 is increased.

Thus, by controlling the phase difference of the on/off of the MOSFET switches 113, 114, 115, and 116, the resonator 120 is supplied with a voltage denoted with Vi. Since a switching frequency is set to be close to a resonance frequency fr of the resonator 120, the input voltage Vtr to the piezoelectric transformer 110 has a waveform in a sine wave.

Assuming that an inductance of the inductor 118 is L, an input capacitance of the piezoelectric transformer 110 is Cp, and a capacitance of the capacitor 117 is C, the resonance frequency fr of the resonator 120 is represented by the following equation:

$$fr=1/(2\pi \times (L(Cp+C))^{1/2})$$

By performing the driving as described above, an input power to the piezoelectric transformer 110 can be controlled at a single frequency.

Figure 3A:
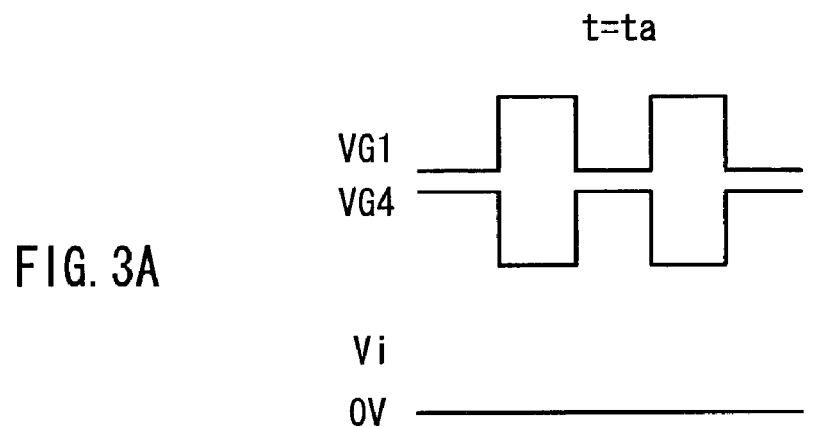
FIG. 3A shows a phase relationship between control signals VG1 and VG4 from the commencement of lighting to a time ta in Embodiment 1.
Figure 3B:
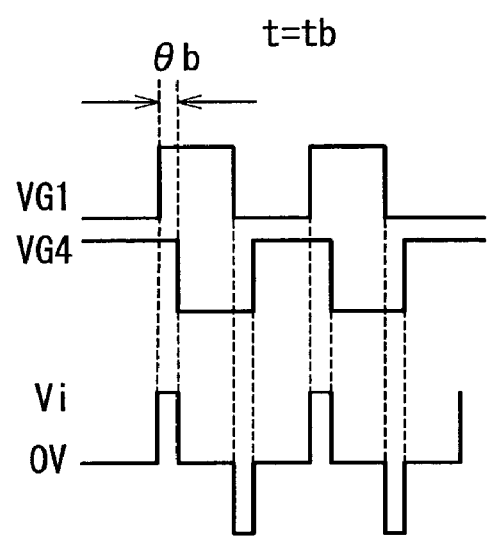
FIG. 3B shows a phase relationship between the control signals VG1 and VG4 from the commencement of lighting to a time tb in Embodiment 1.
Figure 3C:
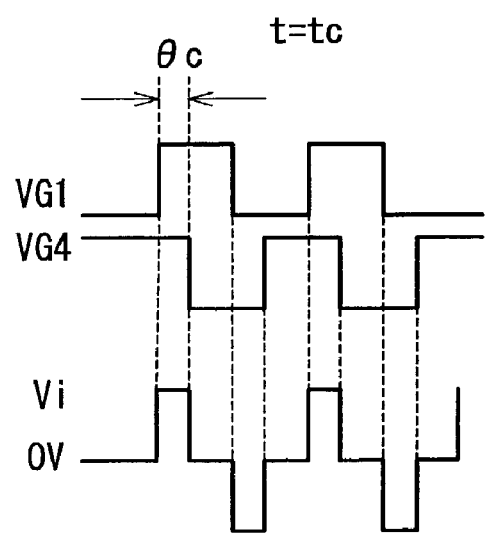
FIG. 3C shows a phase relationship between the control signals VG1 and VG4 from the commencement of lighting to a time tc in Embodiment 1.
Figure 3D:
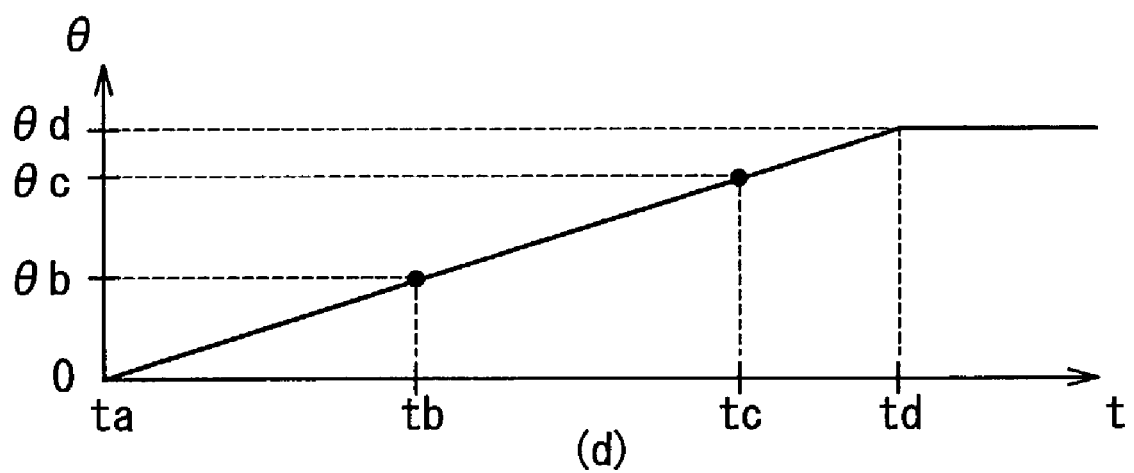
FIG. 3D shows a change in a phase difference with respect to a time in Embodiment 1.

First, an operation of the cold-cathode fluorescent tube 108 at the commencement of lighting will be described with reference to FIGS. 3A, 3B, 3C, and 3D. FIGS. 3A to 3C respectively show phase relationships between control signals VG1 and VG4 from the commencement of lighting to times ta, tb, and tc, and waveforms of a voltage Vi at the resonator 120. FIG. 3D shows a change of a phase difference with respect to a time.

When the driving circuit of the present embodiment is started up (time ta), the phase difference between the control signal VG1 (VG2) from the first driving portion 105 and the control signal VG4 (VG3) from the second driving portion 106 is set to be zero (FIG. 3A). Thereafter (time tb and time tc), the phase controller 102 varies the phase difference between the control signals VG1 and VG4 based on a signal from the feedback portion 107 so that a lighting start voltage and an electric power required for maintaining lighting can be output from the piezoelectric transformer 110 (phase difference θb in FIG. 3B, and phase difference θc in FIG. 3C). At this time, the driving frequency of the piezoelectric transformer is constant.

Next, the phase controller 102 supplies a control signal to the second driving portion 106 in accordance with an input voltage, and controls the phase difference between the control signals VG1 and VG4 to be constant (phase difference θd in FIG. 3D) so that the brightness of the cold-cathode fluorescent tube 108 becomes constant.

Figure 4:
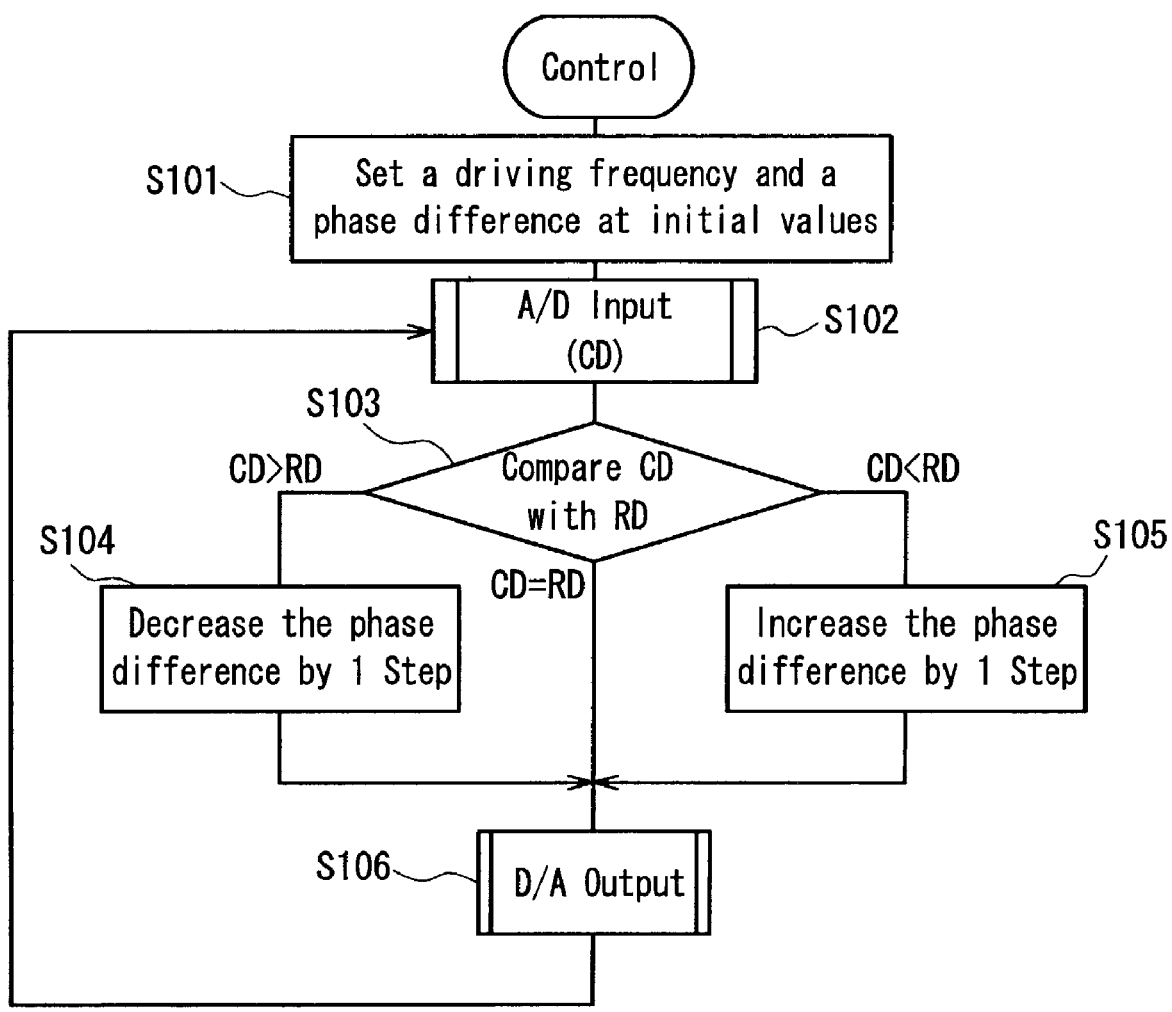
FIG. 4 is a flow chart showing an operation of a digital controller 100 in FIG. 1.

An operation of the digital controller 100 will be described with reference to FIG. 4. FIG. 4 is a flow chart showing an operation of the digital controller 100.

When the driving circuit is started up, the frequencies and phase differences of the control signals VG1 to VG4 are set to be initial values (S101). In the case of the present embodiment, the phase differences are set to be zero. However, when the output voltage from the piezoelectric transformer 110 is equal to or lower than a voltage at which the cold-cathode fluorescent tube 108 lights up, there is no problem even if the phase difference is not zero. First, a feedback voltage FV is input to the A/D converter 104 so as to convert the feedback voltage FV from an analog value to a digital value (CD) (S102). The comparator 103 compares the current detecting data CD after an A/D input with reference data RD (S103). When CD<RD, the phase controller 102 supplies a D/A output to the second driving portion 106 (S106) so that the phase differences of the control signals VG3 and VG4 with respect to the control signals VG1 and VG2 are increased by 1 Step (S105). On the other hand, when CD>RD as a result of the comparison in S103, the phase controller 102 supplies a D/A output to the second driving portion 106 (S106) so that the phase difference is decreased by 1 Step (S104). When CD=RD, the phase controller 102 supplies a D/A output to the second driving portion 106 (S106) so that the phase difference is not changed. Herein, 1 Step of a change in phase difference can be varied depending upon a reference clock of μCOM, its frequency division ratio, and the like.

Furthermore, in the phase control, before lighting of the cold-cathode fluorescent tube 108, the frequency characteristics of a voltage step-up ratio of the piezoelectric transformer 110 become very steep. Therefore, an output voltage is varied largely with respect to a change in an input voltage by the phase control. When the load of the piezoelectric transformer 110 is light (in particular, close to a no-load condition), it is desirable that 1 Step of a phase difference change is minimized.

Figure 5:
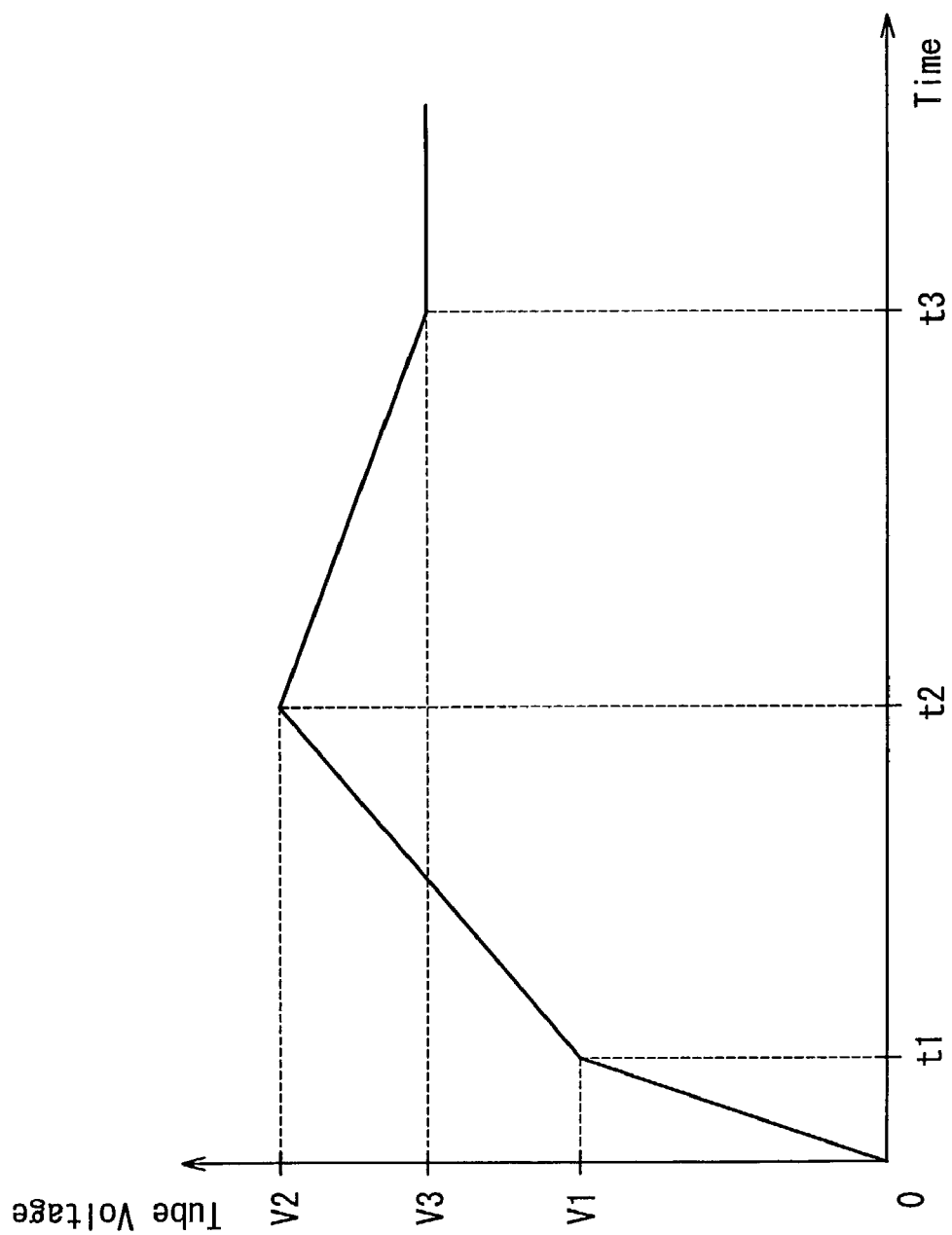
FIG. 5 shows a change of a voltage with time at the commencement of lighting of a cold-cathode fluorescent tube in Embodiment 1.

Furthermore, in the present embodiment, when the driving control as shown in FIG. 5 is conducted, a lighting start voltage can be decreased. FIG. 5 shows an envelope of a voltage applied to the cold-cathode fluorescent tube 108 during startup of the driving circuit. Hereinafter, a driving control method will be described with reference to FIG. 5.

First, during startup of the driving circuit, the control signal is set at a predetermined phase difference and driving frequency, and the output voltage is increased to V1 until time t1 by the phase control. V1 is a voltage at which the cold-cathode fluorescent tube 108 performs half-lighting. Herein, "half-lighting" refers to a state where light is emitted only from the vicinity of one electrode of the cold-cathode fluorescent tube. Thereafter, the phase difference is controlled to increase the output voltage of the piezoelectric transformer 110 to V2 until time t2 so that the cold-cathode fluorescent tube 108 lights up as a whole. At this time, time t2 is sufficiently larger than time t1. For example, time t1 is tens of µs, whereas time t2 is several ms. Because of this, the lighting start voltage can be decreased. After the cold-cathode fluorescent tube 108 lights up, the phase difference is controlled so as to obtain a predetermined brightness to reach a lighting maintaining voltage (V3) at time t3.

Figure 6:
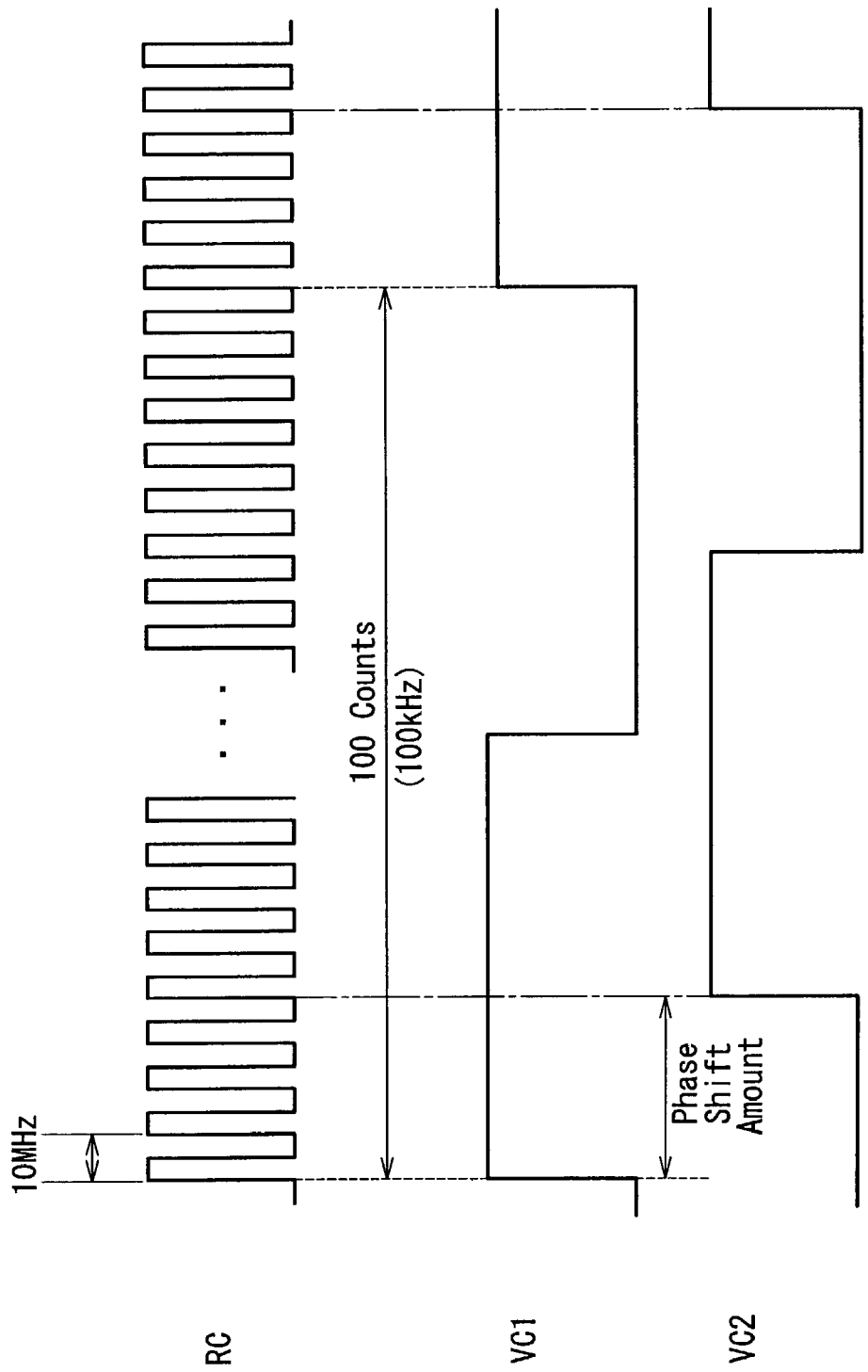
FIG. 6 is a view showing specific waveforms of a reference clock RC, and control signals VC1 and VC2 in Embodiment 1.

Based on the present embodiment, the piezoelectric transformer 110 was driven using µCOM operated at a clock of 10 MHz. The piezoelectric transformer 110 of a Rosen type configuration (length: 32 mm, width: 5 mm, thickness: 1.2 mm) was used. The resonance frequency (at which a voltage step-up ratio becomes maximum) of the piezoelectric transformer 110 at a time of lighting of the cold-cathode fluorescent tube was 98.6 kHz. Therefore, the oscillator 101 performs a D/A output using 100 counts of a reference clock RC (10 MHz) as a driving frequency. At this time, the output frequency is 100 kHz. Furthermore, the phase controller 102 controls a phase using a signal from the comparator 103 in such a manner that a D/A output signal VC2 to the second driving portion 106 is phase-shifted on 1 count basis of a reference clock with respect to a D/A output signal VC1 to the first driving portion 105. FIG. 6 shows the reference dock RC, the D/A output signal VC1 to the first driving portion 105, and the D/A output signal VC2 to the second driving portion 106.

The cold-cathode fluorescent tube 108 (φ: 3.0 mm, length: 200 mm) was used, and a current was set to be 4 mA. A voltage FV generated at the current detecting resistor 109 was rectified by the feedback portion 107, and input to the A/D converter 104 through a buffer circuit (not shown). The A/D converter 104 converts the feedback DC voltage FV to current detecting data CD having a digital value, and outputs it to the comparator 103. The comparator 103 compares the current detecting data CD with the reference data RD previously stored inside. When the current detecting data CD is smaller than the reference data RD, the comparator 103 outputs a signal to the phase controller 102 so as to increase the phase difference between the control signals VC1 and VC2. When the current detecting data CD is larger than the reference data RD, the comparator 103 outputs a signal to the phase controller 102 so as to decrease the phase difference between VC1 and VC2. The phase resolution at this time is 3.6 deg/1 Step.

In the present embodiment, at the commencement of lighting of the cold-cathode fluorescent tube, the phase difference between the first control signal VC1 and the second control signal VC2 is controlled so as to gradually increase an input voltage to the piezoelectric transformer. As represented by a curve TP101' of FIG. 9, conventionally, a frequency is controlled at the commencement of lighting. Therefore, a change in an output voltage Vout with respect to 1 Step width (1 kHz) of the frequency control is very large (e.g., tens of times change in a voltage step-up ratio).

Figure 9:
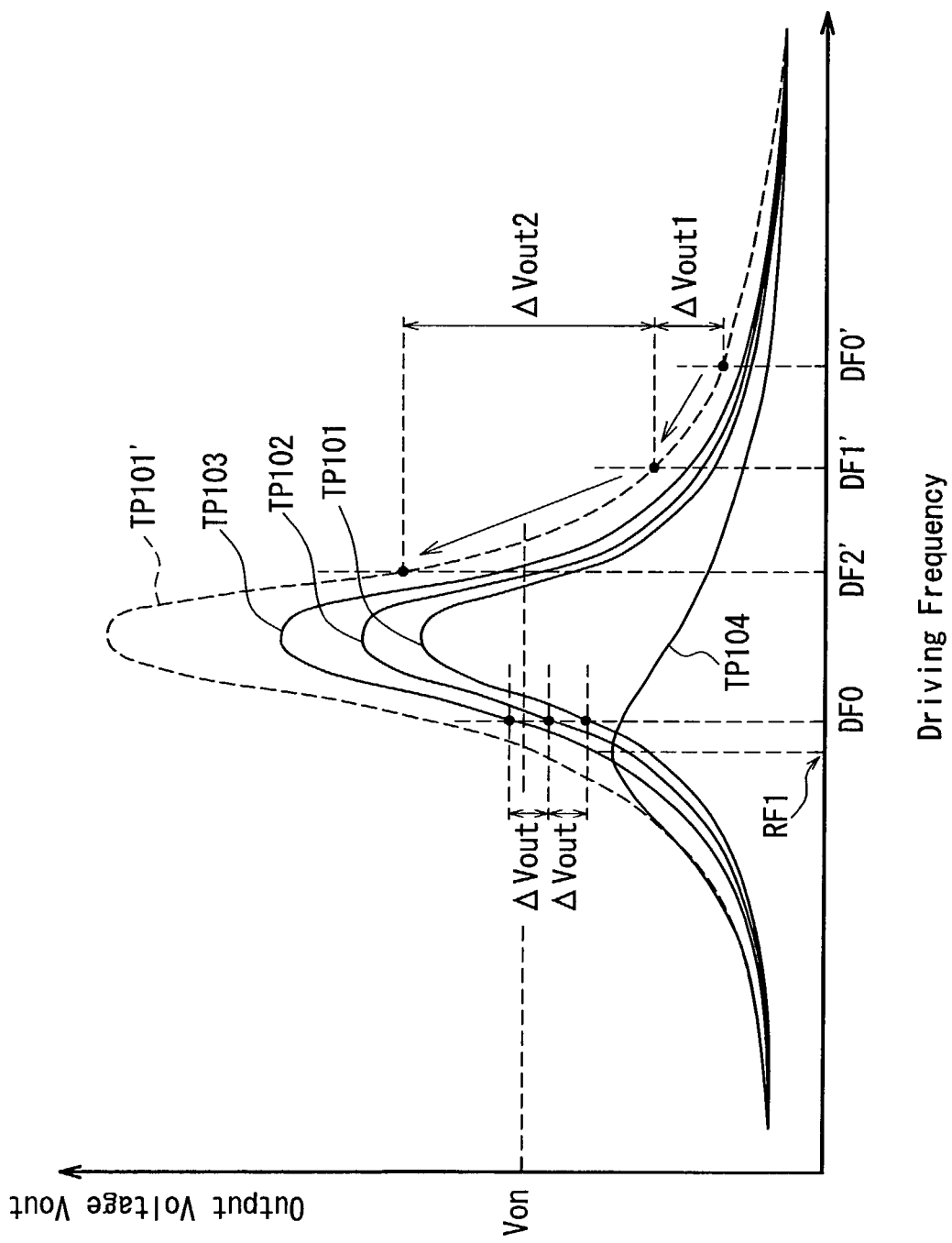
FIG. 9 is a view illustrating the comparison of the change in an output voltage of a piezoelectric transformer with respect to a driving frequency at the commencement of lighting of a cold-cathode fluorescent tube between a prior art and Embodiment 1.

In contract, in the present embodiment, the phase difference between the control signals VC1 and VC2 is controlled in such a manner that the output voltage Vout of the piezoelectric transformer is increased gradually on curves TP101, TP102, and TP103 at a fixed driving frequency higher than the resonance frequency RF1 of a curve 104 at a time of lighting, as shown in FIG. 9. A change ΔVout of the output voltage Vout with respect to 1 Step width (3.6 deg) of the phase control is equal to 0.024 times voltage step-up ratio and can be set very minutely.

Because of this, the output voltage Vout of the piezoelectric transformer is increased gradually. This can prevent the generation of distortion due to a large amplitude operation of the piezoelectric transformer at the commencement of lighting of the cold-cathode fluorescent tube, and miniaturize the piezoelectric transformer.

The phase difference is zero at the commencement of lighting and the phase control is conducted so that the returned current detecting data CD is matched with the reference data RD.

The brightness of the cold-cathode fluorescent tube 108 was adjusted by changing the value of the reference data RD stored inside. When a change cycle of the reference data RD by light-adjustment is long, brightness flicker occurs. When a change cycle of the reference data RD by light-adjustment is short, the cold-cathode fluorescent tube 108 does not light up sufficiently due to a rising time. In the present embodiment, the reference data RD was changed at a cycle of 1 ms to 2.5 ms; as a result, sufficient light-adjustment was obtained.

By setting the speed of applying a voltage to the cold cathode fluorescent tube 108 in two stages as shown in FIG. 5, a 20% decrease of the lighting start voltage was confirmed (in the conventional lighting method, 1,580 Vrms, and in the method of the present embodiment, 1270 Vrms).

Next, a method for controlling brightness in the present embodiment will be described. The brightness of the cold-cathode fluorescent tube 108 is controlled by controlling the phase difference between the D/A output signal VC1 to the first driving portion 105 and the D/A output signal VC2 to the second driving portion 106 in comparison between the current detecting data CD and the reference data RD.

Figure 7A:
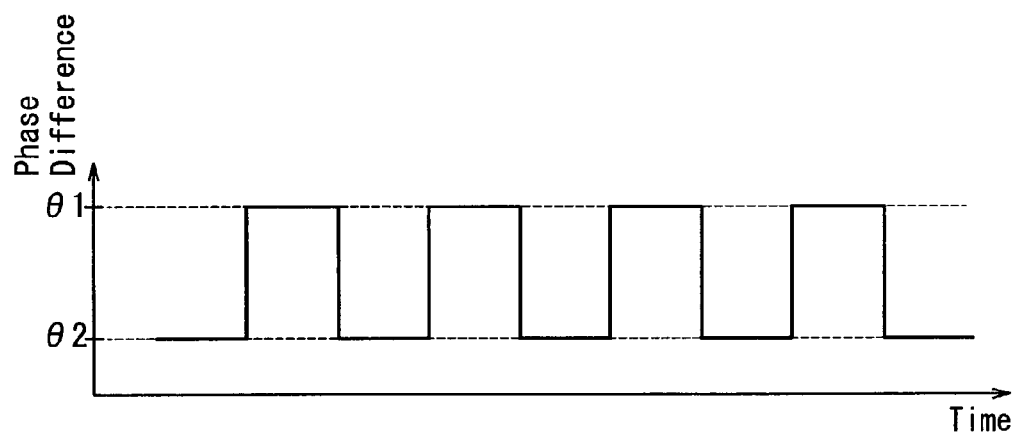
FIGS. 7A and 7B are views illustrating a method for adjusting light by controlling a phase difference in Embodiment 1.
Figure 7B:
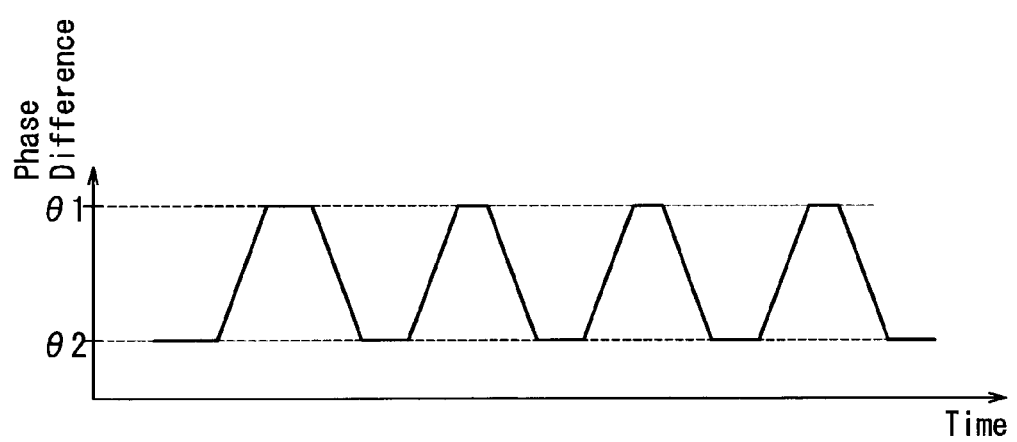

Furthermore, by changing the reference data RD at a constant interval, average brightness per unit time can be changed. FIGS. 7A and 7B are timing charts showing a change in phase difference. In FIG. 7A, the phase difference θ1 and the phase difference θ2 are set alternately by 50%. In this case, by changing the ratio of the phase difference θ1 and the phase difference θ2, light-adjustment of 50% to 100% is made possible. Furthermore, when this method is used, an outer circuit for controlling brightness is not required, which has significant practical advantages.

Furthermore, as shown in FIG. 7B, when the phase difference θ1 and the phase difference θ2 are changed with a time constant, the input power of the piezoelectric transformer 110 can be prevented from being changed rapidly, and a burden on the device can be reduced.

Figure 8:
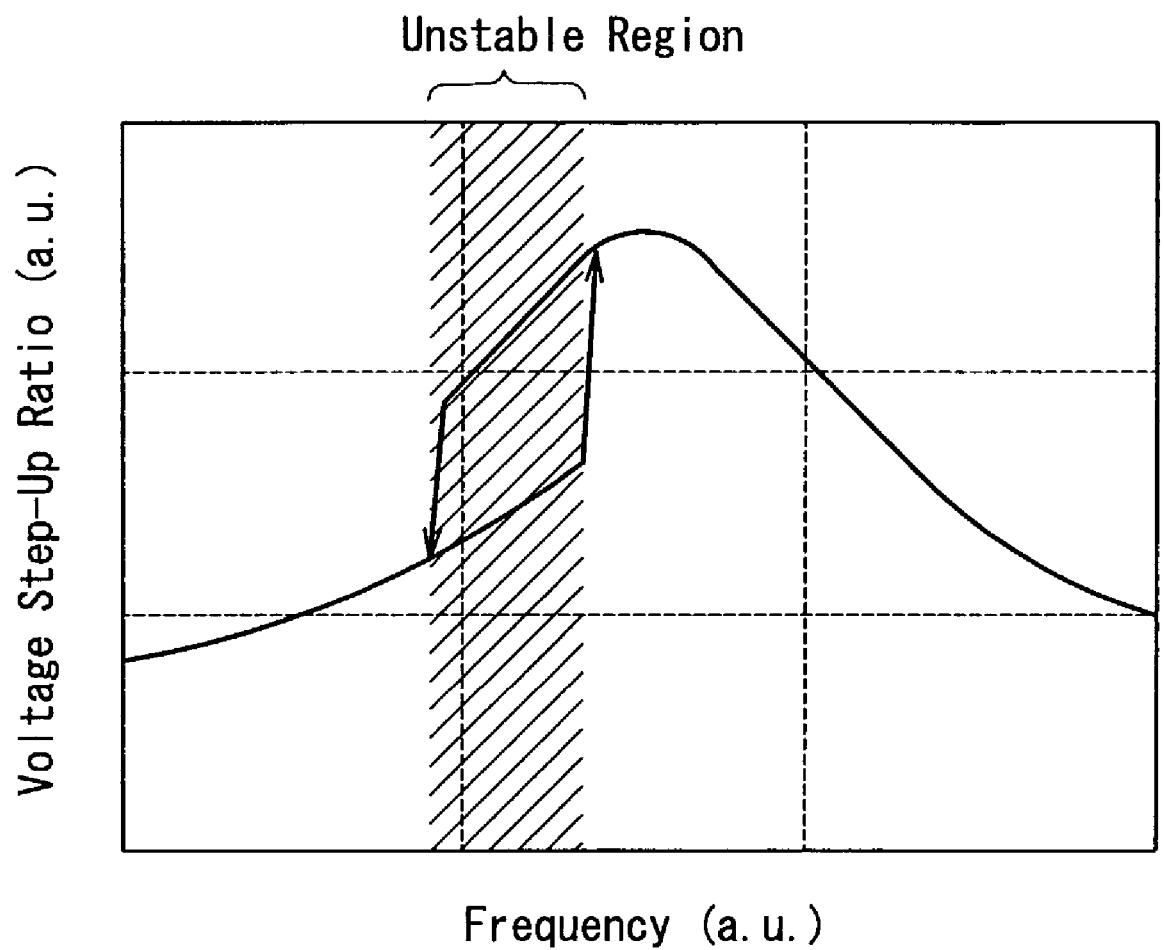
FIG. 8 is a view showing frequency characteristics and an unstable region of a voltage step-up ratio of a piezoelectric transformer.

Furthermore, by setting the driving frequency of the piezoelectric transformer 110 to be higher than its resonance frequency (herein, defined as a frequency at which a voltage step-up ratio under a load connection becomes maximum), a stable operation is made possible. FIG. 8 shows frequency characteristics of a voltage step-up ratio of the piezoelectric transformer 110. As shown in FIG. 8, there is a region (unstable region) where the characteristics are varied between the case where sweep is conducted from a high frequency side to a frequency region lower than a resonance frequency and the case where sweep is conducted from a low frequency side. In this unstable region, the output characteristics are varied depending upon the vibration level of driving. Therefore, it is desirable that the piezoelectric transformer 110 is driven at a frequency higher than a resonance frequency. In the present embodiment, as represented by a curve TP104 of FIG. 9, at the commencement of lighting of the cold-cathode fluorescent tube, the piezoelectric transformer is driven at a fixed frequency higher than a resonance frequency RF1 during steady lighting, so that the piezoelectric transformer is not driven in the above-mentioned unstable region.

By allowing a harmonic component that excites another vibration mode of the piezoelectric transformer 110 not to be included when a phase difference is changed, the waveforms of an input voltage and an output voltage of the piezoelectric transformer 110 can be prevented from being distorted. In addition, distortion of a harmonic of the piezoelectric transformer 110 can be reduced, and the cold-cathode fluorescent tube 108 can be driven in a sine wave.

As described above, according to the present embodiment, a piezoelectric transformer can be operated in the vicinity of a resonance frequency with a high efficiency. Furthermore, the driving of the piezoelectric transformer can be controlled easily at a single frequency, and the miniaturization of a circuit and high efficiency can be realized.

Furthermore, the above control method involves only the control of an input power (output power) due to the control of a phase difference of switching. Therefore, even if the frequency of the reference clock of μCOM is low, control with high reliability is made possible.

Figure 10:
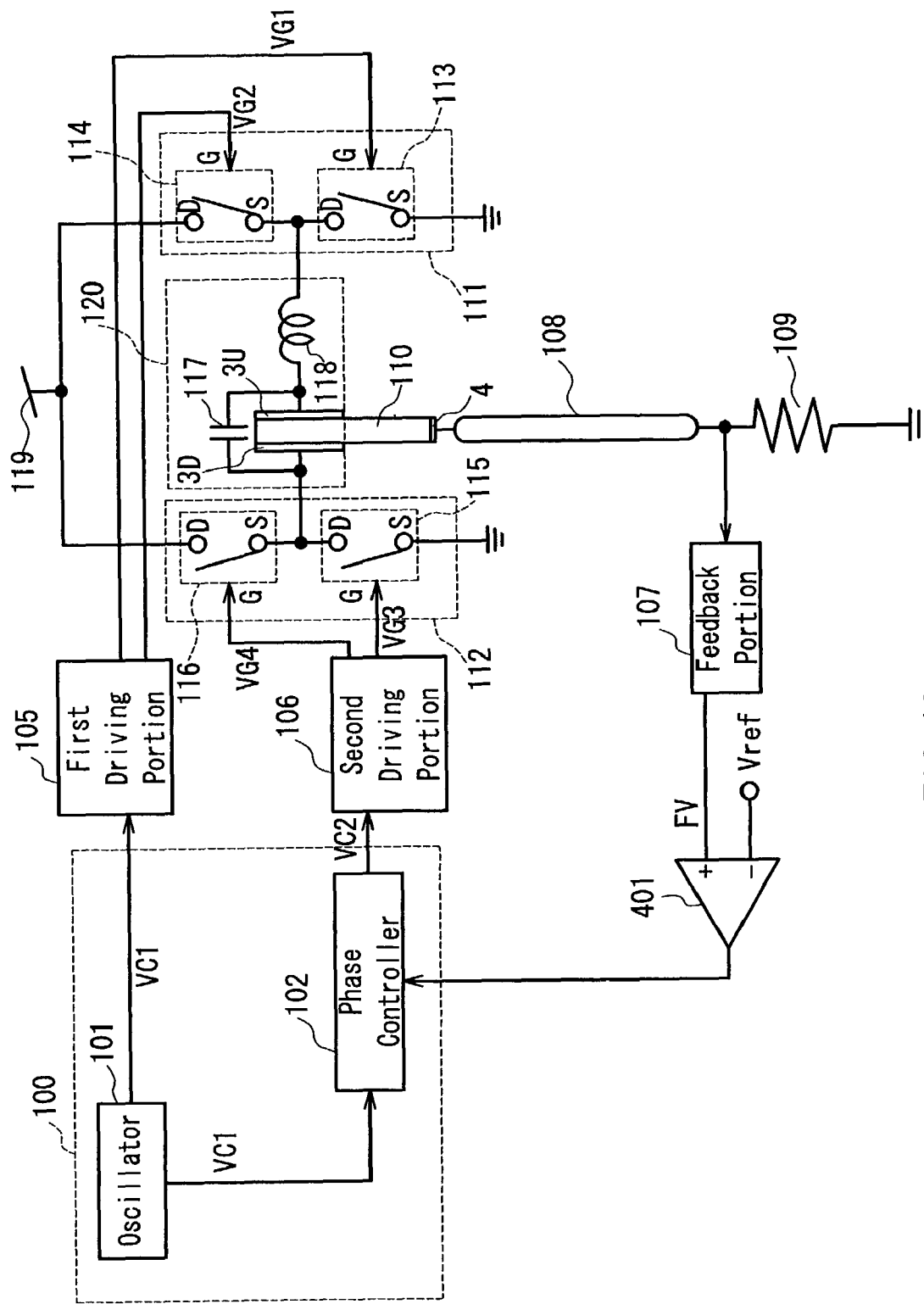
FIG. 10 is a block diagram showing a modified example of a driving circuit for a piezoelectric transformer of Embodiment 1 according to the present invention.

In the above description, the A/D converter 104 and the comparator 103 are provided in the digital controller 100. However, as shown in FIG. 10, an analog comparator 401 may be provided outside of the digital controller 100, instead of the A/D converter 104 and the comparator 103. In this case, the comparator 401 compares a current detecting value FV from the feedback portion 107 with a reference voltage Vref. When the current detecting value FV is smaller than the reference voltage Vref, the comparator 401 supplies a logic low level to the phase controller 102 of the digital controller 100. When the current detecting value FV is equal to or larger than the reference voltage Vref, the comparator 401 supplies a logic high level to the phase controller 102 of the digital controller 100. According to this configuration, the low-speed A/D converter and the comparator in the digital controller 100 are not necessary, which results in a high-speed operation and a low cost.

Embodiment 2

Figure 11:
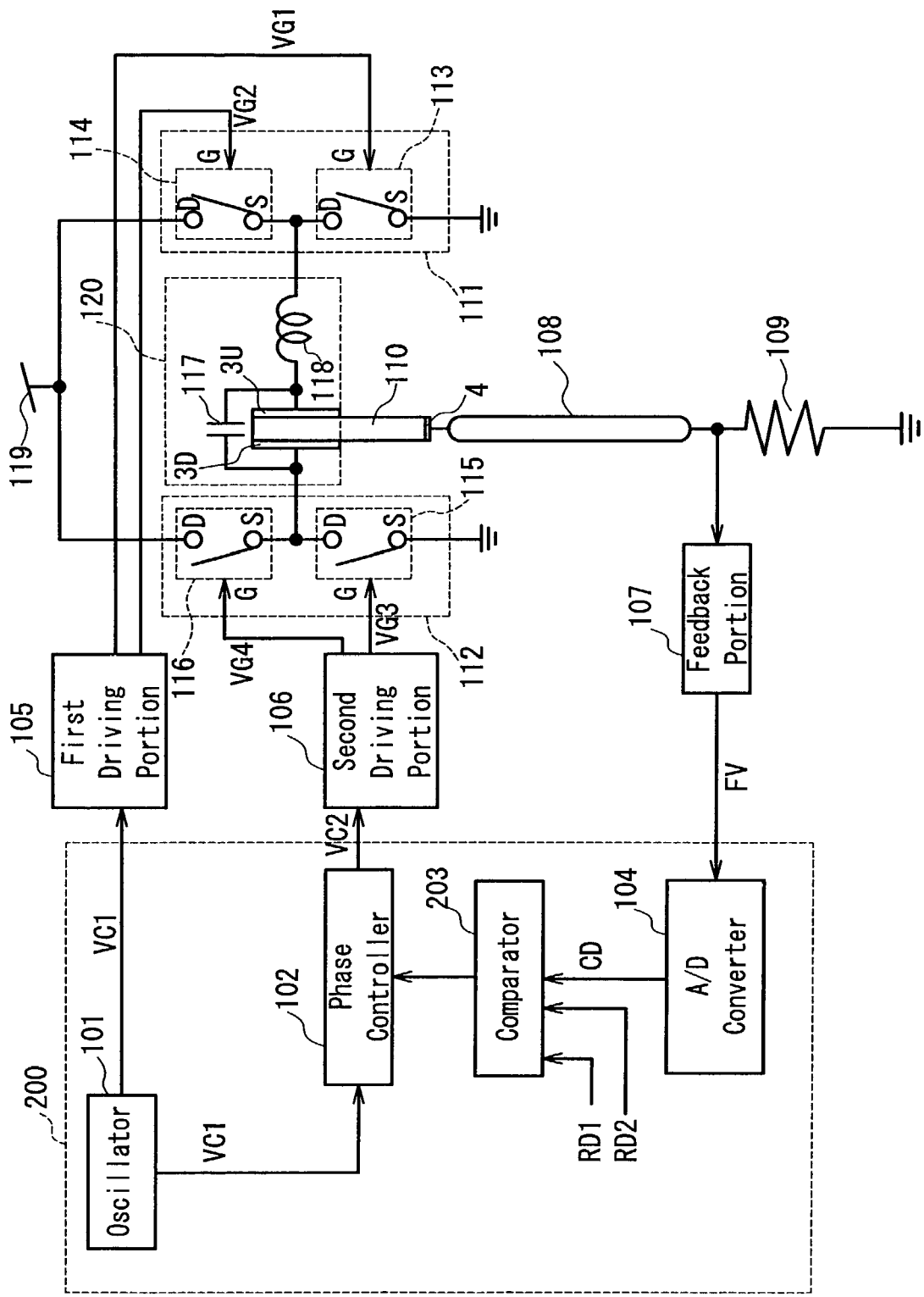
FIG. 11 is a block diagram showing an exemplary configuration of a driving circuit for a piezoelectric transformer of Embodiment 2 according to the present invention.

FIG. 11 is a block diagram showing an exemplary configuration of a driving circuit for a piezoelectric transformer of Embodiment 2 according to the present invention. In FIG. 11, the present embodiment is different from Embodiment 1 in that a comparator 203 receiving two reference data RD1 and RD2 is provided in the digital controller 200. Furthermore, the present embodiment is different from Embodiment 1 in a control method at a time of commencement of lighting of the cold-cathode florescent tube 108. The other components and functions are the same as those in Embodiment 1. The same components are denoted with the same reference numerals, and the description thereof will be omitted here.

Figure 12:
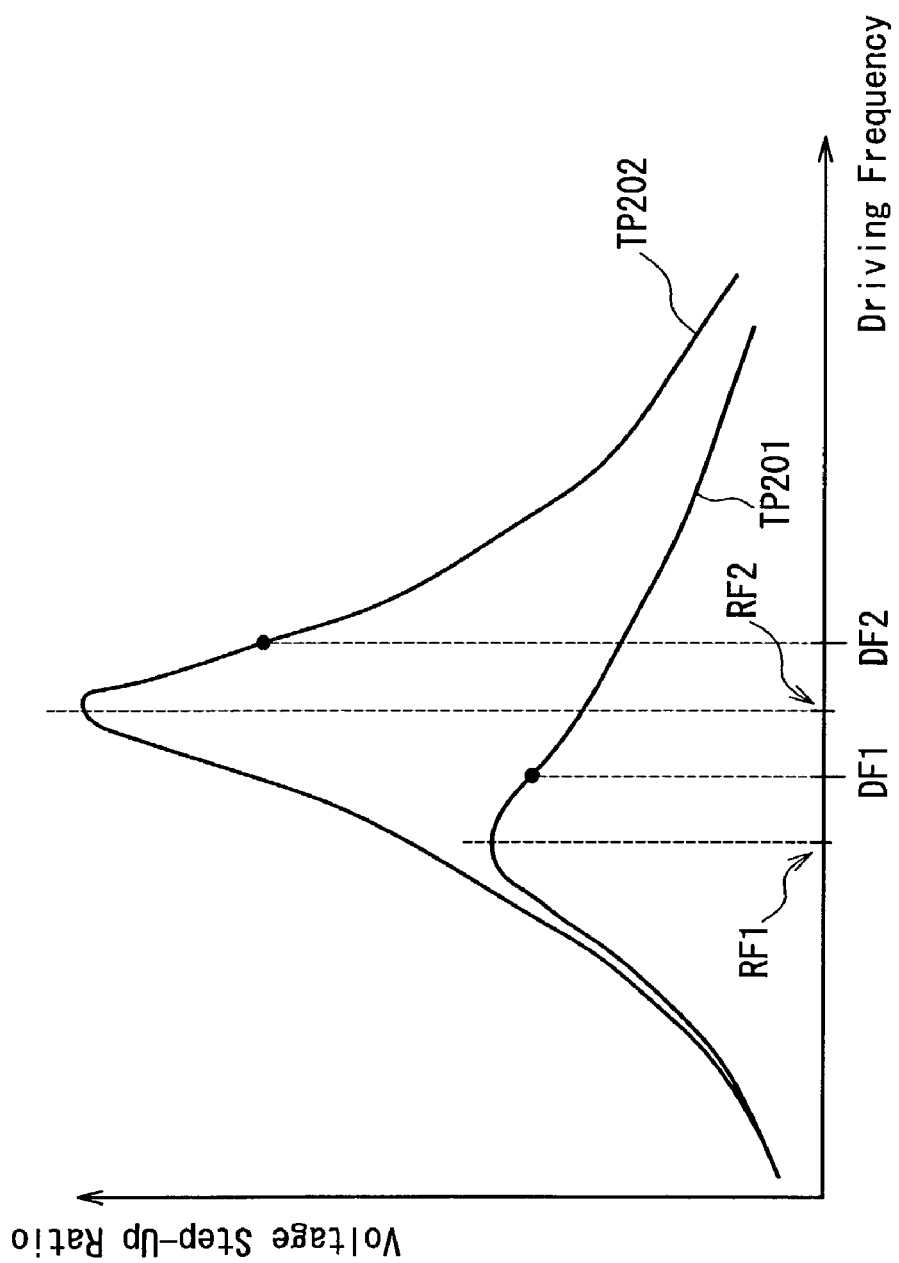
FIG. 12 shows frequency characteristics of a voltage step-up ratio of a piezoelectric transformer for illustrating the control in Embodiment 2.

FIG. 12 shows a relationship between frequency characteristics of a voltage step-up ratio and a driving frequency of the piezoelectric transformer 110. A curve TP202 represents frequency characteristics before a current flows through the cold-cathode fluorescent tube 108. Since it is almost under a no-load condition until a current starts flowing through the cold-cathode fluorescent tube 108, a high voltage step-up ratio can be obtained. At this time, a driving frequency DF2 and a resonance frequency RF2 (at which a voltage step-up ratio becomes maximum under a no-load condition) are set so as to maintain the relationship: driving frequency DF2>resonance frequency RF2, as shown in FIG. 12.

Furthermore, when a current starts flowing through the cold-cathode fluorescent tube 108, a load impedance is decreased, and a voltage step-up ratio also is decreased. As a result, the characteristics are changed from the curve TP202 to the curve TP201. Then, the driving frequency of the piezoelectric transformer 110 also is changed from the driving frequency DF2 to the driving frequency DF1. The driving frequency DF1 and the resonance frequency RF1 (at which a voltage step-up ratio under a load connection becomes maximum under a no-load condition) are set so as to satisfy the relationship: driving frequency DF1>resonance frequency RF1.

By setting as described above, the piezoelectric transformer can be driven at a frequency higher than a resonance frequency thereof at all times, and can be prevented from being driven in an unstable frequency region where output characteristics are varied depending upon the driven state.

Figure 13:
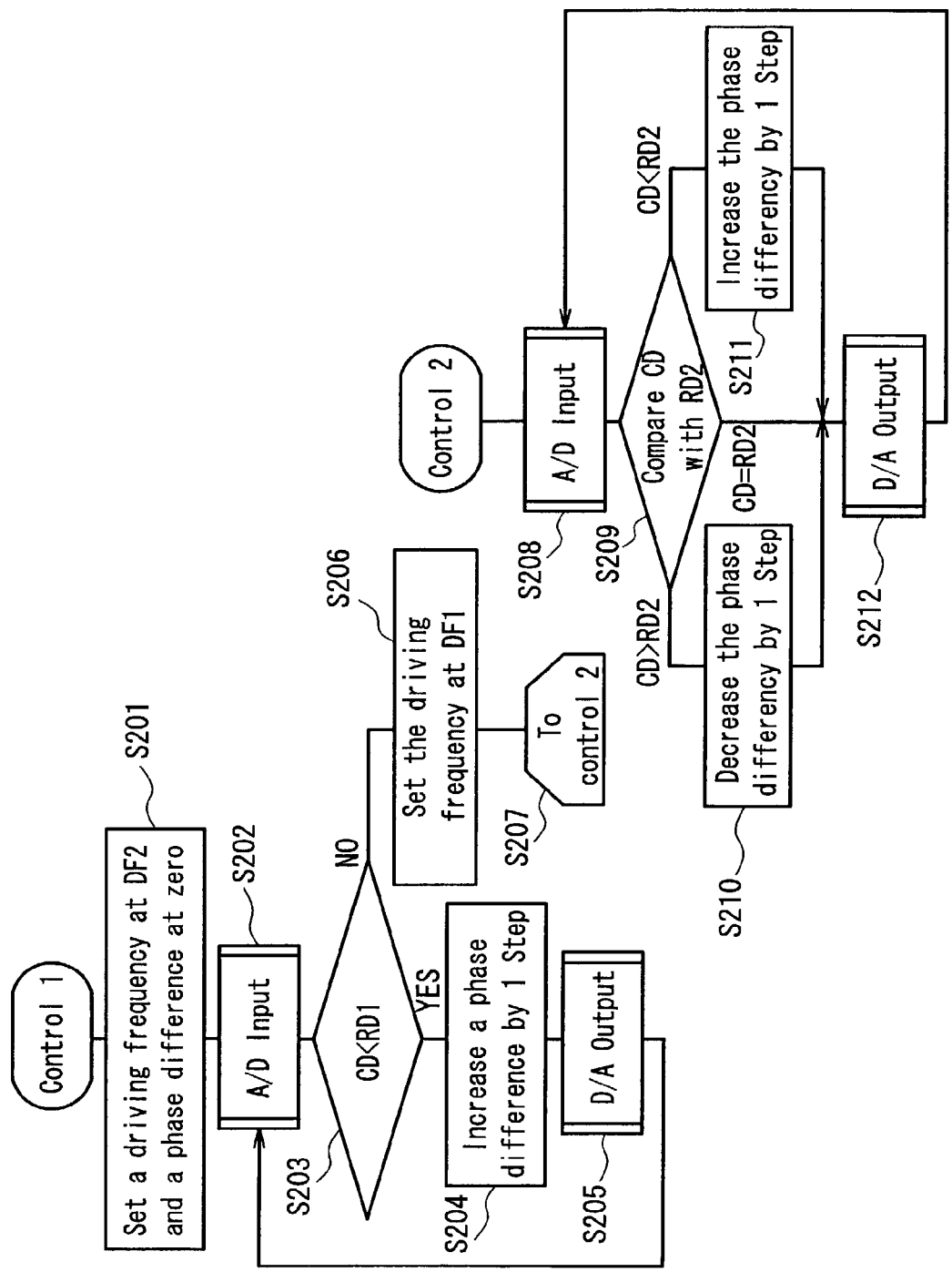
FIG. 13 is a flow chart showing an operation of a digital controller 200 in FIG. 11.
Figure 14:
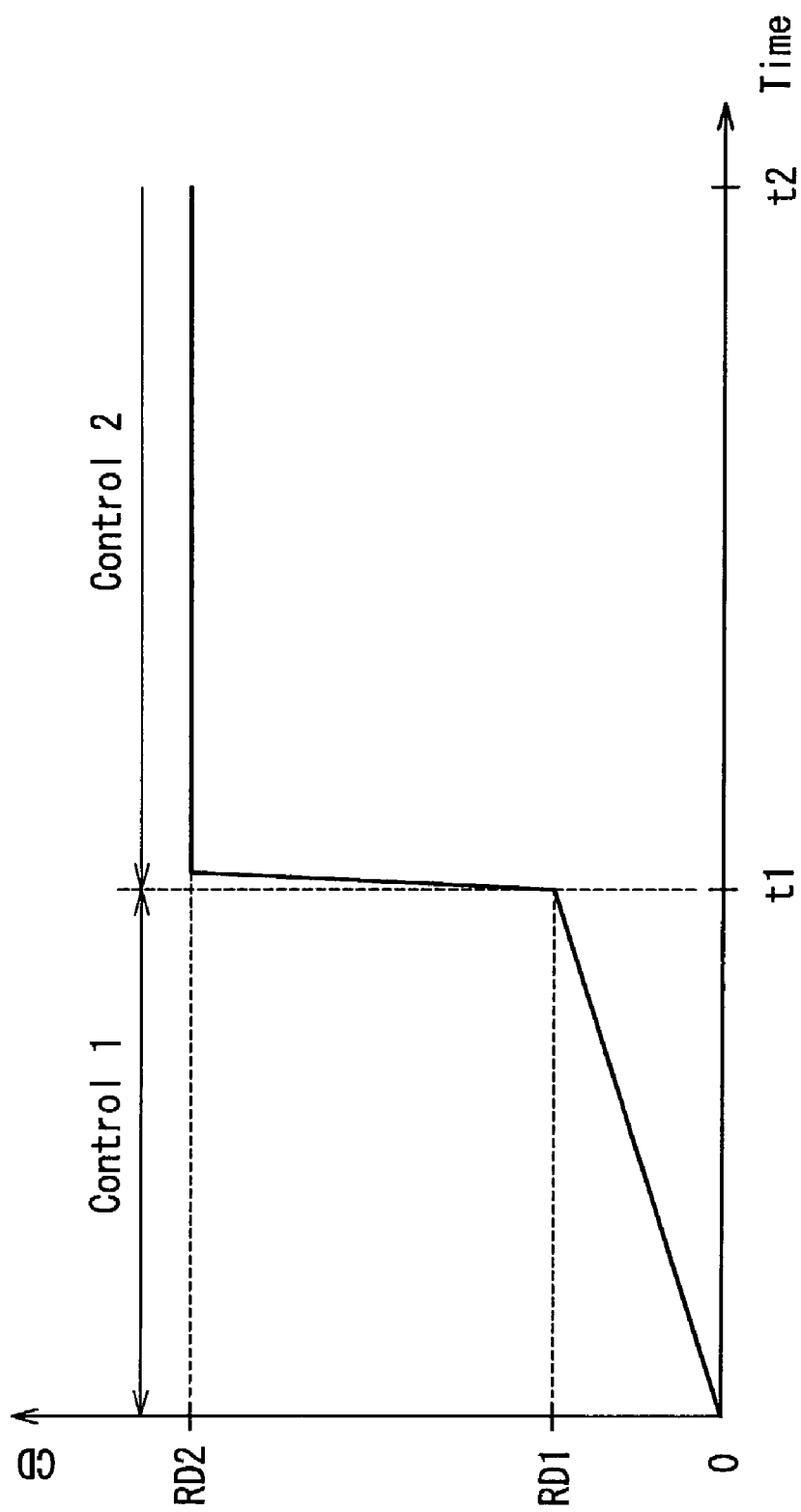
FIG. 14 shows a change of current detecting data CD with time during operation in Embodiment 2.

FIG. 13 is a flow chart illustrating an operation of the digital controller 200. FIG. 14 shows a change in current detecting data CD output from the A/D converter 104 with respect to a time. Hereinafter, an operation of the driving circuit will be described with reference to FIGS. 13 and 14.

When the driving circuit is started up, the processing of control 1 starts. In the oscillator 101, the oscillation frequency is fixed at a driving frequency DF2, and the phase difference between a D/A output signal VC1 to the first driving portion 105 and a D/A output signal VC2 to the second driving portion 106 is reset to be zero (S201). Thereafter, a current flowing through the cold-cathode fluorescent tube 108 is converted to current detecting data CD having a digital value by the A/D converter 104 (S202). In the comparator 203, the current detecting data CD is compared with the reference data RD1 (S203). When the current detecting data CD is smaller than the reference data RD1, the phase difference between VC1 and VC2 is increased by 1 Step (S204). A control signal with a driving frequency remained unchanged and only a phase difference increased by 1 Step is output after being converted from a digital value to an analog value (S205) for driving.

After a predetermined period, a current flowing through the cold-cathode fluorescent tube is converted again to current detecting data CD having a digital value by the A/D converter 104 (S202). In the comparator 203, the current detecting data CD is compared with the reference data RD1 (S203). The current detecting data CD at this time is increased until time t1 shown in FIG. 14.

When the current detecting data CD becomes the reference data RD1 or more at time t1, the driving frequency is changed to the driving frequency DF1 (S206), and the process proceeds to the processing of control 2 (S 207). In the processing of the control 2, a current of the cold-cathode fluorescent tube 108 is converted to current detecting data CD having a digital value by the A/D converter 104 (S208).

In the comparator 203, the current detecting data CD is compared with the reference data RD2 (S209). When the current detecting data CD is smaller than the reference data 2, the phase difference between VC1 and VC2 is increased by 1 Step (S211). When the current detecting data CD is larger than the reference data 2, the phase difference is decreased by 1 Step (S210). Furthermore, when the current detecting data CD is the same as the reference data RD2, the phase difference is maintained as it is. Then, a control signal is D/A output after being converted from a digital value to an analog value (S212 corresponding to the operation region of the control 2 in FIG. 14).

As described above, according to the present embodiment, a piezoelectric transformer can be operated in the vicinity of a resonance frequency with a high efficiency without being driven in an unstable frequency region where output characteristics are varied depending upon the state of driving. Furthermore, the driving of the piezoelectric transformer can be controlled easily at a single frequency, and the miniaturization of a circuit and high efficiency can be realized. Furthermore, the above control method involves only a phase difference of switching. Therefore, even if the frequency of the reference clock of μCOM is low, control with high reliability is made possible.

Furthermore, in the phase control, before lighting of the cold-cathode fluorescent tube, the frequency characteristics of a voltage step-up ratio of the piezoelectric transformer become very steep. Therefore, an output voltage is varied largely with respect to a change in an input voltage by the phase control. When the load of the piezoelectric transformer is light (in particular, close to a no-load condition), it is desirable that 1 Step of a phase difference change is minimized.

Figure 15:
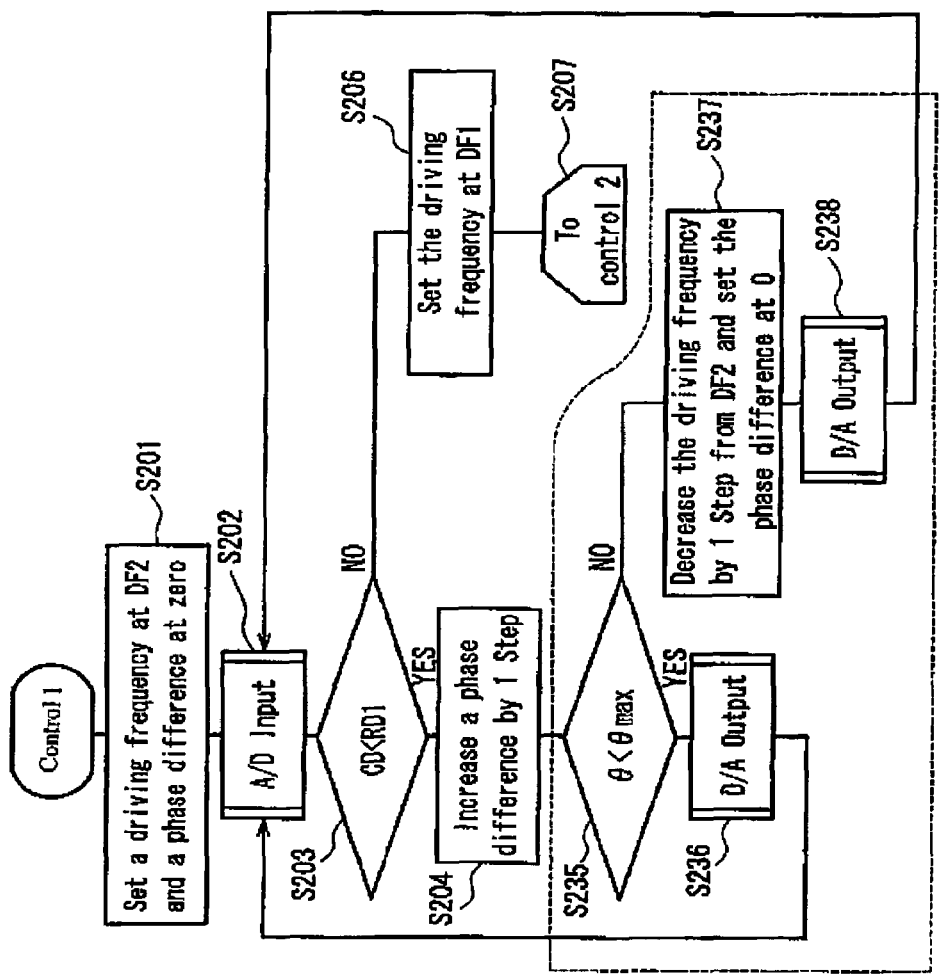
FIG. 15 is a flow chart showing another method for controlling lighting in Embodiment 2.

Furthermore, as shown in the flow chart of FIG. 15, by adding the control of preventing non-lighting, a system with higher reliability can be configured. The control method in FIG. 15 is different from that in FIG. 13 in the following points. In the case where the phase difference θ between VC1 and VC2 is smaller than the maximum phase difference θmax, the phase difference θ is increased. When the phase difference θ reaches the maximum phase difference θmax or more (in the case where the result of NO is obtained in the comparison at S235), the phase difference is once set to be zero, and the driving frequency is decreased by 1 Step so as to approach the resonance frequency (S237). Then, a lighting commencement operation is performed again. Because of this control, non-lighting can be prevented. Furthermore, the driving frequency that is decreased by 1 Step at S237 needs to satisfy the relationship: Driving frequency DF2>Driving frequency>Resonance frequency (at which a voltage step-up ratio becomes maximum under a no-load condition).

Furthermore, in the same way as in Embodiment 1, by performing the startup control shown in FIG. 5 and the phase difference control shown in FIG. 7, the same effects as those in Embodiment 1 can be obtained.

Figure 16:
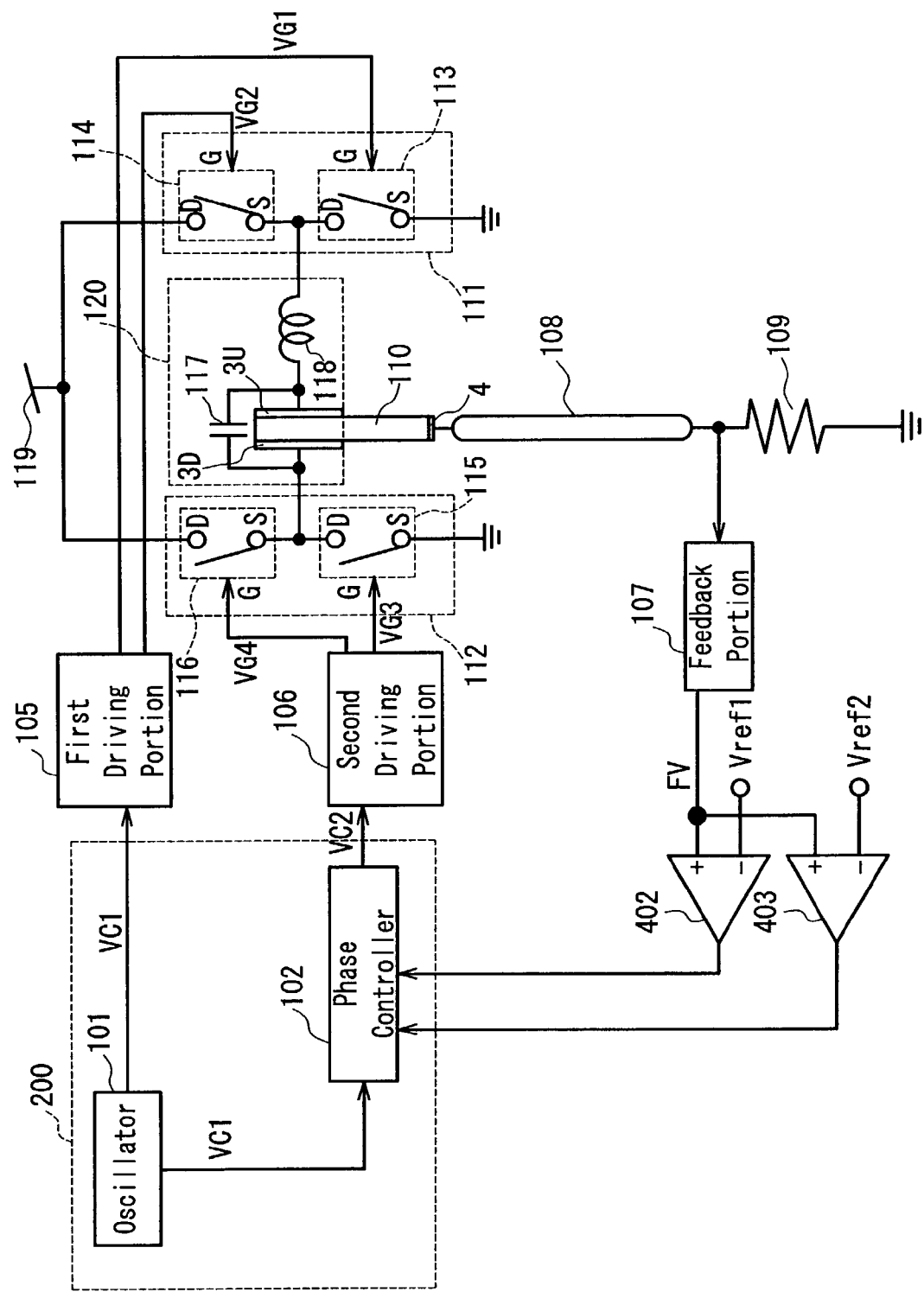
FIG. 16 is a block diagram showing a modified example of a driving circuit for a piezoelectric transformer of Embodiment 2 according to the present invention.

In the above description, the A/D converter 104 and the comparator 203 are provided in the digital controller 200. However, as shown in FIG. 16, a first analog comparator 402 and a second analog comparator 403 may be provided outside of the digital controller 200, instead of the A/D converter 104 and the comparator 203.

In this case, the first comparator 402 compares a current detecting value FV from the feedback portion 107 with a first reference voltage Vref1. When the current detecting value FV is smaller than the first reference voltage Vref1, the first comparator 402 supplies a logic low level to the phase controller 102 of the digital controller 200. When the current detecting value FV is equal to or larger than the first reference voltage Vref1, the first comparator 402 supplies a logic high level to the phase controller 102 of the digital controller 200.

Furthermore, the second comparator 403 compares the current detecting value FV from the feedback portion 107 with a second reference voltage Vref2. When the current detecting value FV is smaller than the second reference voltage Vref2, the second comparator 403 supplies a logic low level to the phase controller 102 of the digital controller 200. When the current detecting value FV is equal to or larger than the second reference voltage Vref2, the second comparator 403 supplies a logic high level to the phase controller 102 of the digital controller 200.

According to this configuration, the low-speed A/D converter and the comparator in the digital controller 200 are not necessary, which results in a high-speed operation and a low cost.

Embodiment 3

Figure 17:
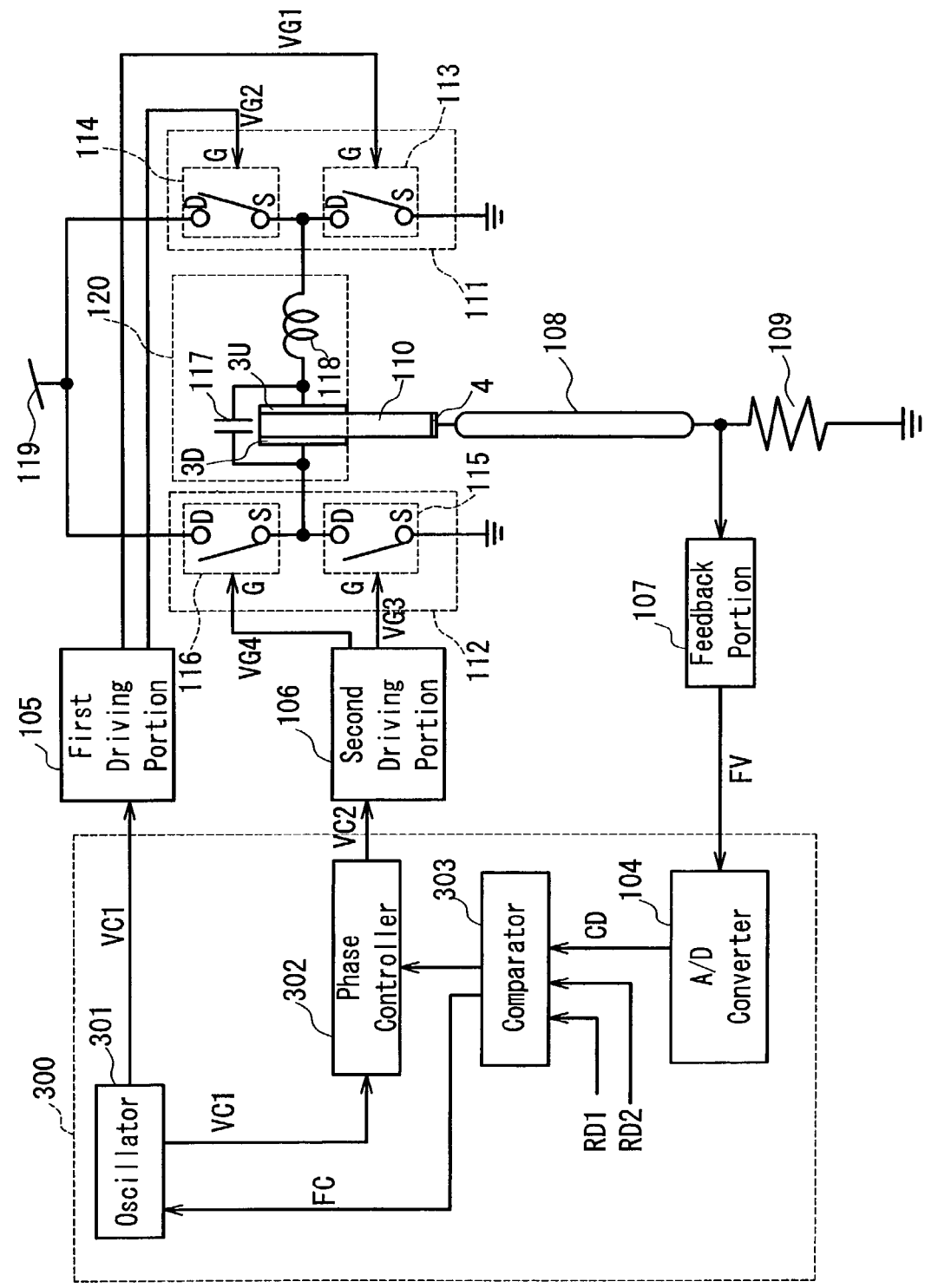
FIG. 17 is a block diagram showing an exemplary configuration of a driving circuit for a piezoelectric transformer of Embodiment 3 according to the present invention.

FIG. 17 is a block diagram showing an exemplary configuration of a driving circuit for a piezoelectric transformer of Embodiment 3 according to the present invention. In FIG. 17, the present embodiment is different from Embodiment 2 in that the oscillation frequency at an oscillator 301 is controlled by a signal from a comparator 303 at the commencement of lighting of the cold-cathode fluorescent tube 108. The other components and functions are the same as those in Embodiment 2. The same components are denoted with the same reference numerals, and the description thereof will be omitted here.

Figure 18:
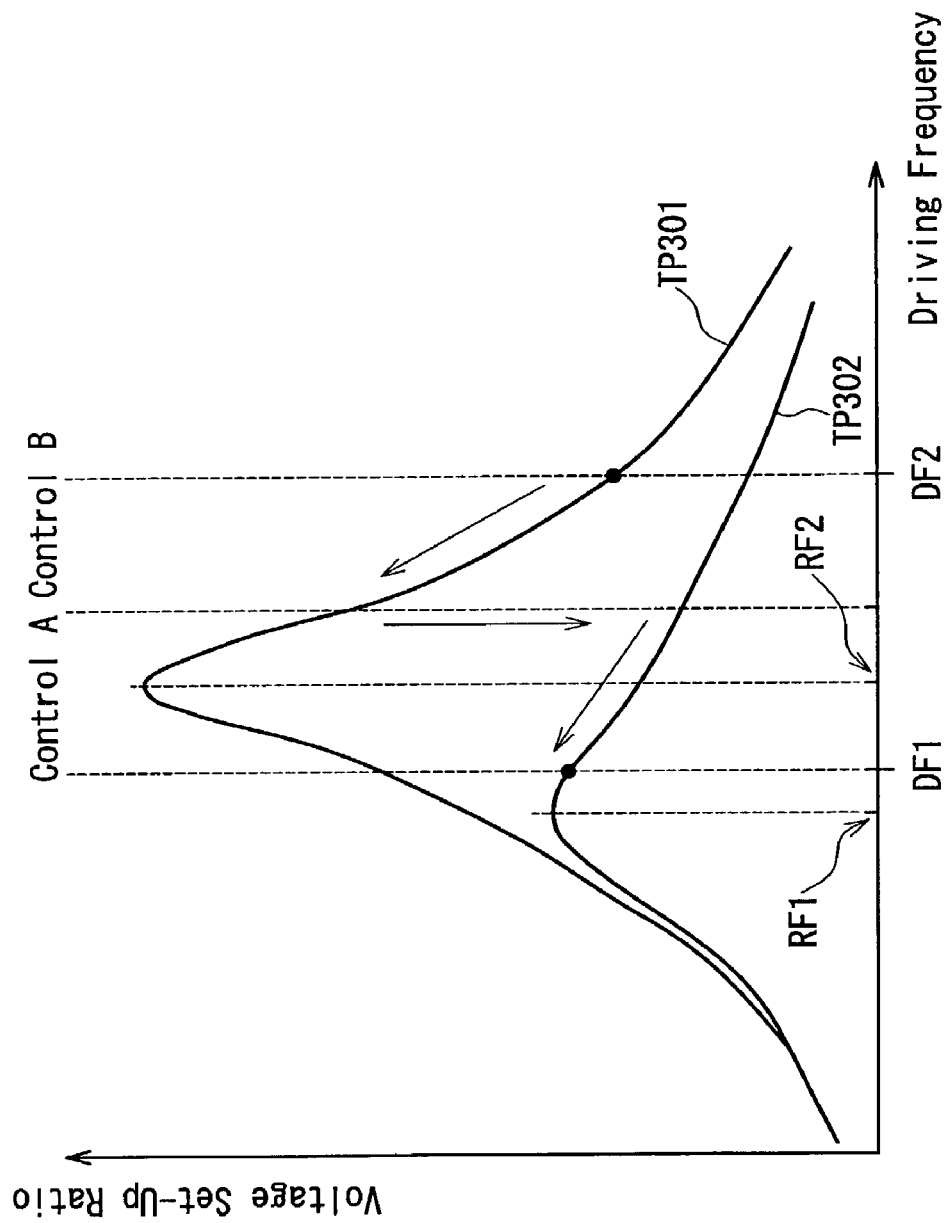
FIG. 18 shows frequency characteristics of a voltage step-up ratio of a piezoelectric transformer for illustrating the control in Embodiment 3.

FIG. 18 shows a relationship between frequency characteristics of a voltage step-up ratio and a driving frequency of the piezoelectric transformer 110. In FIG. 18, a curve TP301 represents frequency characteristics before a current flows through the cold-cathode fluorescent tube 108. Since it is almost under a no-load condition until a current starts flowing through the cold-cathode fluorescent tube 108, a high voltage step-up ratio can be obtained. At this time, a driving frequency DF2 and a resonance frequency RF2 (at which a voltage step-up ratio becomes maximum under a no-load condition) are set so as to maintain the relationship: driving frequency DF2>resonance frequency RF2, as shown in FIG. 18. Furthermore, when a current starts flowing through the cold-cathode fluorescent tube 108, a load impedance is decreased, and a voltage step-up ratio also is decreased. As a result, characteristics are changed from the curve TP301 to a curve TP302. Then, the driving frequency of the piezoelectric transformer 110 is taken from the curve TP302 rather than the curve TP301.

Figure 19A:
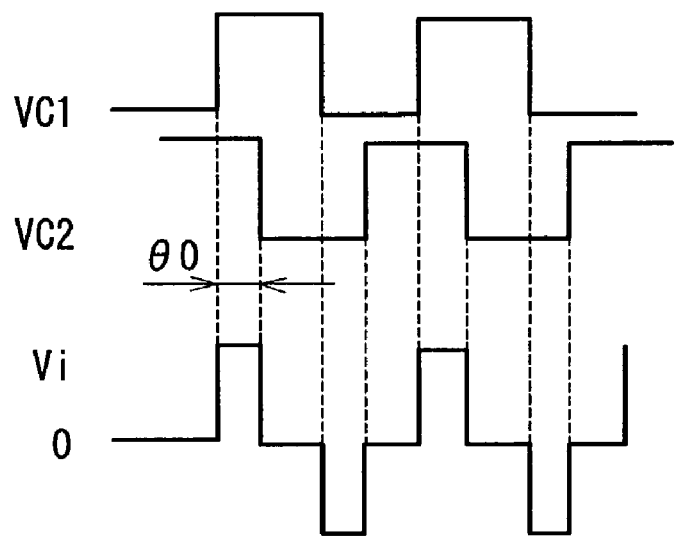
FIGS. 19A, 19B, 19C, and 19D show a signal waveform of each portion in Embodiment 3.
Figure 19B:
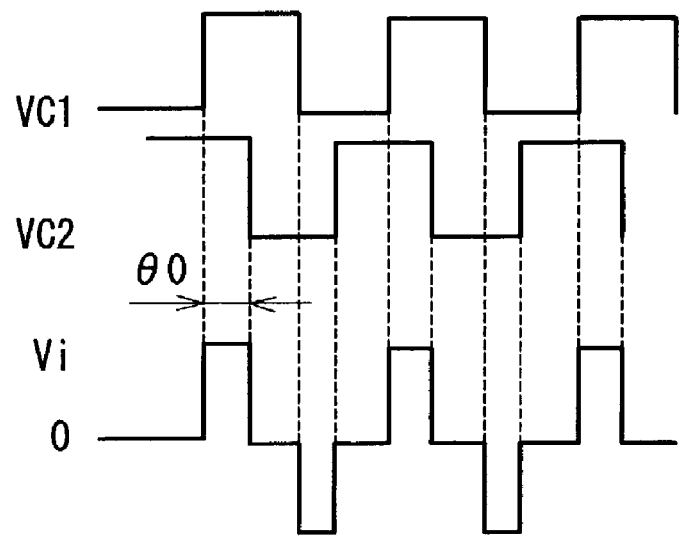

Lighting is controlled in accordance with the above change in characteristics due to a load of the piezoelectric transformer 110 (Control B). At the commencement of lighting, the phase in a driving waveform is fixed, and driving is started from a start frequency on the curve TP301. The driving waveforms at this time correspond to those in FIGS. 19A and 19B. Only a frequency is changed while the phase difference (θ0) between the D/A output signal VC1 to the first driving portion 105 and the D/A output signal VC2 to the second driving portion 106 remains unchanged.

When the output voltage of the piezoelectric transformer 110 reaches a lighting start voltage of the cold-cathode fluorescent tube 108, a current flows through the cold-cathode fluorescent tube 108, and a voltage is generated in the current detecting resistor 109. This voltage is converted to current detecting data CD having a digital value by the A/D converter 104 through the feedback portion 107. Thereafter, the current detecting data CD is compared with the reference data RD1 in the comparator 303.

Figure 19C:
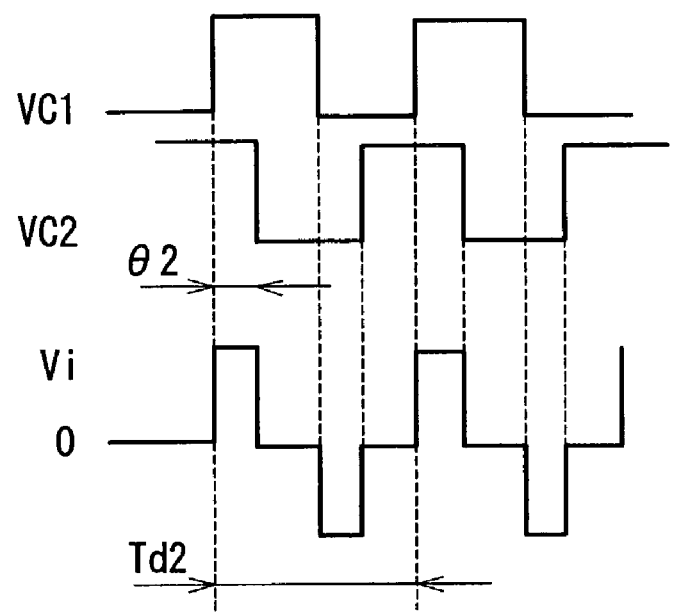
Figure 19D:
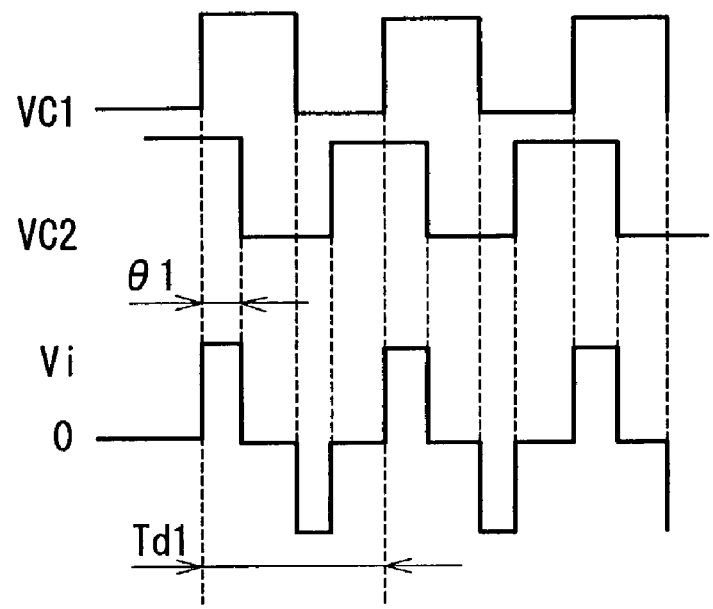

When the current detecting CD is larger than the reference data RD1, an operation is shifted from the control B to the control A in FIG. 18. In the operation by the control A, the driving frequency of the piezoelectric transformer 110 is swept to a set frequency (herein, driving frequency DF1) on the curve TP302. Furthermore, at the same time as the frequency sweep, the current detecting data CD corresponding to a tube current is compared with the reference data RD2. When the reference data RD2 is larger than the current detecting data CD, the phase difference between VC1 and VC2 is increased by 1 Step. When the reference data RD2 is smaller than the current detecting data CD, the phase difference is decreased by 1 Step. When the reference data RD2 substantially is matched with the current detecting data CD, the phase difference is kept unchanged. The driving waveforms at this time correspond to those in FIGS. 19C and 19D, and the phase difference between the D/A output signal VC1 to the first driving portion 105 and the D/A output signal VC2 to the second driving portion 106 and frequencies thereof are changed (the phase difference is changed from θ2 to θ1, and the cycle is changed from Td2 to Td1).

When the driving frequency reaches the set frequency DF1, the frequency is fixed, and the tube current is controlled to be constant by controlling only a phase.

In the present embodiment, the phase difference between the D/A output signal VC1 to the first driving portion 105 and the D/A output signal VC2 to the second driving portion 106 is fixed at 90°. The phase difference can be set arbitrarily in a range of 0° to 180°. However, it is desirable to set the phase difference in the vicinity of 90° at which a control range can be widened.

Figure 20:
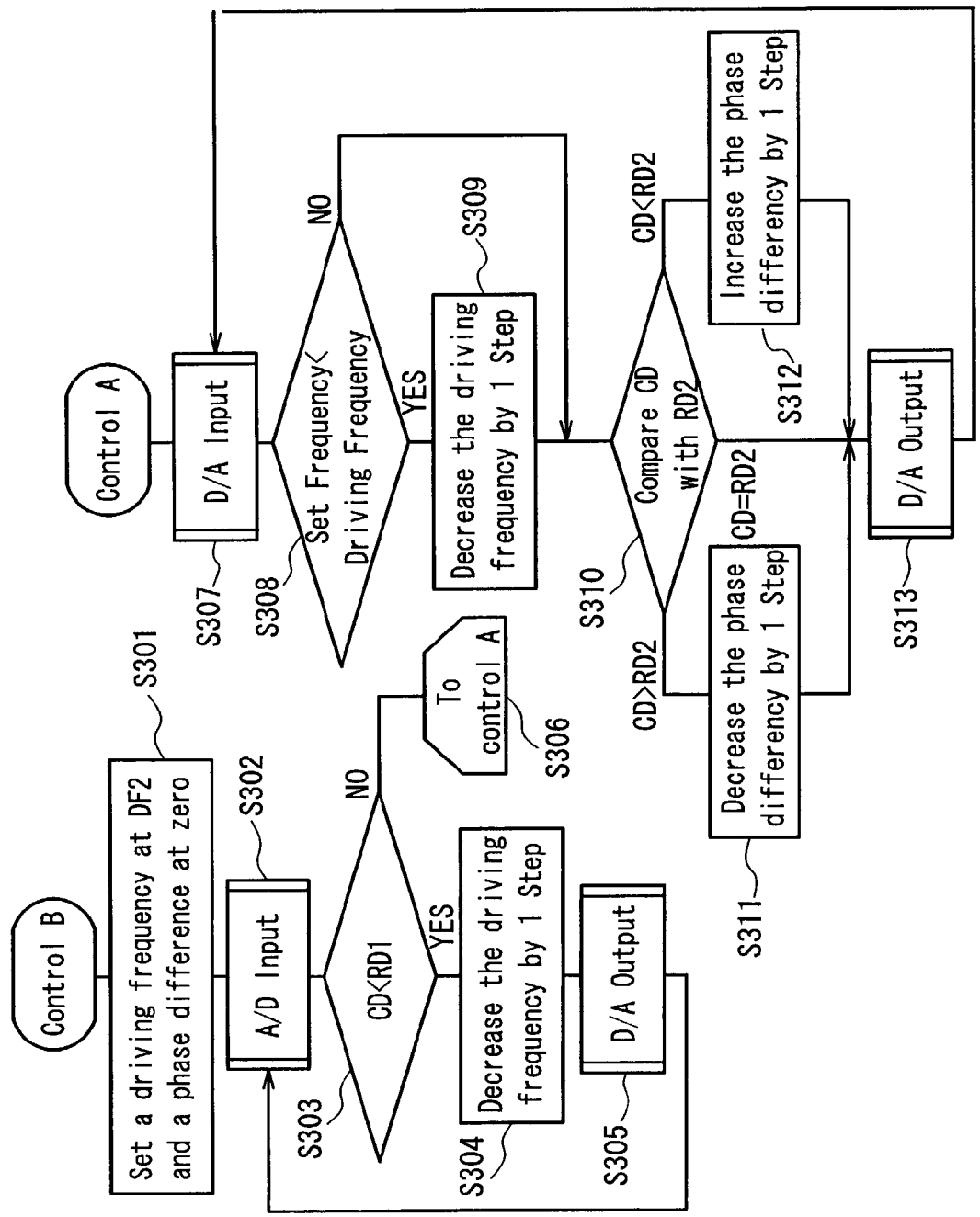
FIG. 20 is a flow chart showing an operation of a digital controller 300 in FIG. 17.

Furthermore, the control method at the commencement of lighting will be described with reference to FIG. 20. FIG. 20 is a flow chart illustrating the operation of a digital controller 300.

When the driving circuit is started up, the oscillation frequency at the oscillator 301 is set at the driving frequency DF2 (FIG. 18), and the phase difference between the D/A output signal VC1 to the first driving portion 105 and the D/A output signal VC2 to the second driving portion 106 is set to be zero (S301). Thereafter, a current flowing through the cold-cathode fluorescent tube 108 is converted to current detecting data CD having a digital value by the A/D converter 104 (S302). In the comparator 303, the current detecting data CD is compared with the reference data RD1 (S303). When the current detecting data CD is smaller than the reference data RD1, the comparator 303 outputs a frequency control signal FC to the oscillator 301 to decrease the driving frequency by 1 Step (S304). Then, the digital controller 300 outputs the driving control signals VC1 and VC2 with the phase difference being retained at zero and only the driving frequency decreased by 1 Step, after converting them from a digital value to an analog value (S305) for driving.

After a predetermined period, a current flowing through the cold-cathode fluorescent tube 108 is converted again to current detecting data CD having a digital value by the A/D converter 104 (S302). In the comparator 303, the current detecting data CD is compared with the reference data RD1 (S303). When the current detecting data CD is equal to or larger than the reference data RD1 as a result of the comparison at S303, the processing is shifted from the control B to the control A (S306).

In the processing of the control A, a current of the cold-cathode fluorescent tube 108 is converted to current detecting data CD having a digital value by the A/D converter 104 (S307). Then, a set frequency is compared with the driving frequency (S308). When the set frequency is smaller than the driving frequency, the driving frequency is decreased by 1 Step (S309). When the set frequency is equal to or larger than the driving frequency, the driving frequency is retained as it is, and the reference data RD2 is compared with the current detecting data CD detected at S307 (S310) When the current detecting data CD is smaller than the reference data RD2, a phase controller 302 increases the phase difference between VC1 and VC2 by 1 Step (S312). When the current detecting data CD is larger than the reference data RD2, the phase controller 302 decreases the phase difference between VC1 and VC2 by 1 Step (S311). Furthermore, when the current detecting data CD is the same as the reference data RD2, the phase controller 302 maintains the phase difference as it is. Then, the digital controller 300 outputs the driving control signals VC1 and VC2 after converting them from a digital value to an analog value (S313).

As described above, according to the present embodiment, a piezoelectric transformer can be operated in the vicinity of a resonance frequency with a high efficiency. Furthermore, the driving can be controlled easily at a single frequency, and the miniaturization of a circuit and high efficiency can be realized.

Furthermore, since the above control method involves only the control of a phase difference of switching, even if the frequency of the reference clock of μCOM is low, control with high reliability is made possible.

Furthermore, in the same way as in Embodiment 1, by controlling the startup as shown in FIG. 5, a lighting start voltage can be lowered. In the case where a rising speed of an applied voltage is changed in at least two stages, by retaining a time interval of a frequency change as it is and making a change width of a frequency (change width of 1 Step of a frequency) smaller during a change period from a voltage V1 to V2 than during a change period up to a voltage V1, the rising speed of an output voltage of a piezoelectric transformer can be lowered while the internal processing is retained as it is. Consequently, significant effects in a decrease in a lighting start voltage of a cold-cathode fluorescent tube and reliability of a piezoelectric transformer are obtained by finely controlling the driving frequency of the piezoelectric transformer.

Furthermore, in the same way as in Embodiment 1, by controlling a phase difference as shown in FIG. 7, the same effects as those in Embodiment 1 can be obtained.

Figure 21:
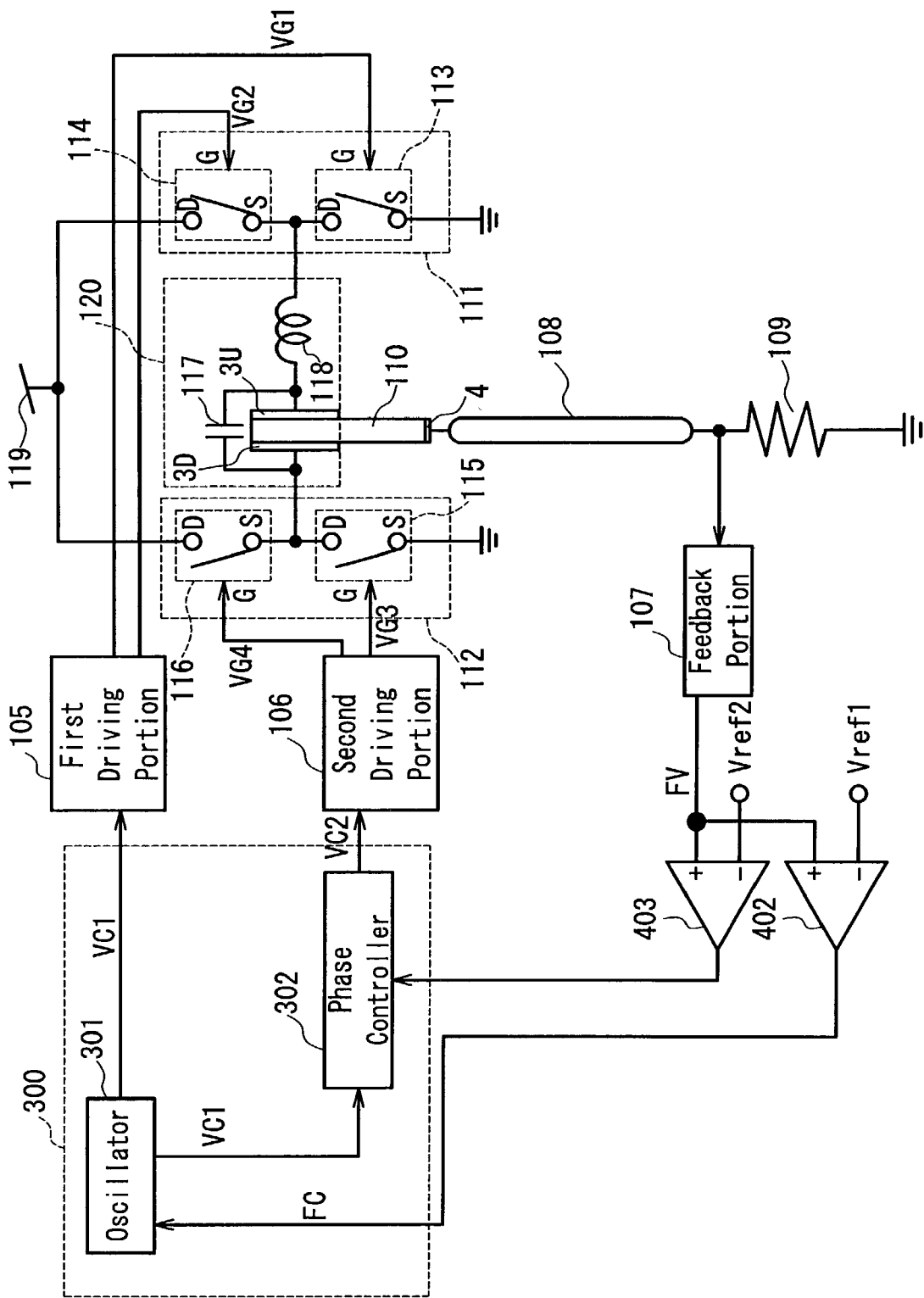
FIG. 21 is a block diagram showing a modified example of a driving circuit for a piezoelectric transformer of Embodiment 3 according to the present invention.

In the above description, the A/D converter 104 and the comparator 303 are provided in the digital controller 300. However, as shown in FIG. 21, a first analog comparator 402 and a second analog comparator 403 may be provided outside of the digital controller 300, instead of the A/D converter 104 and the comparator 303.

In this case, the first comparator 402 compares a current detecting value FV from the feedback portion 107 with a first reference voltage Vref1. When the current detecting value FV is smaller than the first reference voltage Vref1, the first comparator 402 supplies a logic low level to the oscillator 301 of the digital controller 300 as a frequency control signal FC. When the current detecting value FV is equal to or larger than the reference voltage Vref1, the first comparator 402 supplies a logic high level to the oscillator 301 of the digital controller 300 as a frequency control signal FC.

Furthermore, the second comparator 403 compares a current detecting value FV from the feedback portion 107 with a second reference voltage Vref2. When the current detecting value FV is smaller than the second reference voltage Vref2, the second comparator 403 supplies a logic low level to the phase controller 302 of the digital controller 300. When the current detecting value FV is equal to or larger than the second reference voltage Vref2, the second comparator 403 supplies a logic high level to the phase controller 302 of the digital controller 300.

According to this configuration, the low-speed A/D converter and the comparator in the digital controller 300 are not necessary, which results in a high-speed operation and a low cost.

Embodiment 4

In Embodiment 4 of the present invention, a piezoelectric transformer is excited in a vibration mode of a $\lambda$ mode at the commencement of lighting of a cold-cathode fluorescent tube. The circuit configuration of the present embodiment is the same as that of Embodiment 3 shown in FIG. 17, and FIG. 17 will be referred to, if required.

Figure 22A:
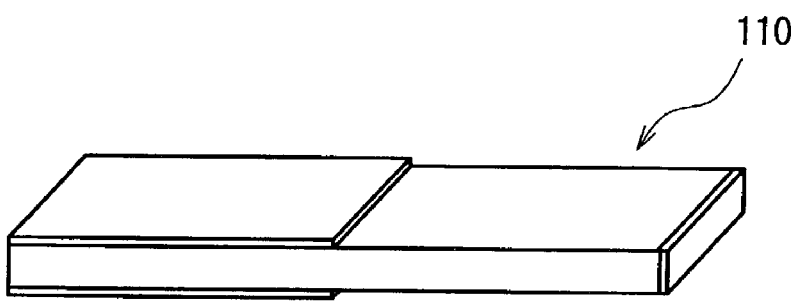
FIG. 22A is a perspective view showing a piezoelectric transformer of Embodiment 4 according to the present invention.
Figure 22B:
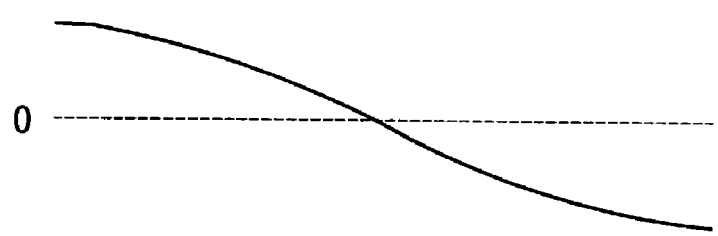
FIGS. 22B and 22C respectively show displacement distributions in a $\lambda/2$ vibration mode and a $\lambda$ vibration mode of the piezoelectric transformer shown in FIG. 22A.
Figure 22C:
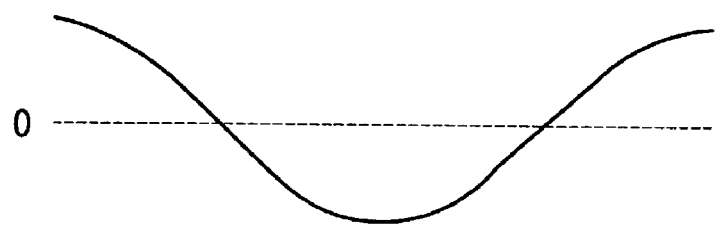

FIGS. 22A, 22B, and 22C show a relationship between a vibration mode and a displacement of a piezoelectric transformer. The configuration of a piezoelectric transformer 110 shown in FIG. 22A is called a Rosen type configuration, and the principle of its operation is as described in the prior art. The piezoelectric transformer 110 with this configuration can be excited both in a $\lambda/2$ mode (half wavelength with respect to the length as shown in FIG. 22B), and a $\lambda$ mode (one wavelength as shown in FIG. 22C). The use of a $\lambda/2$ mode is suitable for miniaturization at the same frequency, whereas a $\lambda$ mode is suitable for reducing distortion. In particular, when the light-emission of the cold-cathode fluorescent tube 108 is controlled by using the piezoelectric transformer 110, large distortion occurs at the commencement of lighting. Therefore, the piezoelectric transformer 110 can be driven with smaller distortion in a $\lambda$ mode.

A method for controlling the cold-cathode fluorescent tube 108 using such a vibration mode of the piezoelectric transformer 110 at the commencement of lighting will be described.

Figure 23:
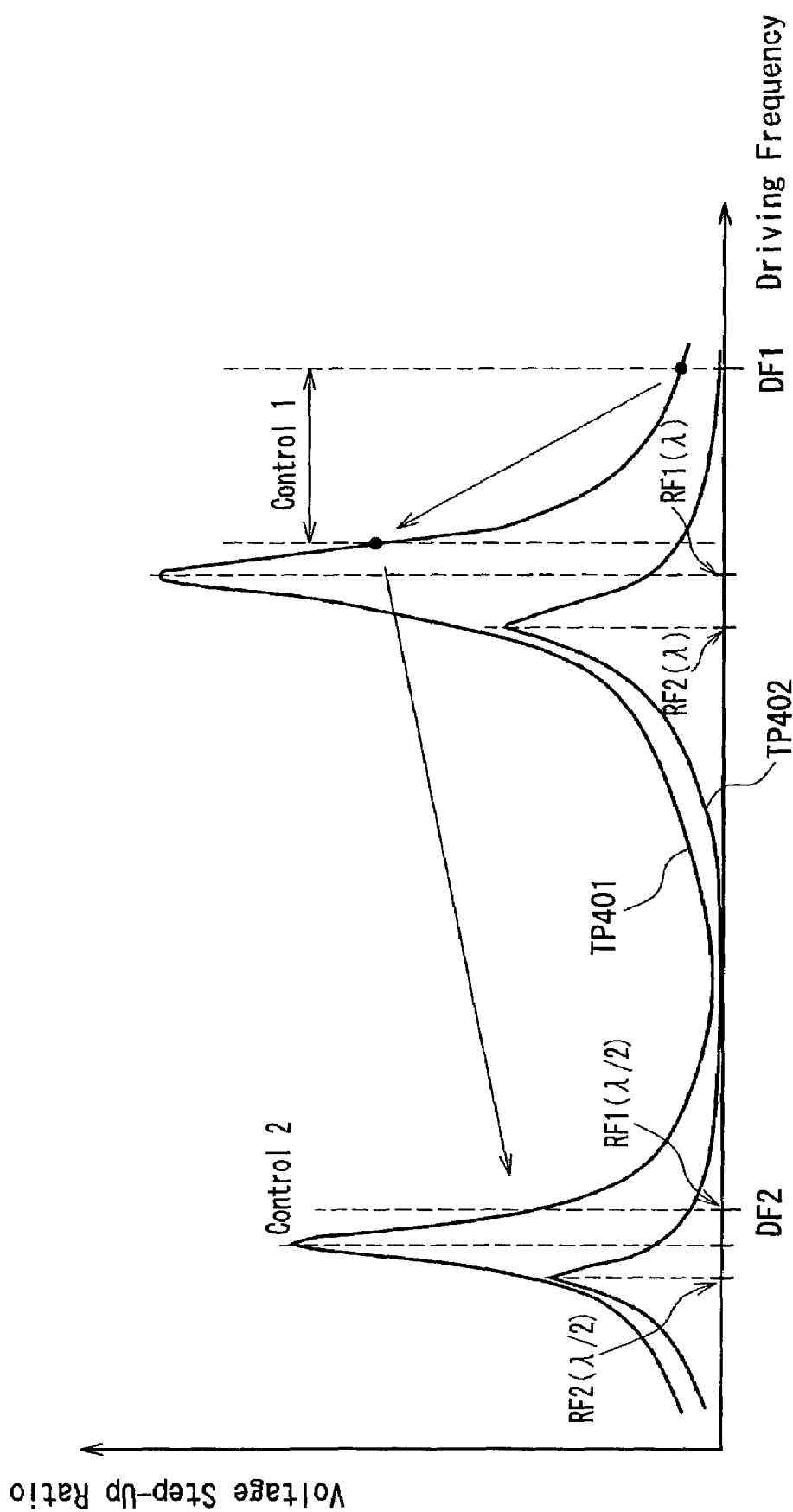
FIG. 23 shows frequency characteristics of a voltage step-up ratio of a piezoelectric transformer for illustrating the control in Embodiment 4 according to the present invention.

FIG. 23 shows frequency characteristics of a voltage step-up ratio of the piezoelectric transformer 110 shown in FIG. 22A. In FIG. 23, a curve TP401 represents frequency characteristics of a voltage step-up ratio of the piezoelectric transformer 110 before a current flows through the cold-cathode fluorescent tube 108. A curve TP402 represents frequency characteristics of a voltage step-up ratio of the piezoelectric transformer 110 when a current flows through the cold-cathode fluorescent tube 108.

In the driving control of the present embodiment, a lighting operation is performed in a vibration mode with a higher order (herein, a $\lambda$ vibration mode) before the commencement of lighting. During steady lighting, a lighting operation is performed in a lower vibration mode with a lower order (herein, a $\lambda/2$ vibration mode).

At the commencement of lighting, the start frequency of frequency sweep is set at the driving frequency DF1 with respect to resonance characteristics of a $\lambda$ vibration mode. At this time, the driving frequency DF1 and the resonance frequency RF1($\lambda$) (at which a voltage step-up ratio under a no-load condition becomes maximum) are set so as to maintain the relationship: driving frequency DF1>resonance frequency RF1($\lambda$), as shown in FIG. 23, and frequency sweep is performed in accordance with the processing of control 1.

When a current starts flowing through the cold-cathode fluorescent tube 108, a load impedance is decreased and a voltage step-up ratio also is decreased. As a result, characteristics are changed from the curve TP401 to the curve TP402. Then, the driving frequency of the piezoelectric transformer 110 is taken from the curve TP402 rather than the curve TP401.

The control of the piezoelectric transformer 110 is shifted from the control 1 to the control 2, and consequently, the driving frequency is fixed at the driving frequency DF2. At this time, the vibration mode of the piezoelectric transformer 110 is changed from the $\lambda$ vibration mode to the $\lambda/2$ vibration mode.

At this time, the driving frequency DF2 and the resonance frequency RF2 ($\lambda/2$) are set so as to satisfy the relationship: driving frequency DF2>resonance frequency RF2 ($\lambda/2$).

When the output voltage of the piezoelectric transformer 110 reaches the lighting start voltage of the cold-cathode fluorescent tube 108 in the control 1 of the driving circuit shown in FIG. 17, a current flows through the cold-cathode fluorescent tube 108, and a voltage is generated in the current detecting resistor 109. This voltage is converted to current detecting data CD having a digital value by the A/D converter 104 through the feedback portion 407. Thereafter, the current detecting data CD is compared with the reference data RD1 in the comparator 303.

When the current detecting data CD is larger than the reference data RD1, the processing is shifted from the control 1 to the control 2. In the control 2, the driving frequency is set at the driving frequency DF2 on the curve TP402. Furthermore, at the same time as the frequency sweep, the current detecting data CD corresponding to a tube current is compared with the reference data RD2. When the reference data RD2 is larger than the current detecting data CD, the phase difference between VC1 and VC2 is increased by 1 Step. When the reference data RD2 is smaller than the current detecting data CD, the phase difference is decreased by 1 Step. Furthermore, when the reference data RD2 substantially is matched with the current detecting data CD, the phase difference is retained as it is.

Figure 24:
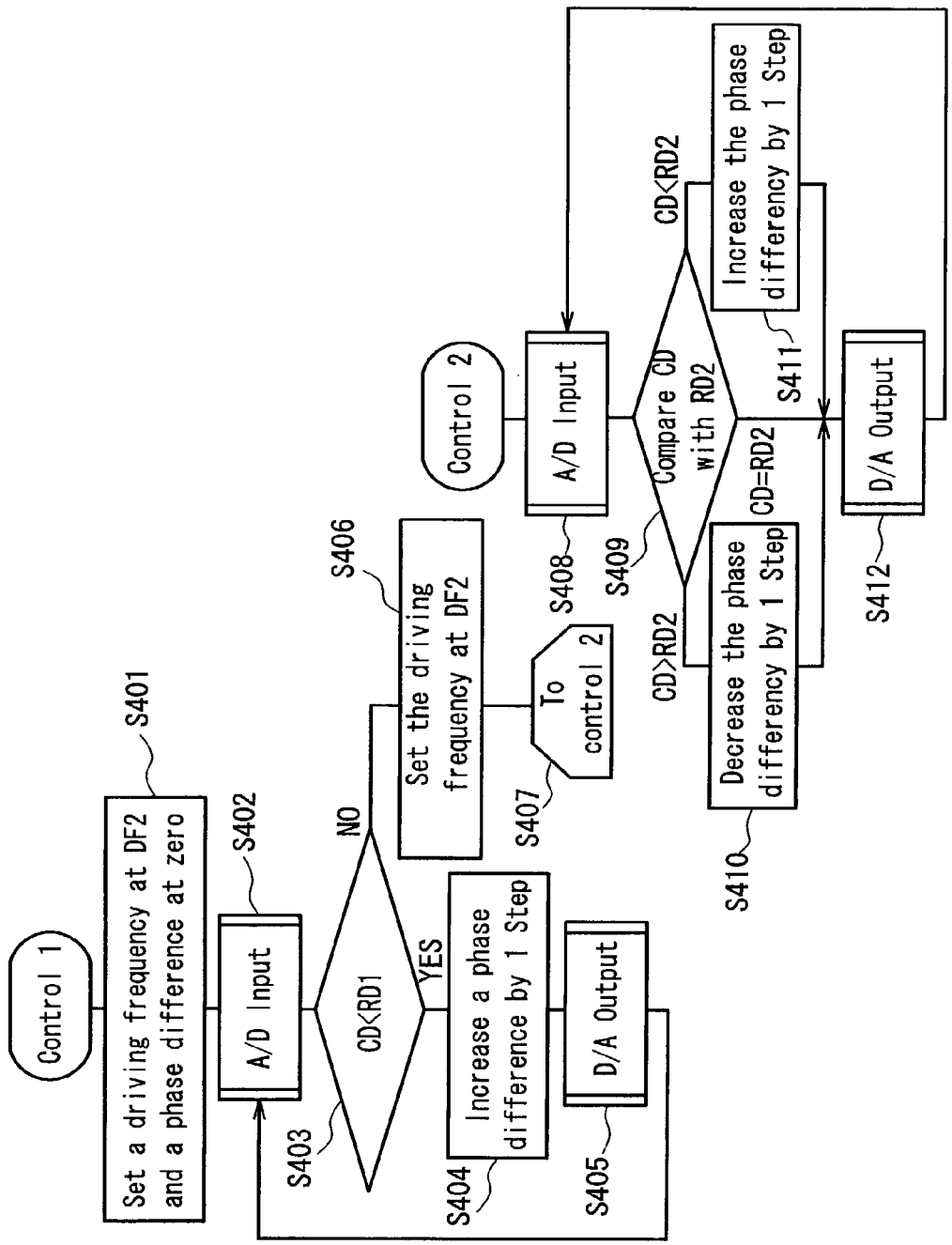
FIG. 24 is a flow chart showing an operation of a digital controller of Embodiment 4.

FIG. 24 is a flow chart illustrating an operation of the digital controller 300 in the present embodiment. In FIG. 24, when the driving circuit is started up, the oscillation frequency at the oscillator 301 is set at the driving frequency DF1, and the phase difference between VC1 and VC2 is set to be zero (S401). Thereafter, a current flowing through the cold-cathode fluorescent tube 108 is converted to current detecting data CD having a digital value by the A/D converter 104 (S402). In the comparator 303, the current detecting data CD is compared with the reference data RD1 (S403). When the current detecting data CD is smaller than the reference data RD1, the driving frequency is decreased by 1 Step (S404). The digital controller 300 outputs the control signals VC1 and VC2 with the phase difference being retained as it is and only the driving frequency decreased by 1 Step, after converting them from a digital value to an analog value (S405), for driving.

After a predetermined period, a current flowing through the cold-cathode fluorescent tube 108 is converted again to current detecting data CD by the A/D converter 104 (S402). In the comparator 303, the current detecting data CD is compared with the reference data RD1 (S403). When the current detecting data CD is equal to or larger than the reference data RD1, the comparator 303 sets the oscillation frequency of the oscillator 301 to be the driving frequency DF2 (S406). Then, the processing is shifted to the control 2 (S407).

In the processing of the control 2, a current of the cold-cathode fluorescent tube 108 is converted to current detecting data CD by the A/D converter (S408). Then, the reference data RD2 is compared with the current detecting data CD detected at S408 (S409). When the current detecting data CD is smaller than the reference data RD2, the phase difference between VC1 and VC2 is increased by 1 Step (S411). When the current detecting data CD is larger than the reference data RD2, the phase difference is decreased by 1 Step (S410). Furthermore, when the current detecting data CD is the same as the reference data RD2, the phase difference is retained as it is. Then, the digital controller 300 outputs the control signals VC1 and VC2 after converting them from a digital value to an analog value (S412).

As described above, according to the present embodiment, a piezoelectric transformer can be operated in the vicinity of a resonance frequency with a high efficiency. Furthermore, the driving can be controlled easily at a single frequency, and the miniaturization of a circuit and high efficiency can be realized.

Furthermore, since the above control method involves only the control of a phase difference of switching, even if the frequency of the reference clock of μCOM is low, control with high reliability is made possible.

Furthermore, in the same way as in Embodiment 1, by controlling the startup as shown in FIG. 5, a lighting start voltage can be lowered. In the case where a rising speed of an applied voltage is changed in at least two stages, by retaining a time interval of a frequency change as it is and making a change width of a frequency (change width of 1 Step of a frequency) smaller during a change period from a voltage V1 to V2 than during a change period up to a voltage V1, the rising speed of an output voltage of a piezoelectric transformer can be lowered while the internal processing is retained as it is. Consequently, there are great effects in a decrease in a lighting start voltage of a cold-cathode fluorescent tube and reliability of a piezoelectric transformer obtained by finely controlling the driving frequency of the piezoelectric transformer.

Furthermore, in the same way as in Embodiment 1, by controlling a phase difference as shown in FIG. 7, the same effects as those in Embodiment 1 can be obtained.

Embodiment 5

Figure 25:
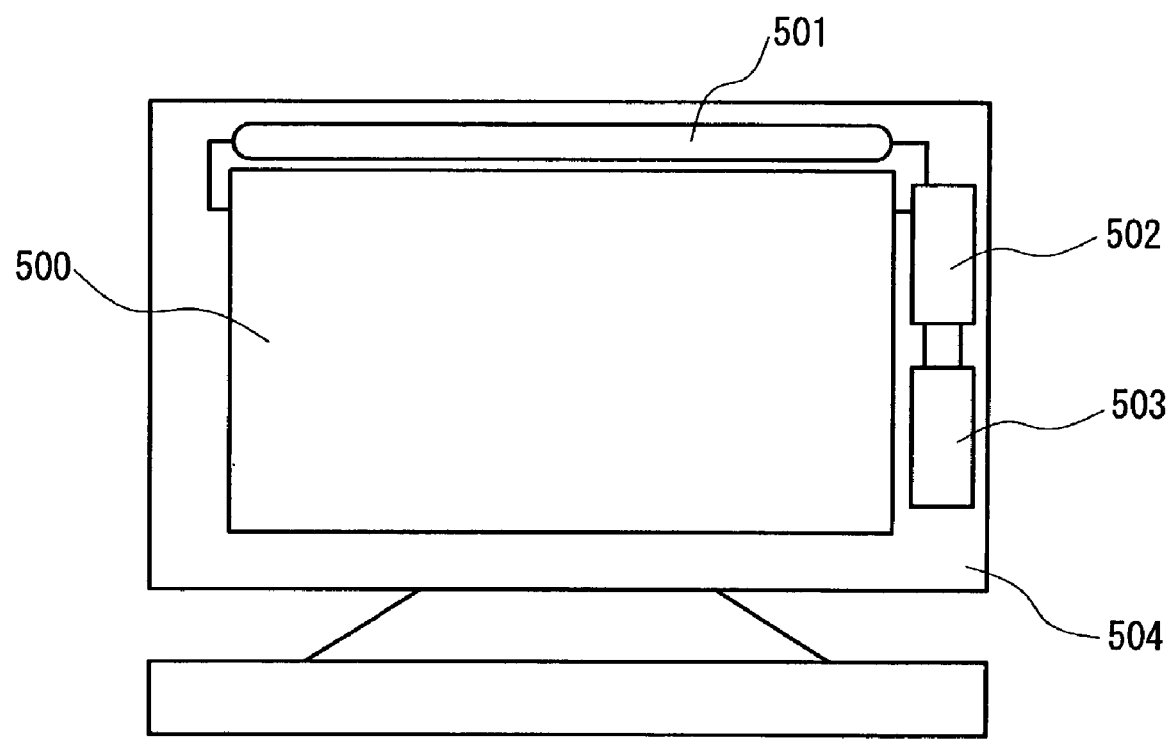
FIG. 25 is a schematic view showing an exemplary configuration of a liquid crystal monitor of Embodiment 5 according to the present invention.
Figure 26:
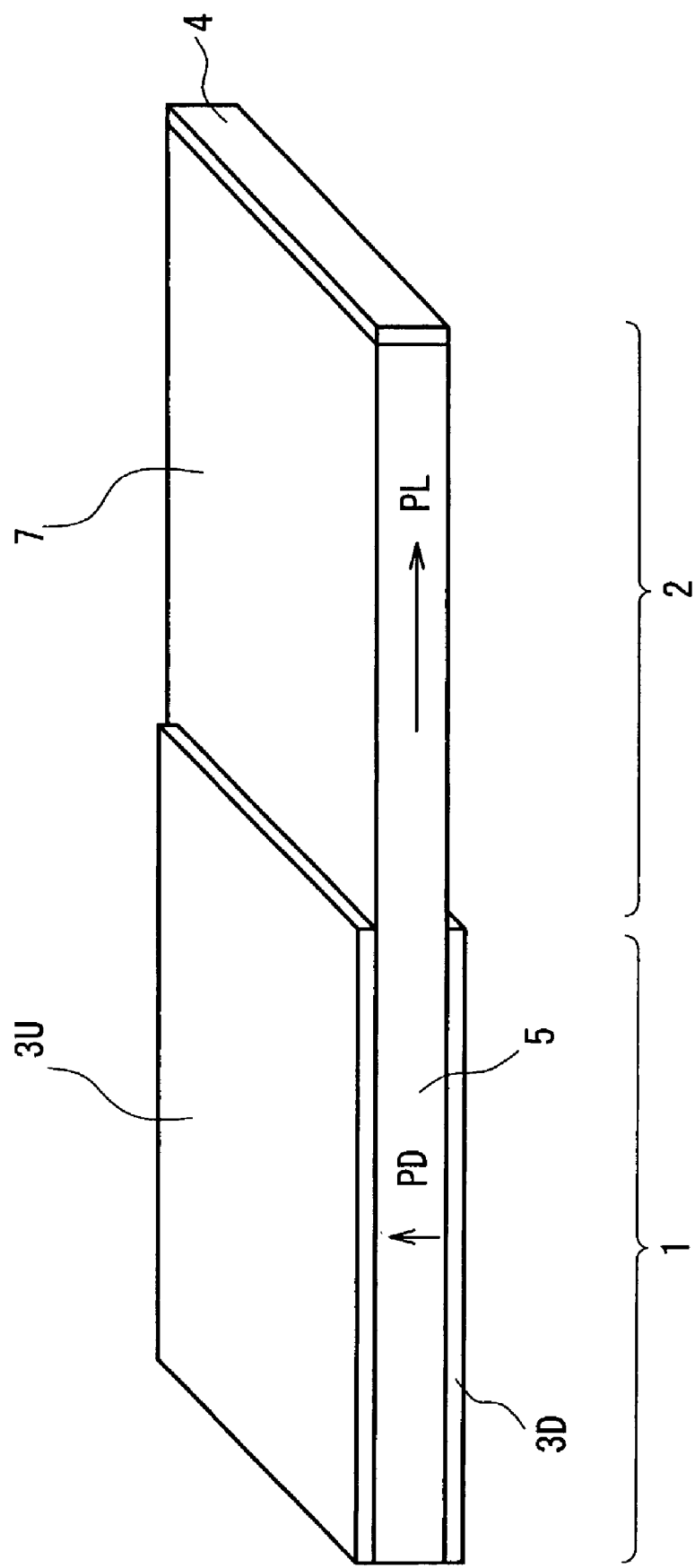
FIG. 26 is a perspective view showing a configuration of a Rosen type piezoelectric transformer as one example of a conventional piezoelectric transformer.
Figure 27:
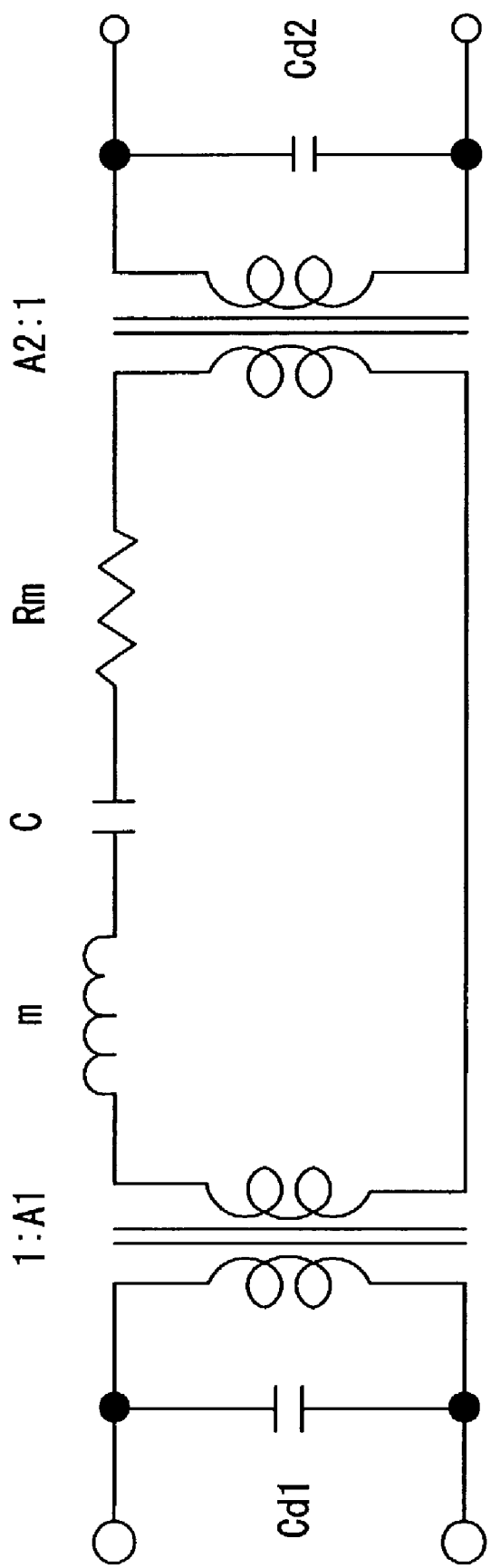
FIG. 27 is an equivalent circuit diagram in the vicinity of a resonance frequency of the piezoelectric transformer shown in FIG. 26.
Figure 28:
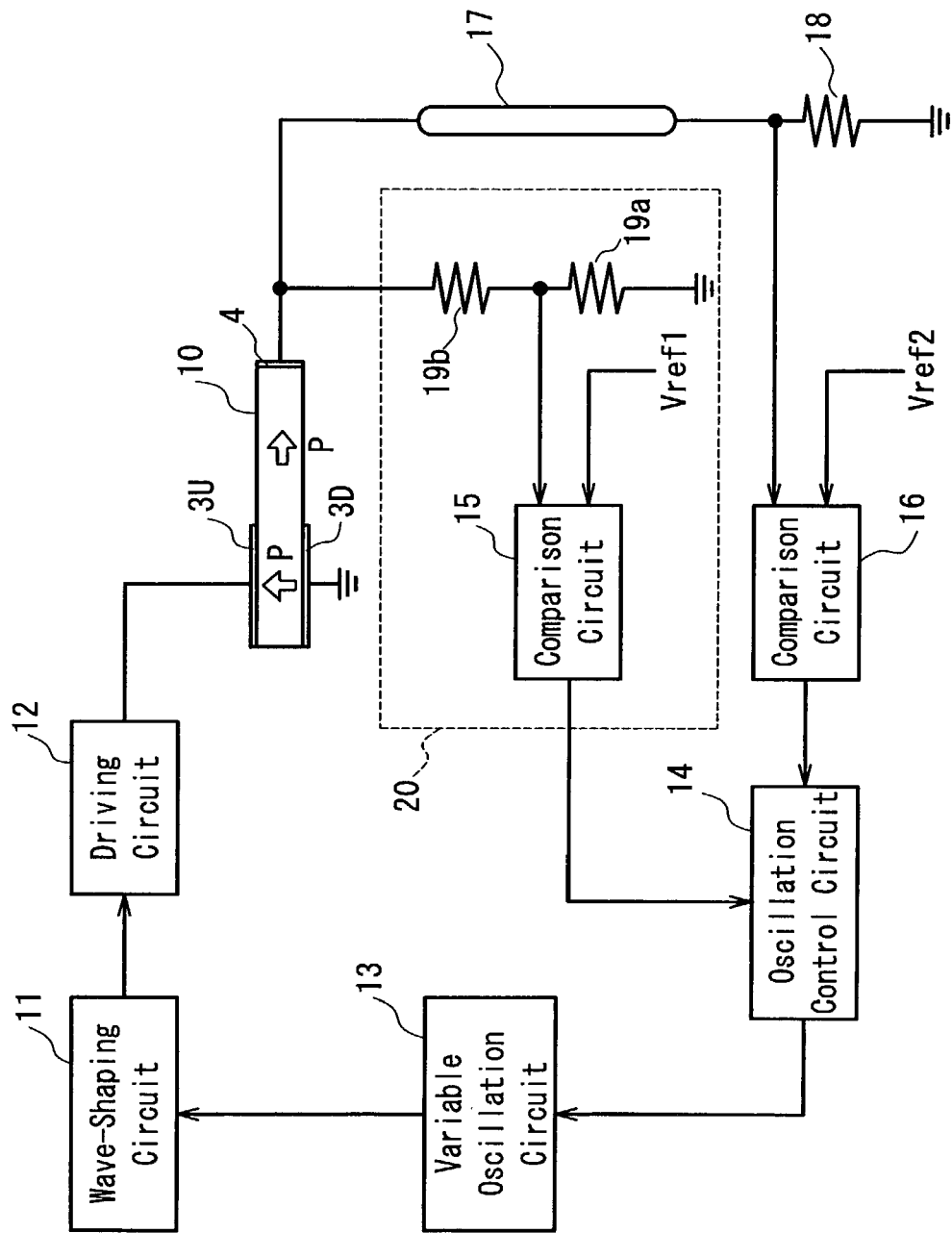
FIG. 28 is a block diagram showing an exemplary configuration of a conventional driving circuit for the piezoelectric transformer shown in FIG. 26.

FIG. 25 is a schematic view showing an exemplary configuration of a liquid crystal monitor of Embodiment 5 according to the present invention. In FIG. 25, reference numeral 501 denotes a cold-cathode fluorescent tube, 502 denotes an inverter composed of the driving circuit for the piezoelectric transformer of any of Embodiments 1 to 4, and 503 denotes a liquid crystal controller. The liquid crystal controller 503 includes a digital controller of the inverter 502. Furthermore, reference numeral 500 denotes a liquid crystal display portion, which is illuminated by the cold-cathode fluorescent tube 501.

In a liquid crystal monitor thus composed, an inverter circuit for a liquid crystal backlight can be miniaturized and driven at a high efficiency. Furthermore, waveform distortion of a driving voltage of a piezoelectric transformer can be reduced.

Furthermore, in the present embodiment, a liquid crystal monitor is composed. However, even if the digital controller of any of Embodiments 1 to 4 is integrated with a part of a tuner function of a liquid crystal TV, the same effects can be obtained.

As described above, according to the present invention, for example, a digital controller of a piezoelectric transformer can be integrated with a microcomputer for controlling liquid crystal. Consequently, the piezoelectric transformer can be controlled digitally, and the driving circuit can be miniaturized (number of parts is reduced). Furthermore, by driving the piezoelectric transformer at a fixed frequency, the piezoelectric transformer can be driven at a frequency with a good efficiency and in a sine wave. Therefore, a loss caused by the piezoelectric transformer can be reduced.

Furthermore, by setting the driving frequency of the piezoelectric transformer so as not to include higher order components of another vibration mode and a desired vibration mode in harmonics, waveform distortion of a voltage can be reduced.

Furthermore, in the case of another vibration mode, by setting the phase difference of driving control signals so as not to include a frequency component of the another vibration mode, the degree of freedom in setting a frequency is enhanced.

Furthermore, by driving at a single frequency, a reference clock of a high frequency is not required for a microcomputer for control. This is advantageous in terms of a practical use.

Furthermore, by changing the vibration mode of the piezoelectric transformer at the commencement of lighting and during steady lighting, driving taking advantage of the respective features is made possible, and an inverter circuit can be miniaturized easily.

Furthermore, by replacing the A/ID converter and the comparator constituting the digital controller by an external comparator, low-speed A/D converter and comparator are not necessary, which results in a high-speed operation and a low cost.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A driving circuit for a piezoelectric transformer, comprising:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which a cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with reference data; and a phase controller changing a phase difference between the first and second control signals based on a comparison result from the comparator, wherein at a commencement of lighting of the cold-cathode fluorescent tube, the control portion fixes frequencies of the first and second control signals at a predetermined frequency, and controls the phase difference between the first and second control signals so that an output power of the piezoelectric transformer becomes from substantially zero to a predetermined output power, and after lighting of the cold-cathode fluorescent tube, the control portion controls the phase difference between the first and second control signals so that the current detecting data substantially is matched with the reference data.

2. The driving circuit for a piezoelectric transformer according to claim 1, wherein the control portion controls the phase difference between the first and second control signals at a phase sweep speed in at least two stages during startup of the driving circuit.

3. The driving circuit for a piezoelectric transformer according to claim 2, wherein the control portion sweeps at a first phase sweep speed until the cold-cathode fluorescent tube lights up half, and at a second phase sweep speed until emission brightness of the cold-cathode fluorescent tube reaches a set value.

4. The driving circuit for a piezoelectric transformer according to claim 3, wherein the first phase sweep speed is higher than the second phase sweep speed.

5. The driving circuit for a piezoelectric transformer according to claim 2, wherein the control portion changes a change ratio of a phase difference to a time in accordance with an impedance of the cold-cathode fluorescent tube.

6. The driving circuit for a piezoelectric transformer according to claim 1, wherein the control portion controls brightness of the cold-cathode fluorescent tube by changing the reference data.

7. The driving circuit for a piezoelectric transformer according to claim 6, wherein the control portion controls brightness of the cold-cathode fluorescent tube by turning on/off the cold-cathode fluorescent tube alternately to perform burst driving.

8. The driving circuit for a piezoelectric transformer according to claim 7, wherein the control portion controls brightness of the cold-cathode fluorescent tube by changing a ratio between a set time of first reference data and a set time of second reference data.

9. The driving circuit for a piezoelectric transformer according to claim 7, wherein the control portion controls brightness of the cold-cathode fluorescent tube by changing a change ratio from first reference data to second reference data.

10. The driving circuit for a piezoelectric transformer according to claim 8 or 9, wherein a switching frequency of the first reference data and the second reference data is 1 kHz or less.

11. The driving circuit for a piezoelectric transformer according to claim 1, wherein the control portion sets the frequencies of the first and second control signals and the phase difference therebetween so that a frequency component corresponding to a vibration mode of a frequency higher than a desired vibration mode of the piezoelectric transformer is not included.

12. The driving circuit for a piezoelectric transformer according to claim 1, wherein the third series connection body includes a capacitor connected between the pair of input electrodes of the piezoelectric transformer.

13. The driving circuit for a piezoelectric transformer according to claim 1, wherein the control portion is controlled by a microcomputer.

14. The driving circuit for a piezoelectric transformer according to claim 13, wherein the control portion is mounted in one chip together with the microcomputer.

15. A driving circuit for a piezoelectric transformer, comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which a cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor as a current detecting value after rectifying it;

a comparator comparing the current detecting value from the feedback portion with a reference voltage value; and a control portion receiving a comparison result from the comparator to output first and second control signals respectively to the first and second driving portions, the control portion comprising a phase controller changing a phase difference between the first and second control signals based on the comparison result from the comparator, wherein at a commencement of lighting of the cold-cathode fluorescent tube, the control portion fixes frequencies of the first and second control signals at a predetermined frequency, and controls the phase difference between the first and second control signals so that an output power of the piezoelectric transformer becomes from substantially zero to a predetermined output power, and after lighting of the cold-cathode fluorescent tube, the control portion controls the phase difference between the first and second control signals so that the current detecting value substantially is matched with the reference voltage value.

16. A method for driving a piezoelectric transformer using:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which a cold-cathode fluorescent tube and a current detecting resistor are connected in series;

a first driving portion receiving a first control signal to generate the first and second driving signals;

a second driving portion receiving a second control signal to generate the third and fourth driving signals; and a feedback portion returning a voltage signal generated at the current detecting resistor after rectifying it, the method comprising:

at a commencement of lighting of the cold-cathode fluorescent tube, fixing frequencies of the first and second control signals at a predetermined frequency;

controlling the phase difference between the first and second control signals so that an output power of the piezoelectric transformer becomes from substantially zero to a predetermined output power;

after lighting of the cold-cathode fluorescent tube, comparing current detecting data corresponding to the voltage signal from the feedback portion with reference data; and controlling the phase difference between the first and second control signals so that the current detecting data substantially is matched with the reference data.

17. A driving circuit for a piezoelectric transformer, comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which a cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with first or second reference data; and a phase controller changing a phase difference between the first and second control signals based on a comparison result from the comparator, wherein at a commencement of lighting of the cold-cathode fluorescent tube, the control portion fixes frequencies of the first and second control signals at a first frequency, and controls the phase difference between the first and second control signals so that an output power of the piezoelectric transformer becomes from substantially zero to a predetermined output power, and when the current detecting data becomes the first reference data or more, the control portion fixes the frequencies of the first and second control signals at a second frequency, and controls the phase difference between the first and second control signals so that the current detecting data substantially is matched with the second reference data.

18. The driving circuit for a piezoelectric transformer according to claim 17, wherein the first frequency is higher than the second frequency.

19. The driving circuit for a piezoelectric transformer according to claim 17, wherein the control portion controls the phase difference between the first and second control signals fixed at the first frequency at a phase sweep speed in at least two stages.

20. The driving circuit for a piezoelectric transformer according to claim 17, wherein the control portion sweeps at a first phase sweep speed until the cold-cathode fluorescent tube lights up half, and at a second phase sweep speed until the current detecting data reaches the first reference data.

21. The driving circuit for a piezoelectric transformer according to claim 20, wherein the first phase sweep speed is higher than the second phase sweep speed.

22. The driving circuit for a piezoelectric transformer according to claim 17, wherein, in phase difference control of the first and second control signals fixed at the first frequency, when the current detecting data has not reached the first reference data within a predetermined time, the control portion changes the frequencies of the first and second control signals to a frequency lower than the first frequency and higher than a resonance frequency under a no-load condition of the piezoelectric transformer.

23. The driving circuit for a piezoelectric transformer according to claim 22, wherein the control portion changes the frequencies by a predetermined number of times.

24. The driving circuit for a piezoelectric transformer according to claim 23, wherein the control portion decreases a change width of the frequencies as they approach the resonance frequency of the piezoelectric transformer.

25. The driving circuit for a piezoelectric transformer according to claim 17, wherein the first frequency is higher than a resonance frequency of the piezoelectric transformer when the cold-cathode fluorescent tube is not lighting, and the second frequency is higher than a resonance frequency of the piezoelectric transformer when the cold-cathode fluorescent tube is lighting and lower than the first frequency.

26. The driving circuit for a piezoelectric transformer according to claim 17, wherein the control portion changes a change ratio of a phase difference to a time in accordance with an impedance of the cold-cathode fluorescent tube.

27. The driving circuit for a piezoelectric transformer according to claim 17, wherein the control portion controls brightness of the cold-cathode fluorescent tube by changing the second reference data.

28. The driving circuit for a piezoelectric transformer according to claim 27, wherein the control portion controls brightness of the cold-cathode fluorescent tube by turning on/off the cold-cathode fluorescent tube alternately to perform burst driving.

29. The driving circuit for a piezoelectric transformer according to claim 28, wherein the control portion controls brightness of the cold-cathode fluorescent tube by changing a ratio between a set time of the first reference data and a set time of the second reference data.

30. The driving circuit for a piezoelectric transformer according to claim 28, wherein the control portion controls brightness of the cold-cathode fluorescent tube by changing a change ratio from the first reference data to the second reference data.

31. The driving circuit for a piezoelectric transformer according to claim 29 or 30, wherein a switching frequency of the first reference data and the second reference data is 1 kHz or less.

32. The riving circuit for a piezoelectric transformer according to claim 17, wherein the control portion sets the frequencies of the first and second control signals and the phase difference therebetween so that a frequency component corresponding to a vibration mode of a frequency higher than a desired vibration mode of the piezoelectric transformer is not included.

33. The driving circuit for a piezoelectric transformer according to claim 17, wherein the third series connection body includes a capacitor connected between the pair of input electrodes of the piezoelectric transformer.

34. The driving circuit for a piezoelectric transformer according to claim 17, wherein the control portion is controlled by a microcomputer.

35. The driving circuit for a piezoelectric transformer according to claim 34, wherein the control portion is mounted in one chip together with the microcomputer.

36. A driving circuit for a piezoelectric transformer, comprising:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which a cold-cathode fluorescent tube and a current detecting resistor are connected in series;
a first driving portion generating the first and second driving signals;
a second driving portion generating the third and fourth driving signals;
a feedback portion returning a voltage signal generated at the current detecting resistor after rectifying it;
a first comparator comparing the current detecting value from the feedback portion with a first reference voltage value;
a second comparator comparing the current detecting value from the feedback portion with a second reference voltage value; and
a control portion receiving a comparison result from the first or second comparator to output first and second control signals respectively to the first and second driving portions,
the control portion comprising a phase controller changing a phase difference between the first and second control signals based on the comparison result from the first or second comparator, wherein
at a commencement of lighting of the cold-cathode fluorescent tube, the control portion fixes frequencies of the first and second control signals at a first frequency, and controls the phase difference between the first and second control signals so that an output power of the piezoelectric transformer becomes from substantially zero to a predetermined output power, and
when the current detecting value becomes the first reference voltage value or more, the control portion fixes the frequencies of the first and second control signals at a second frequency, and controls the phase difference between the first and second control signals so that the current detecting value substantially is matched with the second reference voltage value.

37. A method for driving a piezoelectric transformer using:
- a first series connection body connected to both terminals of a DC power source, in which first and second switching members are turned on/off alternately by first and second driving signals and are connected in series;
- a second series connection body connected in parallel with the first series connection body, in which third and fourth switching members are turned on/off alternately by third and fourth driving signals respectively having the same frequency and duty ratio as those of the first and second driving signals and are connected in series;
- a piezoelectric transformer outputting a voltage, which is input from a primary side electrode, from a secondary side electrode after stepping-up or down the voltage by using a piezoelectric effect;
- a third series connection body connected between a connection point of each switching member of the first series connection body and a connection point of each switching member of the second series connection body, including an inductor and a pair of input electrodes of the piezoelectric transformer;
- a fourth series connection body connected between a pair of output electrodes of the piezoelectric transformer, in which a cold-cathode fluorescent tube and a current detecting resistor are connected in series;
- a first driving portion receiving a first control signal to generate the first and second driving signals;
- a second driving portion receiving a second control signal to generate the third and fourth driving signals; and
- a feedback portion returning a voltage signal generated at the current detecting resistor after rectifying it, the method comprising: at a commencement of lighting of the cold-cathode fluorescent tube, fixing frequencies of the first and second control signals at a first frequency;

controlling the phase difference between the first and second control signals so that an output power of the piezoelectric transformer becomes from substantially zero to a predetermined output power;

comparing current detecting data corresponding to the voltage signal from the feedback portion with first reference data;

when the current detecting data becomes the first reference data or more, fixing the frequencies of the first and second control signals at a second frequency;

comparing the current detecting data with second reference data; and controlling the phase difference between the first and second control signals so that the current detecting data substantially is matched with the second reference data.

38. A driving circuit for a piezoelectric transformer, comprising:
- a first series connection body connected to both terminals of a DC power source, in which first and second switching members are turned on/off alternately by first and second driving signals and are connected in series;
- a second series connection body connected in parallel with the first series connection body, in which third and fourth switching members are turned on/off alternately by third and fourth driving signals respectively having the same frequency and duty ratio as those of the first and second driving signals and are connected in series;
- a piezoelectric transformer outputting a voltage, which is input from a primary side electrode, from a secondary side electrode after stepping-up or down the voltage by using a piezoelectric effect;
- a third series connection body connected between a connection point of each switching member of the first series connection body and a connection point of each switching member of the second series connection body, including an inductor and a pair of input electrodes of the piezoelectric transformer;
- a fourth series connection body connected between a pair of output electrodes of the piezoelectric transformer, in which a cold-cathode fluorescent tube and a current detecting resistor are connected in series;
- a first driving portion generating the first and second driving signals;
- a second driving portion generating the third and fourth driving signals;
- a feedback portion returning a voltage signal generated at the current detecting resistor after rectifying it; and
- a control portion receiving the voltage signal from the feedback portion to output first and second control signals respectively to the first and second driving portions, the control portion comprising:
- an A/D converter converting the voltage signal from the feedback portion to current detecting data having a digital value;
- a comparator comparing the current detecting data from the A/D converter with first or second reference data; and
- a phase controller changing a phase difference between the first and second control signals based on a comparison result from the comparator, wherein
at a commencement of lighting of the cold-cathode fluorescent tube, the control portion fixes the phase difference between the first and second control signals, and sweeps the frequencies of the first and second control signals from a start frequency to a stop frequency, and
when the current detecting data becomes the first reference data or more during frequency sweep, the control portion performs the frequency sweep until the stop frequency is reached, and simultaneously controls the phase difference between the first and second control signals so that the current detecting data substantially is matched with the second reference data.

39. The driving circuit for a piezoelectric transformer according to claim 38, wherein the control portion performs the frequency sweep at a sweep speed in at least two stages.

40. The driving circuit for a piezoelectric transformer according to claim 39, wherein after performing the frequency sweep at the first sweep speed, the control portion sets a time interval for changing the frequencies to be constant and sets a change width of the frequencies to be smaller than the first sweep speed, and performs the frequency sweep at a second sweep speed.

41. The driving circuit for a piezoelectric transformer according to claim 38, wherein the control portion changes a change ratio of a phase difference to a time in accordance with an impedance of the cold-cathode fluorescent tube.

42. The driving circuit for a piezoelectric transformer according to claim 38, wherein the control portion controls brightness of the cold-cathode fluorescent tube by changing the second reference data.

43. The driving circuit for a piezoelectric transformer according to claim 42, wherein the control portion controls brightness of the cold-cathode fluorescent tube by turning on/off the cold-cathode fluorescent tube alternately to perform burst driving.

44. The driving circuit for a piezoelectric transformer according to claim 43, wherein the control portion controls brightness of the cold-cathode fluorescent tube by changing a ratio between a set time of the first reference data and a set time of the second reference data.

45. The driving circuit for a piezoelectric transformer according to claim 43, wherein the control portion controls brightness of the cold-cathode fluorescent tube by changing a change ratio from the first reference data to the second reference data.

46. The driving circuit for a piezoelectric transformer according to claim 44 or 45, wherein a switching frequency of the first reference data and the second reference data is 1 kHz or less.

47. The driving circuit for a piezoelectric transformer according to claim 38, wherein the control portion sets the frequencies of the first and second control signals and the phase difference therebetween so that a frequency component corresponding to a vibration mode of a frequency higher than a desired vibration mode of the piezoelectric transformer is not included.

48. The driving circuit for a piezoelectric transformer according to claim 38, wherein the third series connection body includes a capacitor connected between the pair of input electrodes of the piezoelectric transformer.

49. The driving circuit for a piezoelectric transformer according to claim 38, wherein the control portion is controlled by a microcomputer.

50. The riving circuit for a piezoelectric transformer according to claim 49, wherein the control portion is mounted in one chip together with the microcomputer.

51. A driving circuit for a piezoelectric transformer, comprising:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which a cold-cathode fluorescent tube and a current detecting resistor are connected in series;
a first driving portion generating the first and second driving signals;
a second driving portion generating the third and fourth driving signals;
a feedback portion returning a voltage signal generated at the current detecting resistor as a current detecting value after rectifying it;
a first comparator comparing the current detecting value from the feedback portion with a first reference voltage value;
a second comparator comparing the current detecting value from the feedback portion with a second reference voltage value; and
a control portion receiving a comparison result from the first or second comparator to output first and second control signals respectively to the first and second driving portions,
the control portion comprising a phase controller changing a phase difference between the first and second control signals based on the comparison result from the first or second comparator, wherein
at a commencement of lighting of the cold-cathode fluorescent tube, the control portion fixes the phase difference between the first and second control signals, and sweeps the frequencies of the first and second control signals from a start frequency to a stop frequency, and
when the current detecting value becomes the first reference voltage value or more during frequency sweep, the control portion performs the frequency sweep until the stop frequency is reached, and simultaneously controls the phase difference between the first and second control signals so that the current detecting value substantially is matched with the second reference voltage value.

52. A method for driving a piezoelectric transformer using:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which a cold-cathode fluorescent tube and a current detecting resistor are connected in series;
a first driving portion receiving a first control signal to generate the first and second driving signals;
a second driving portion receiving a second control signal to generate the third and fourth driving signals; and
a feedback portion returning a voltage signal generated at the current detecting resistor after rectifying it,
the method comprising:
at a commencement of lighting of the cold-cathode fluorescent tube, fixing a phase difference between the first and second control signals;
sweeping frequencies of the first and second control signals from a start frequency to a stop frequency;
during frequency sweep, comparing current detecting data corresponding to the voltage signal from the feedback portion with first reference data;

when the current detecting data becomes the first reference data or more during the frequency sweep, performing the frequency sweep until the stop frequency is reached;
comparing the current detecting data with second reference data; and
controlling the phase difference between the first and second control signals so that the current detecting data substantially is matched with the second reference data.

53. A driving circuit for a piezoelectric transformer, comprising:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which a cold-cathode fluorescent tube and a current detecting resistor are connected in series;
a first driving portion generating the first and second driving signals;
a second driving portion generating the third and fourth driving signals;
a feedback portion returning a voltage signal generated at the current detecting resistor after rectifying it; and
a control portion receiving the voltage signal from the feedback portion to output first and second control signals respectively to the first and second driving portions,
the control portion comprising:
an A/D converter converting the voltage signal from the feedback portion to current detecting data having a digital value;
a comparator comparing the current detecting data from the A/D converter with first or second reference data; and
a phase controller changing a phase difference between the first and second control signals based on a comparison result from the comparator,
wherein
at a commencement of lighting of the cold-cathode fluorescent tube, the control portion fixes the phase difference between the first and second control signals, and sweeps the frequencies of the first and second control signals from a start frequency to a stop frequency, and
when the current detecting data becomes the first reference data or more during frequency sweep, the control portion fixes the frequencies of the first and second control signals at a predetermined frequency, and controls the phase difference between the first and second control signals so that the current detecting data substantially is matched with the second reference data.

54. The driving circuit for a piezoelectric transformer according to claim 53, wherein the control portion performs driving control in a first vibration mode of the piezoelectric transformer until the current detecting data reaches the first reference data, and thereafter, performs the driving control in a second vibration mode lower than the first vibration mode.

55. The driving circuit for a piezoelectric transformer according to claim 53, wherein the control portion changes a change ratio of a phase difference to a time in accordance with an impedance of the cold-cathode fluorescent tube.

56. The driving circuit for a piezoelectric transformer according to claim 53, wherein the control portion controls brightness of the cold-cathode fluorescent tube by changing the second reference data.

57. The driving circuit for a piezoelectric transformer according to claim 56, wherein the control portion controls brightness of the cold-cathode fluorescent tube by turning on/off the cold-cathode fluorescent tube alternately to perform burst driving.

58. The driving circuit for a piezoelectric transformer according to claim 57, wherein the control portion controls brightness of the cold-cathode fluorescent tube by changing a ratio between a set time of the first reference data and a set time of the second reference data.

59. The driving circuit for a piezoelectric transformer according to claim 57, wherein the control portion controls brightness of the cold-cathode fluorescent tube by changing a change ratio from the first reference data to the second reference data.

60. The driving circuit for a piezoelectric transformer according to claim 58 or 59, wherein a switching frequency of the first reference data and the second reference data is 1 kHz or less.

61. The driving circuit for a piezoelectric transformer according to claim 53, wherein the control portion sets the frequencies of the first and second control signals and the phase difference therebetween so that a frequency component corresponding to a vibration mode of a frequency higher than a desired vibration mode of the piezoelectric transformer is not included.

62. The driving circuit for a piezoelectric transformer according to claim 53, wherein the third series connection body includes a capacitor connected between the pair of input electrodes of the piezoelectric transformer.

63. The driving circuit for a piezoelectric transformer according to claim 53, wherein the control portion is controlled by a microcomputer.

64. The driving circuit for a piezoelectric transformer according to claim 63, wherein the control portion is mounted in one chip together with the microcomputer.

65. A driving circuit for a piezoelectric transformer, comprising:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which a cold-cathode fluorescent tube and a current detecting resistor are connected in series;
a first driving portion generating the first and second driving signals;
a second driving portion generating the third and fourth driving signals;
a feedback portion returning a voltage signal generated at the current detecting resistor as a current detecting value after rectifying it;
a first comparator comparing the current detecting value from the feedback portion with a first reference voltage value;
a second comparator comparing the current detecting value from the feedback portion with a second reference voltage value; and
a control portion receiving a comparison result from the first or second comparator to output first and second control signals respectively to the first and second driving portions,
the control portion comprising a phase controller changing a phase difference between the first and second control signals based on the comparison result from the first or second comparator, wherein
at a commencement of lighting of the cold-cathode fluorescent tube, the control portion fixes the phase difference between the first and second control signals, and sweeps the frequencies of the first and second control signals from a start frequency to a stop frequency, and
when the current detecting value becomes the first reference voltage value or more during frequency sweep, the control portion fixes the frequencies of the first and second control signals at a predetermined frequency, and controls the phase difference between the first and second control signals so that the current detecting value substantially is matched with the second reference voltage value.

66. A method for driving a piezoelectric transformer using:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which a cold-cathode fluorescent tube and a current detecting resistor are connected in series;
a first driving portion receiving a first control signal to generate the first and second driving signals;
a second driving portion receiving a second control signal to generate the third and fourth driving signals; and
a feedback portion returning a voltage signal generated at the current detecting resistor after rectifying it,
the method comprising: at a commencement of lighting of the cold-cathode fluorescent tube,
fixing a phase difference between the first and second control signals;
sweeping frequencies of the first and second control signals from a start frequency to a stop frequency;
during frequency sweep, comparing current detecting data corresponding to the voltage signal from the feedback portion with first reference data;
when the current detecting data becomes the first reference data or more during the frequency sweep, fixing the frequencies of the first and second control signals at a predetermined frequency;
comparing the current detecting data with second reference data; and
controlling the phase difference between the first and second control signals so that the current detecting data substantially is matched with the second reference data.

67. A backlight apparatus including a driving circuit for a piezoelectric transformer, the driving circuit comprising:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which a cold-cathode fluorescent tube and a current detecting resistor are connected in series;
a first driving portion generating the first and second driving signals;
a second driving portion generating the third and fourth driving signals;
a feedback portion returning a voltage signal generated at the current detecting resistor after rectifying it; and
a control portion receiving the voltage signal from the feedback portion to output first and second control signals respectively to the first and second driving portions,
the control portion comprising:

an A/D converter converting the voltage signal from the feedback portion to current detecting data having a digital value;

a comparator comparing the current detecting data from the A/D converter with reference data; and a phase controller changing a phase difference between the first and second control signals based on a comparison result from the comparator, wherein at a commencement of lighting of the cold-cathode fluorescent tube, the control portion fixing frequencies of the first and second control signals at a predetermined frequency, and controlling the phase difference between the first and second control signals so that an output power of the piezoelectric transformer becomes from substantially zero to a predetermined output power, after lighting of the cold-cathode fluorescent tube, the control portion controlling the phase difference between the first and second control signals so that the current detecting data substantially is matched with the reference data, and the cold-cathode fluorescent tube illuminates an object to be illuminated from a back surface.

68. A backlight apparatus including a driving circuit for a piezoelectric transformer, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which a cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with first or second reference data; and a phase controller changing a phase difference between the first and second control signals based on a comparison result from the comparator, wherein at a commencement of lighting of the cold-cathode fluorescent tube, the control portion fixing frequencies of the first and second control signals at a first frequency, and controlling the phase difference between the first and second control signals so that an output power of the piezoelectric transformer becomes from substantially zero to a predetermined output power, when the current detecting data becomes the first reference data or more, the control portion fixing the frequencies of the first and second control signals at a second frequency, and controlling the phase difference between the first and second control signals so that the current detecting data substantially is matched with the second reference data, and the cold-cathode fluorescent tube illuminates an object to be illuminated from a back surface.

69. A backlight apparatus comprising a driving circuit for a piezoelectric transformer, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which a cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with first or second reference data; and a phase controller changing a phase difference between the first and second control signals based on a comparison result from the comparator, wherein
  at a commencement of lighting of the cold-cathode fluorescent tube, the control portion fixing the phase difference between the first and second control signals, and sweeping the frequencies of the first and second control signals from a start frequency to a stop frequency,
  when the current detecting data becomes the first reference data or more during frequency sweep, the control portion performing the frequency sweep until the stop frequency is reached, and simultaneously controlling the phase difference between the first and second control signals so that the current detecting data substantially is matched with the second reference data, and
  the cold-cathode fluorescent tube illuminates an object to be illuminated from a back surface.

70. A backlight apparatus comprising a driving circuit for a piezoelectric transformer, the driving circuit comprising:
  a first series connection body connected to both terminals of a DC power source, in which first and second switching members are turned on/off alternately by first and second driving signals and are connected in series;
  a second series connection body connected in parallel with the first series connection body, in which third and fourth switching members are turned on/off alternately by third and fourth driving signals respectively having the same frequency and duty ratio as those of the first and second driving signals and are connected in series;
  a piezoelectric transformer outputting a voltage, which is input from a primary side electrode, from a secondary side electrode after stepping-up or down the voltage by using a piezoelectric effect;
  a third series connection body connected between a connection point of each switching member of the first series connection body and a connection point of each switching member of the second series connection body, including an inductor and a pair of input electrodes of the piezoelectric transformer;
  a fourth series connection body connected between a pair of output electrodes of the piezoelectric transformer, in which a cold-cathode fluorescent tube and a current detecting resistor are connected in series;
  a first driving portion generating the first and second driving signals;
  a second driving portion generating the third and fourth driving signals;
  a feedback portion returning a voltage signal generated at the current detecting resistor after rectifying it; and
  a control portion receiving the voltage signal from the feedback portion to output first and second control signals respectively to the first and second driving portions,
  the control portion comprising:
  an A/D converter converting the voltage signal from the feedback portion to current detecting data having a digital value;
  a comparator comparing the current detecting data from the A/D converter with first or second reference data; and
  a phase controller changing a phase difference between the first and second control signals based on a comparison result from the comparator,
  wherein
    at a commencement of lighting of the cold-cathode fluorescent tube, the control portion fixing the phase difference between the first and second control signals, and sweeping the frequencies of the first and second control signals from a start frequency to a stop frequency,
    when the current detecting data becomes the first reference data or more during frequency sweep, the control portion fixing the frequencies of the first and second control signals at a predetermined frequency, and controlling the phase difference between the first and second control signals so that the current detecting data substantially is matched with the second reference data, and
    the cold-cathode fluorescent tube illuminates an object to be illuminated from a back surface.

71. A liquid crystal display apparatus comprising a backlight apparatus including a driving circuit for a piezoelectric transformer and being composed so that a cold-cathode fluorescent tube illuminates an object to be illuminated from a back surface, the driving circuit comprising:
  a first series connection body connected to both terminals of a DC power source, in which first and second switching members are turned on/off alternately by first and second driving signals and are connected in series;
  a second series connection body connected in parallel with the first series connection body, in which third and fourth switching members are turned on/off alternately by third and fourth driving signals respectively having the same frequency and duty ratio as those of the first and second driving signals and are connected in series;
  a piezoelectric transformer outputting a voltage, which is input from a primary side electrode, from a secondary side electrode after stepping-up or down the voltage by using a piezoelectric effect;
  a third series connection body connected between a connection point of each switching member of the first series connection body and a connection point of each switching member of the second series connection body, including an inductor and a pair of input electrodes of the piezoelectric transformer;
  a fourth series connection body connected between a pair of output electrodes of the piezoelectric transformer, in which the cold-cathode fluorescent tube and a current detecting resistor are connected in series;
  a first driving portion generating the first and second driving signals;
  a second driving portion generating the third and fourth driving signals;
  a feedback portion returning a voltage signal generated at the current detecting resistor after rectifying it; and
  a control portion receiving the voltage signal from the feedback portion to output first and second control signals respectively to the first and second driving portions,
  the control portion comprising:
  an A/D converter converting the voltage signal from the feedback portion to current detecting data having a digital value;
  a comparator comparing the current detecting data from the A/D converter with reference data; and
  a phase controller changing a phase difference between the first and second control signals based on a comparison result from the comparator,
  wherein
    at a commencement of lighting of the cold-cathode fluorescent tube, the control portion fixing the frequencies of the first and second control signals at a predetermined frequency, and controlling the phase difference between the first and second control signals so that an output power of the piezoelectric transformer becomes from substantially zero to a predetermined output power, after lighting of the cold-cathode fluorescent tube, the control portion controls the phase difference between the first and second control signals so that the current detecting data substantially is matched with the reference data, and the object to be illuminated is a liquid crystal panel.

72. A liquid crystal display apparatus comprising a backlight apparatus including a driving circuit for a piezoelectric transformer and being composed so that a cold-cathode fluorescent tube illuminates an object to be illuminated from a back surface, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which the cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with reference data; and a phase controller changing a phase difference between the first and second control signals based on a comparison result from the comparator, wherein at a commencement of lighting of the cold-cathode fluorescent tube, the control portion fixing the frequencies of the first and second control signals at a first frequency, and controlling the phase difference between the first and second control signals so that an output power of the piezoelectric transformer becomes from substantially zero to a predetermined output power, when the current detecting data becomes the first reference data or more, the control portion fixes the frequencies of the first and second control signals at a second frequency, and controls the phase difference between the first and second control signals so that the current detecting data substantially is matched with the second reference data, and the object to be illuminated is a liquid crystal panel.

73. A liquid crystal display apparatus comprising a backlight apparatus including a driving circuit for a piezoelectric transformer and being composed so that a cold-cathode fluorescent tube illuminates an object to be illuminated from a back surface, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which the cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with first or second reference data; and a phase controller changing a phase difference between the first and second control signals based on a comparison result from the comparator, wherein at a commencement of lighting of the cold-cathode fluorescent tube, the control portion fixes the phase difference between the first and second control signals, and sweeps the frequencies of the first and second control signals from a start frequency to a stop frequency, when the current detecting data becomes the first reference data or more during frequency sweep, the control portion performs the frequency sweep until the stop frequency is reached, and simultaneously controls the phase difference between the first and second control signals so that the current detecting data substantially is matched with the second reference data, and the object to be illuminated is a liquid crystal panel.

74. A liquid crystal display apparatus comprising a backlight apparatus including a driving circuit for a piezoelectric transformer and being composed so that a cold-cathode fluorescent tube illuminates an object to be illuminated from a back surface, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which the cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with first or second reference data; and a phase controller changing a phase difference between the first and second control signals based on a comparison result from the comparator, wherein at a commencement of lighting of the cold-cathode fluorescent tube, the control portion fixes the phase difference between the first and second control signals, and sweeps the frequencies of the first and second control signals from a start frequency to a stop frequency, when the current detecting data becomes the first reference data or more during frequency sweep, the control portion fixes the frequencies of the first and second control signals at a predetermined frequency, and controls the phase difference between the first and second control signals so that the current detecting data substantially is matched with the second reference data, and the object to be illuminated is a liquid crystal panel.

75. A liquid crystal monitor with a liquid crystal display apparatus mounted thereon, the liquid crystal display apparatus comprising a backlight apparatus including a driving circuit for a piezoelectric transformer and being composed so that a cold-cathode fluorescent tube illuminates a liquid crystal panel from a back surface, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which the cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with reference data; and a phase controller changing a phase difference between the first and second control signals based on a comparison result from the comparator, wherein at a commencement of lighting of the cold-cathode fluorescent tube, the control portion fixes frequencies of the first and second control signals at a predetermined frequency, and controls the phase difference between the first and second control signals so that an output power of the piezoelectric transformer becomes from substantially zero to a predetermined output power, and after lighting of the cold-cathode fluorescent tube, the control portion controls the phase difference between the first and second control signals so that the current detecting data substantially is matched with the reference data.

76. A liquid crystal monitor with a liquid crystal display apparatus mounted thereon, the liquid crystal display apparatus comprising a backlight apparatus including a driving circuit for a piezoelectric transformer and being composed so that a cold-cathode fluorescent tube illuminates a liquid crystal panel from a back surface, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which the cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with first or second reference data; and a phase controller changing a phase difference between the first and second control signals based on a comparison result from the comparator, wherein at a commencement of lighting of the cold-cathode fluorescent tube, the control portion fixes frequencies of the first and second control signals at a first frequency, and controls the phase difference between the first and second control signals so that an output power of the piezoelectric transformer becomes from substantially zero to a predetermined output power, and when the current detecting data becomes the first reference data or more, the control portion fixes the frequencies of the first and second control signals at a second frequency, and controls the phase difference between the first and second control signals so that the current detecting data substantially is matched with the second reference data.

77. A liquid crystal monitor with a liquid crystal display apparatus mounted thereon, the liquid crystal display apparatus comprising a backlight apparatus including a driving circuit for a piezoelectric transformer and being composed so that a cold-cathode fluorescent tube illuminates a liquid crystal panel from a back surface, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which the cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with first or second reference data; and a phase controller changing a phase difference between the first and second control signals based on a comparison result from the comparator, wherein at a commencement of lighting of the cold-cathode fluorescent tube, the control portion fixes the phase difference between the first and second control signals, and sweeps the frequencies of the first and second control signals from a start frequency to a stop frequency, and when the current detecting data becomes the first reference data or more during frequency sweep, the control portion performs the frequency sweep until the stop frequency is reached, and simultaneously controls the phase difference between the first and second control signals so that the current detecting data substantially is matched with the second reference data.

78. A liquid crystal monitor with a liquid crystal display apparatus mounted thereon, the liquid crystal display apparatus comprising a backlight apparatus including a driving circuit for a piezoelectric transformer and being composed so that a cold-cathode fluorescent tube illuminates a liquid crystal panel from a back surface, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which the cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with first or second reference data; and a phase controller changing a phase difference between the first and second control signals based on a comparison result from the comparator, wherein at a commencement of lighting of the cold-cathode fluorescent tube, the control portion fixes the phase difference between the first and second control signals, and sweeps the frequencies of the first and second control signals from a start frequency to a stop frequency, and when the current detecting data becomes the first reference data or more during frequency sweep, the control portion fixes the frequencies of the first and second control signals at a predetermined frequency, and controls the phase difference between the first and second control signals so that the current detecting data substantially is matched with the second reference data.

79. A liquid crystal TV with a liquid crystal display apparatus mounted thereon, the liquid crystal display apparatus comprising a backlight apparatus including a driving circuit for a piezoelectric transformer and being composed so that a cold-cathode fluorescent tube illuminates a liquid crystal panel from a back surface, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which the cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with reference data; and a phase controller changing a phase difference between the first and second control signals based on a comparison result from the comparator, wherein at a commencement of lighting of the cold-cathode fluorescent tube, the control portion fixes frequencies of the first and second control signals at a predetermined frequency, and controls the phase difference between the first and second control signals so that an output power of the piezoelectric transformer becomes from substantially zero to a predetermined output power, and after lighting of the cold-cathode fluorescent tube, the control portion controls the phase difference between the first and second control signals so that the current detecting data substantially is matched with the reference data.

80. A liquid crystal TV with a liquid crystal display apparatus mounted thereon, the liquid crystal display apparatus comprising a backlight apparatus including a driving circuit for a piezoelectric transformer and being composed so that a cold-cathode fluorescent tube illuminates a liquid crystal panel from a back surface, the driving circuit comprising:

a first series connection body connected to both terminals of a DC power source, in which first and second switching members are turned on/off alternately by first and second driving signals and are connected in series;

a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which the cold-cathode fluorescent tube and a current detecting resistor are connected in series;
a first driving portion generating the first and second driving signals;
a second driving portion generating the third and fourth driving signals;
a feedback portion returning a voltage signal generated at the current detecting resistor after rectifying it; and
a control portion receiving the voltage signal from the feedback portion to output first and second control signals respectively to the first and second driving portions,
the control portion comprising:
an A/D converter converting the voltage signal from the feedback portion to current detecting data having a digital value;
a comparator comparing the current detecting data from the A/D converter with first or second reference data; and
a phase controller changing a phase difference between the first and second control signals based on a comparison result from the comparator,
wherein
at a commencement of lighting of the cold-cathode fluorescent tube, the control portion fixes frequencies of the first and second control signals at a first frequency, and controls the phase difference between the first and second control signals so that an output power of the piezoelectric transformer becomes from substantially zero to a predetermined output power, and
when the current detecting data becomes the first reference data or more, the control portion fixes the frequencies of the first and second control signals at a second frequency, and controls the phase difference between the first and second control signals so that the current detecting data substantially is matched with the second reference data.

81. A liquid crystal TV with a liquid crystal display apparatus mounted thereon, the liquid crystal display apparatus comprising a backlight apparatus including a driving circuit for a piezoelectric transformer and being composed so that a cold-cathode fluorescent tube illuminates a liquid crystal panel from a back surface, the driving circuit comprising:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;
a piezoelectric transformer outputting a voltage, which is input from a primary side electrode, from a secondary side electrode after stepping-up or down the voltage by using a piezoelectric effect;
a third series connection body connected between a connection point of each switching member of the first series connection body and a connection point of each switching member of the second series connection body, including an inductor and a pair of input electrodes of the piezoelectric transformer;
a fourth series connection body connected between a pair of output electrodes of the piezoelectric transformer, in which the cold-cathode fluorescent tube and a current detecting resistor are connected in series;
a first driving portion generating the first and second driving signals;
a second driving portion generating the third and fourth driving signals;
a feedback portion returning a voltage signal generated at the current detecting resistor after rectifying it; and
a control portion receiving the voltage signal from the feedback portion to output first and second control signals respectively to the first and second driving portions,
the control portion comprising:
an A/D converter converting the voltage signal from the feedback portion to current detecting data having a digital value;
a comparator comparing the current detecting data from the A/D converter with first or second reference data; and
a phase controller changing a phase difference between the first and second control signals based on a comparison result from the comparator,
wherein
at a commencement of lighting of the cold-cathode fluorescent tube, the control portion fixes the phase difference between the first and second control signals, and sweeps the frequencies of the first and second control signals from a start frequency to a stop frequency, and
when the current detecting data becomes the first reference data or more during frequency sweep, the control portion performs the frequency sweep until the stop frequency is reached, and simultaneously controls the phase difference between the first and second control signals so that the current detecting data substantially is matched with the second reference data.

82. A liquid crystal TV with a liquid crystal display apparatus mounted thereon, the liquid crystal display apparatus comprising a backlight apparatus including a driving circuit for a piezoelectric transformer and being composed so that a cold-cathode fluorescent tube illuminates a liquid crystal panel from a back surface, the driving circuit comprising:
a first series connection body connected to both terminals of a DC power source, in which first and second switching members are turned on/off alternately by first and second driving signals and are connected in series;
a second series connection body connected in parallel with the first series connection body, in which third and fourth switching members are turned on/off alternately by third and fourth driving signals respectively having the same frequency and duty ratio as those of the first and second driving signals and are connected in series;

a piezoelectric transformer outputting a voltage, which is input from a primary side electrode, from a secondary side electrode after stepping-up or down the voltage by using a piezoelectric effect;

a third series connection body connected between a connection point of each switching member of the first series connection body and a connection point of each switching member of the second series connection body, including an inductor and a pair of input electrodes of the piezoelectric transformer;

a fourth series connection body connected between a pair of output electrodes of the piezoelectric transformer, in which the cold-cathode fluorescent tube and a current detecting resistor are connected in series;

a first driving portion generating the first and second driving signals;

a second driving portion generating the third and fourth driving signals;

a feedback portion returning a voltage signal generated at the current detecting resistor after rectifying it; and a control portion receiving the voltage signal from the feedback portion to output first and second control signals respectively to the first and second driving portions, the control portion comprising:

an A/D converter converting the voltage signal from the feedback portion to current detecting data having a digital value;

a comparator comparing the current detecting data from the A/D converter with first or second reference data; and a phase controller changing a phase difference between the first and second control signals based on a comparison result from the comparator, wherein at a commencement of lighting of the cold-cathode fluorescent tube, the control portion fixes the phase difference between the first and second control signals, and sweeps the frequencies of the first and second control signals from a start frequency to a stop frequency, and when the current detecting data becomes the first reference data or more during frequency sweep, the control portion fixes the frequencies of the first and second control signals at a predetermined frequency, and controls the phase difference between the first and second control signals so that the current detecting data substantially is matched with the second reference data.

* * * * *

UNITED STATES PATENT AND TRADEMARK OFFICE
CERTIFICATE OF CORRECTION

PATENT NO. : 7,034,800 B2 Page 1 of 1
APPLICATION NO. : 10/295401
DATED : April 25, 2006
INVENTOR(S) : Nakatsuka et al.

It is certified that error appears in the above-identified patent and that said Letters Patent is hereby corrected as shown below:

Column 37, line 57(claim 32): "riving circuit" should read --driving circuit--.
Column 41, line 29(claim 50): "riving circuit" should read --driving circuit--.

Signed and Sealed this

Sixteenth Day of October, 2007

JON W. DUDAS
*Director of the United States Patent and Trademark Office*